United States Patent
Kim et al.

(10) Patent No.: US 9,736,690 B2
(45) Date of Patent: Aug. 15, 2017

(54) APPARATUS AND METHOD FOR MULTI CELL COMMUNICATION USING BEAMFORMING IN WIRELESS COMMUNICATION SYSTEM

(71) Applicant: Samsung Electronics Co., Ltd., Suwon-si, Gyeonggi-do (KR)

(72) Inventors: Sang-Jin Kim, Suwon-si (KR); Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 14/328,063

(22) Filed: Jul. 10, 2014

(65) Prior Publication Data
US 2015/0020157 A1 Jan. 15, 2015

(30) Foreign Application Priority Data
Jul. 10, 2013 (KR) .................. 10-2013-0081115

(51) Int. Cl.
| | |
|---|---|
| *H04W 12/08* | (2009.01) |
| *H04W 28/08* | (2009.01) |
| *H04W 16/28* | (2009.01) |
| *H04W 12/06* | (2009.01) |
| *H04W 76/02* | (2009.01) |
| *H01Q 3/00* | (2006.01) |
| *H01Q 1/24* | (2006.01) |
| *H04W 36/18* | (2009.01) |

(52) U.S. Cl.
CPC ............ *H04W 12/06* (2013.01); *H01Q 1/243* (2013.01); *H01Q 3/00* (2013.01); *H04W 76/025* (2013.01); *H04W 16/28* (2013.01); *H04W 28/08* (2013.01); *H04W 36/18* (2013.01)

(58) Field of Classification Search
CPC ..... H04W 88/08; H04W 24/02; H04W 4/008; H04W 72/085; H04W 84/12; H04W 72/04; H04W 16/14; H04W 88/06; H04W 12/06; H04W 48/16; H04W 72/0446; H04W 76/025; H04W 8/005; H04W 28/08; H04W 72/00
See application file for complete search history.

(56) References Cited

U.S. PATENT DOCUMENTS

| | | | | |
|---|---|---|---|---|
| 8,989,152 | B1 * | 3/2015 | Oroskar | ............ H04W 72/1226 370/329 |
| 2006/0270447 | A1 * | 11/2006 | Everson | ............ H04L 29/06027 455/552.1 |
| 2009/0270103 | A1 | 10/2009 | Pani et al. | |

(Continued)

FOREIGN PATENT DOCUMENTS

| | | | | |
|---|---|---|---|---|
| SE | WO 2014021750 A1 * | 2/2014 | ............ H04W 16/08 |
| WO | 2011/100492 A1 | 8/2011 | |

*Primary Examiner* — Christopher M Brandt
*Assistant Examiner* — Jing Gao
(74) *Attorney, Agent, or Firm* — Jefferson IP Law, LLP

(57) ABSTRACT

A multicell access method using beamforming in a wireless communication system is provided. In the method for operating a terminal, an access procedure for accessing a first base station using a first antenna and accessing a second base station using a second antenna is performed. Communication with the first base station is performed using the first antenna. Communication with the second base station is performed using the second antenna.

73 Claims, 26 Drawing Sheets

(56) References Cited

U.S. PATENT DOCUMENTS

| | | |
|---|---|---|
| 2010/0015951 A1* | 1/2010 | Hahn .................. H04W 8/16 |
| | | 455/411 |
| 2010/0056170 A1 | 3/2010 | Lindoff et al. |
| 2011/0182174 A1 | 7/2011 | Pi et al. |
| 2012/0087423 A1 | 4/2012 | Ko et al. |
| 2012/0276915 A1 | 11/2012 | Kubota et al. |
| 2013/0040578 A1 | 2/2013 | Khoshnevis et al. |
| 2013/0083774 A1 | 4/2013 | Son et al. |
| 2013/0102345 A1 | 4/2013 | Jung |
| 2013/0142054 A1 | 6/2013 | Ahmadi |
| 2013/0155847 A1 | 6/2013 | Li et al. |

* cited by examiner ical field

The present disclosure relates to a communication technique using beamforming in a wireless communication system.

BACKGROUND

Recently, as a wireless Internet communication apparatus including a smartphone is distributed rapidly, a mobile communication data demand rapidly increases by an annual average of about 50% to 200%. To meet this rapidly increasing mobile communication data demand, various data transmission rate improving technologies are under development. A method of various methods that raise a data transmission rate is to use a wider frequency band. However, securing a wider frequency band in the current frequency band used for a mobile communication system is difficult. In contrast, in a case of 28 GHz, 38 GHz, or a higher frequency band, a frequency use frequency is low, so that a very wide frequency band of several hundred MHz to several GHz may be easily secured.

However, a radio communication signal has a property that signal attenuation increases, and in an ultra high frequency of 28 GHz or higher, a signal attenuation degree is very large and so limits a cell size and a service area remarkably. In contrast, as a frequency increases, a size of an antenna reduces, so that integrating a plurality of antenna devices in an array and applying a beamforming technology in an ultrahigh frequency is relatively easy. Accordingly, a very large gain may be obtained via beamforming. Therefore, it is expected that a technology of raising a data transmission rate using a wide frequency band in an ultrahigh frequency and solving an attenuation problem of an ultrahigh frequency signal using a beamforming antenna is used as a technology of a future ultrahigh speed mobile communication system.

Therefore, a method for performing more efficient communication based on beamforming in a wide frequency band of an ultrahigh frequency band is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for performing more efficient communication based on beamforming in a wireless communication system.

Another aspect of the present disclosure is to provide an apparatus and a method for allowing a terminal having a plurality of beamforming antennas to communicate with an optimized cell for each antenna in a wireless communication system.

Another aspect of the present disclosure is to provide an apparatus and a method for converting single cell connection to multicell connection in a wireless communication system.

Another aspect of the present disclosure is to provide an apparatus and a method for converting multicell connection to single cell connection in a wireless communication system.

Another aspect of the present disclosure is to provide an apparatus and a method for performing multicell connection simultaneously in a wireless communication system.

Another aspect of the present disclosure is to provide an apparatus and a method for releasing connection for one of cells in a multicell connection state in a wireless communication system.

Another aspect of the present disclosure is to provide an apparatus and a method for releasing all connections in a multicell connection state in a wireless communication system.

Another aspect of the present disclosure is to provide an apparatus and a method for changing an optimized cell in a multicell connection state in a wireless communication system.

In accordance with an aspect of the present disclosure, a method for operating a terminal in a wireless communication system is provided. The method includes performing an access procedure for accessing a first base station using a first antenna and accessing a second base station using a second antenna, and performing communication with the first base station using the first antenna and communication with the second base station using the second antenna.

In accordance with another aspect of the present disclosure, a method for operating a first base station in a wireless communication system is provided. The method includes performing an access procedure with a terminal via a serving cell for a first antenna of the terminal, and performing communication with the terminal via the first antenna of the terminal, wherein the performing of the access procedure includes transmitting, at the first base station and the terminal, a message including information regarding a second base station which the first base station and the terminal desire to access to a gateway using a second antenna.

In accordance with another aspect of the present disclosure, a method for operating a gateway in a wireless communication system is provided. The method includes performing an access procedure where a terminal accesses a first base station using a first antenna, and the terminal accesses a second base station using a second antenna, and performing communication with the terminal via the first base station and the second base station, wherein the performing of the access procedure includes receiving, from the first base station, a message including information regarding the first base station and the second base station.

In accordance with another aspect of the present disclosure, a terminal apparatus in a wireless communication system is provided. The terminal apparatus includes a controller configured to perform an access procedure for accessing a first base station using a first antenna and accessing a second base station using a second antenna, and a communication unit configured to transmit/receive a signal to/from the first base station using the first antenna and to transmit/receive a signal to/from the second base station using the second antenna.

In accordance with another aspect of the present disclosure, a first base station apparatus in a wireless communication system is provided. The first base station apparatus includes a controller configured to perform an access procedure with a terminal via a serving cell for a first antenna of the terminal, a backhaul communication unit configured to transmit a message including information regarding a second base station which the first base station and the terminal desire to access using a second antenna to a gateway under control of the controller; and a wireless communication unit configured to transmit/receive a signal to/from the terminal via the first antenna of the terminal.

In accordance with another aspect of the present disclosure, a gateway apparatus in a wireless communication system is provided. The gateway apparatus includes a controller configured to perform an access procedure where a terminal accesses a first base station using a first antenna, and the terminal accesses a second base station using a second antenna, and a communication unit configured to receive a message including information regarding the first base station and the second base station from the first base station, and to transmit/receive data to/from the terminal via the first base station and the second base station under control of the controller.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
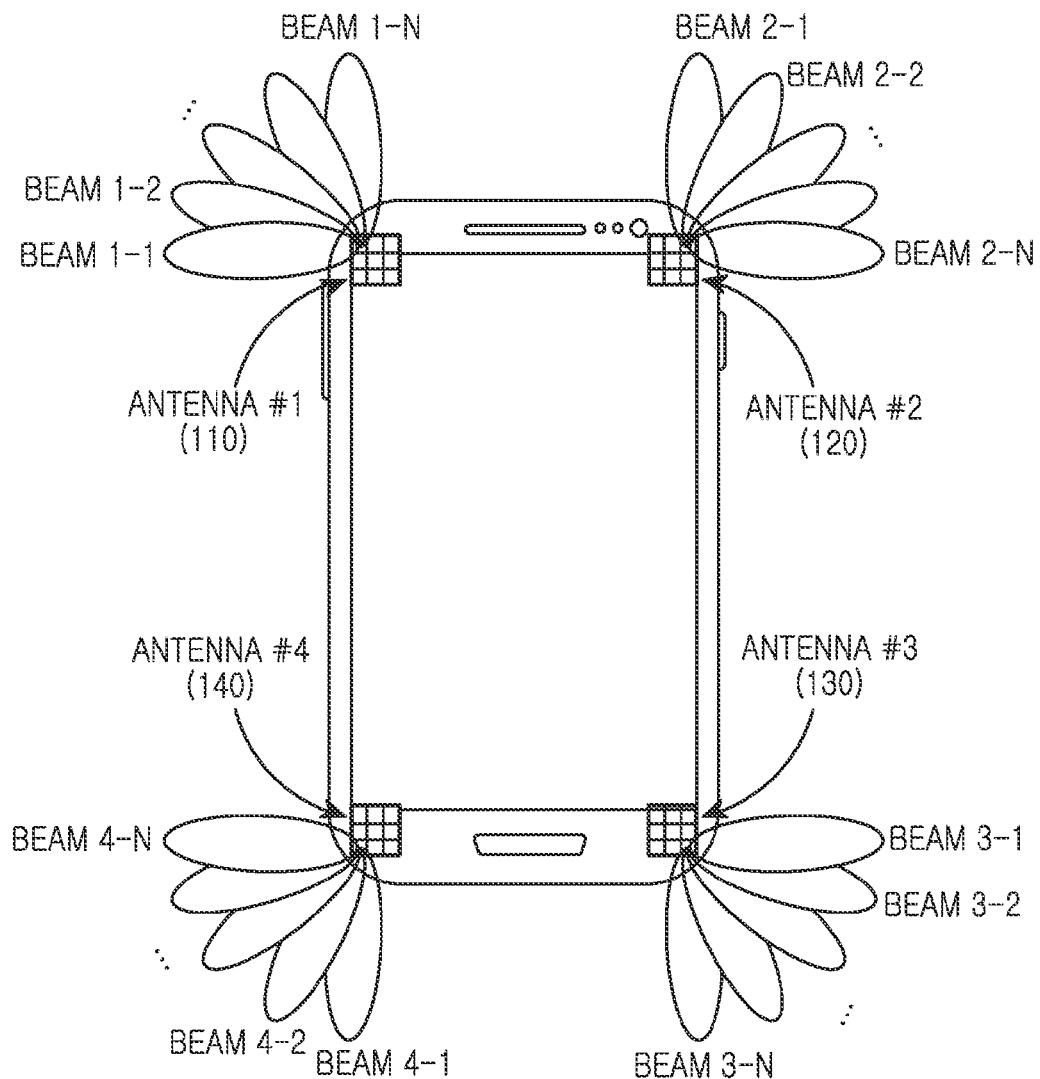
FIG. 1 is a view illustrating an antenna characteristic of a terminal in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a base station, a terminal, a gateway, and/or the like, may respectively be an electronic device.

A technology for performing more efficient communication based on beamforming in a wireless communication system is described.

In a mobile communication system according to the related art, an antenna provided to a terminal is an omni-directional antenna and has a characteristic of uniformly transmitting/receiving a signal in all directions. In the case in which one terminal has a plurality of omni-directional antennas, a distance between the plurality of antennas in the same terminal is negligible compared to a distance between the base station and the terminal. Therefore, the frequencies and the time average magnitudes of a base station signal that may be received by respective antennas provided to the terminal have no difference. In other words, a cell area experienced by different antennas in one terminal is the same on average. The cellular mobile communication technology according to the related art has been developed based on the premise of a characteristic that a plurality of terminal antennas experience the same cell area on average.

A beamforming antenna considered by the present disclosure may generate one beam to transmit or receive a signal on one instant, and change the direction of the beam to transmit/receive a signal on the next instant. However, according to a physical characteristic of an antenna, the direction of a beam that may be formed by one beamforming antenna cannot cover all directions of 360 degree, and is limited to a portion of the directions. Because a terminal should transmit/receive a signal in all directions, the terminal may transmit/receive a signal in all directions of 360 degree by arranging a plurality of beamforming antennas whose beam direction is limited such that they face different directions. Various embodiments of the present disclosure relate to a method and an apparatus of a future cellular mobile communication system including a terminal that uses a plurality of beamforming antennas.

FIG. 1 is a view illustrating an antenna characteristic of a terminal in a wireless communication system according to an embodiment of the present disclosure. FIG. 1 illustrates an antenna characteristic of a terminal considered by the present disclosure, and illustrates an example according to which a plurality of beamforming antennas are disposed in different directions.

Referring to FIG. 1, each antenna may generate one beam to transmit/receive a signal in one instant, and change the beam in the next instant. However, the direction of a beam generated by each antenna is limited by the installation position, the disposed direction, and/or the like, of the antenna. Referring to FIG. 1, beams generated by an antenna#1 110 are limited to the left upper direction, an antenna#2 120 generates a beam in the only right upper direction, an antenna#3 130 covers the left lower portion, and an antenna#4 140 covers the right lower portion. In FIG. 1, the number of beams that may be generated by respective antennas is N which is the same over all antennas. However, according to various embodiments of the present disclosure, the number of beams that may be generated by respective antennas may be different from one another, and formed beam widths may be also different from one another.

A terminal finds out an optimized base station using all beams that may be generated by each antenna in order to communicate with a base station. However, as an example illustrated in FIG. 1, because beam ranges generated by respective antennas having different characteristics are different, an optimized base station may be different for each antenna. In this case, a cell area for each antenna may be illustrated in FIG. 2.

Figure 2:
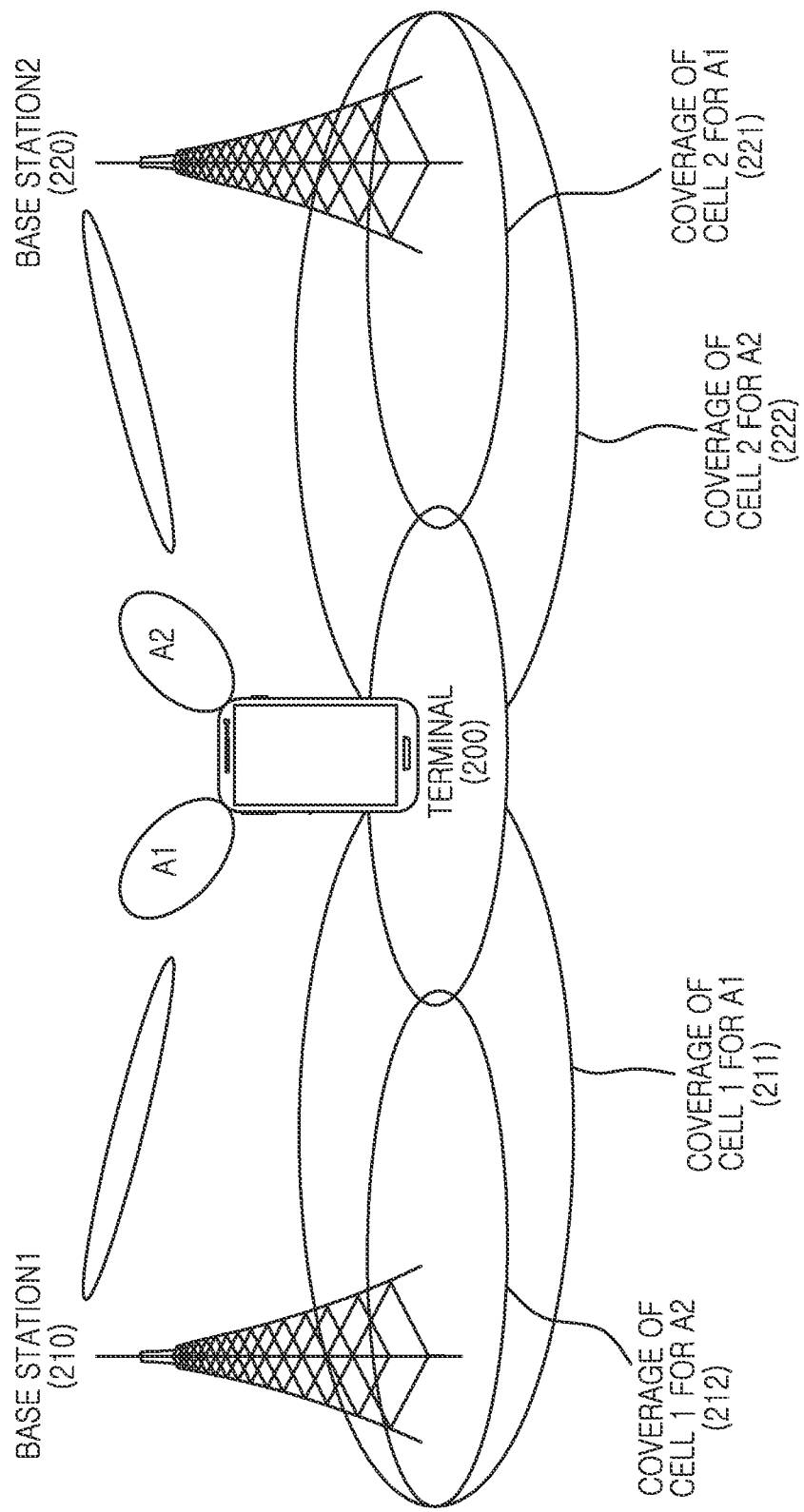
FIG. 2 is a view illustrating an example of a cell area for each antenna of a terminal in a wireless communication system according to an embodiment of the present disclosure.

FIG. 2 is a view illustrating an example of a cell area for each antenna of a terminal in a wireless communication system according to an embodiment of the present disclosure. FIG. 2 illustrates a cell area for each antenna in the case in which a terminal has a plurality of beamforming antennas and the directions of beams formed by respective antennas are different from one another.

Referring to FIG. 2, an antenna A1 of the terminal 200 generates a beam in the left direction, and does not generate a beam in the right direction. An antenna A2 of the terminal 200 generates a beam in the right direction, and does not generate a beam in the left direction. In this case, cell areas of base stations 210 and 220 positioned on both sides of the terminal 200 may be determined different depending on an antenna. The antenna A1 may amplify a signal of the base station 1 210 positioned on the left by a beam gain and receive the same, but receives a signal of the base station 2 220 positioned on the right at attenuated strength depending on a beam pattern. As a result, in the antenna A1, a cell-1 area 211 of the base station 1 210 becomes very large, and a cell-2 area 221 of the base station 2 220 becomes very small. In contrast, the antenna A2 may amplify a signal of the base station 2 220 by a beam gain and receive the same, but receives a signal of the base station 1 210 at attenuated strength depending on a beam pattern. Consequently, in the antenna A2, the cell-2 area 222 of the base station 2 220 becomes very large, and the cell-1 area 212 of the base station 1 210 becomes very small.

As illustrated in FIG. 2, in the terminal 200 having a plurality of beamforming antennas, a characteristic that a substantial cell area is different for each antenna and optimized base station and cell are different for each antenna even on the same position occurs. The cellular mobile communication technology according to the related art premises that a terminal communicates with one serving cell based on a characteristic that a cell area is the same for each terminal antenna on the average. Therefore, because the technology according to the related art is not suitable for a communication environment of the present disclosure in which an optimized cell may change for each antenna, a new cellular mobile communication technology is required.

Hereinafter, the present disclosure describes a multicell communication technique for selecting a serving cell with consideration of a characteristic of a plurality of antennas of a terminal. Furthermore, the present disclosure describes a network structure for multicell communication and a function for each network element, and describes a control message that uses a multicell and a transmission/reception standard of data. The present disclosure describes a control message that depends on the position of a terminal and a data transmission/reception method, and describes an operation procedure for each step for multicell communication.

A serving cell selection method that considers a beamforming antenna characteristic may be defined variously.

Figure 3A:
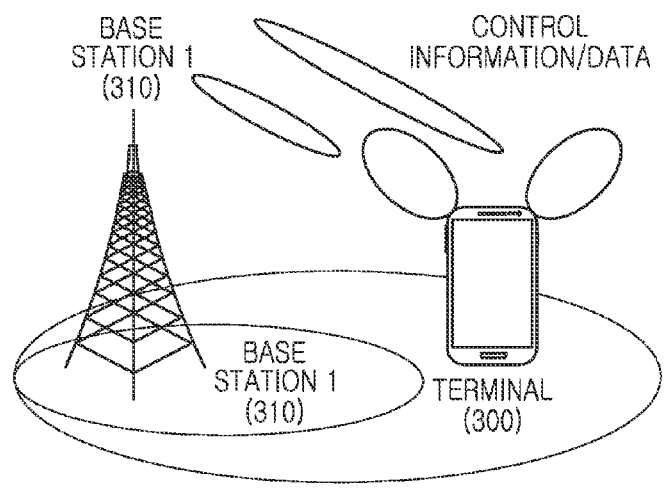
FIGS. 3A, 3B and 3C are views illustrating examples of a serving cell selection method in a wireless communication system according to an embodiment of the present disclosure.
Figure 3B:
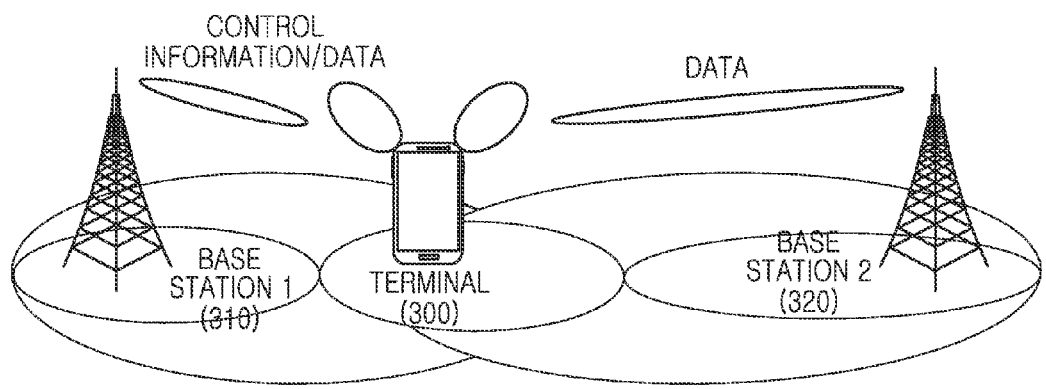
Figure 3C:
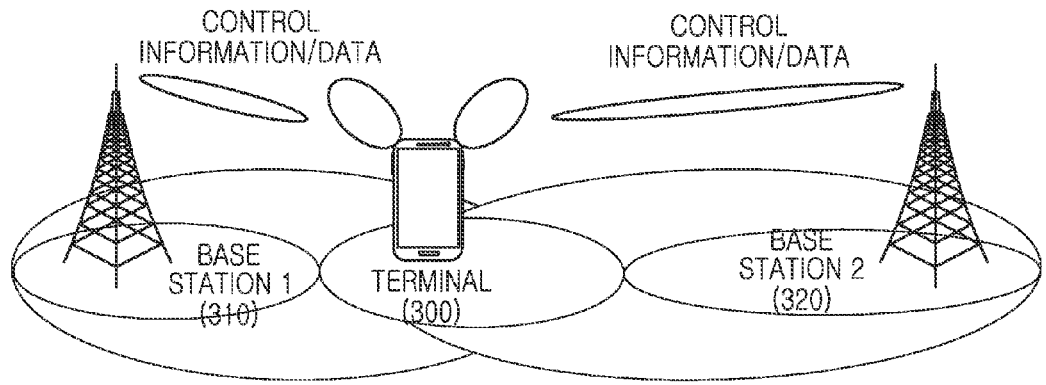

FIGS. 3A, 3B, and 3C are views illustrating examples of a serving cell selection method in a wireless communication system according to an embodiment of the present disclosure.

Referring to FIG. 3A, a terminal 300 selects a single serving cell that may provide best radio quality with consideration of radio quality between all antennas and cells, and transmits/receives data and control information via the single serving cell. In case of FIG. 3A, a base station 1 310 has been selected. The control information includes various physical layer control channel signals, Media Access Control (MAC) and Radio Resource Control (RRC) control messages. The method illustrated in FIG. 3A is similar to the cellular mobile communication method according to the related art where the terminal 300 communicates with one serving cell.

Referring to FIG. 3B, serving cells for control information and data are different from each other. The control information is transmitted/received via one optimized cell with consideration of all antennas of the terminal 300, and the data is transmitted/received via an optimized cell for each antenna of the terminal 300. In case of FIG. 3B, control information is transmitted/received via the base station 1 310, and data is transmitted/received via the base station 1 310 and the base station 2 320. Therefore, the base station 1 310 that transmits/receives the control information transmits/receives data as well as control information. However, the base station 2 320 which is a different cell transmits/receives only data. The control information includes various physical layer control channel signal and MAC and RRC control messages. The method illustrated in FIG. 3B is similar to the Cooperative Multi-Point (CoMP) technology according to the related art in that data is transmitted/received via a plurality of cells but control information is transmitted/received via only one cell.

Referring to FIG. 3C, the terminal 300 selects a cell that may provide optimized radio quality for each antenna as a serving cell of each antenna. In case of FIG. 3C, the base station 1 310 has been selected as a serving cell with respect to one antenna, and the base station 2 320 has been selected as a serving cell with respect to the rest of antennas. Accordingly, each antenna transmits/receives an optimized cell corresponding to each antenna, control information, and data. For example, each antenna transmits/receives control information and data independently. The control information includes various physical layer control channel information, and MAC and RRC control messages.

In the example described with reference to FIGS. 3A to 3C, the physical layer control channel signal includes at least one of physical layer radio resource allocation information required for transmitting/receiving data, Modulation and Coding Scheme (MCS) information, power control information, Hybrid Automatic Repeat reQuest (HARQ) Acknowledge/Non-ACK (ACK/NACK) related information, Channel Quality Information (CQI), antenna and beam information for a beamforming antenna or multi-antenna method-related information, Random Access Channel (RACH), and/or the like.

Table 1 shows comparison of serving cell selection methods described with reference to FIGS. 3A to 3C. In Table 1, method 1 denotes FIG. 3A, method 2 denotes FIG. 3B, and method 3 denotes FIG. 3C.

TABLE 1

|  | | Method 1 | Method 2 | | Method 3 |
|---|---|---|---|---|---|
| Object | | Control/Data | Data | Control | Control/Data |
| Criteria for selecting a Serving cell | | All of antennas and Single cell | Each of antennas and Multiple cell | All of antennas and Single cell | Each of antennas and Multiple cell |
| transmission rate/ capacity | | Low | High | Low | High |
| Complexity | Terminal | Low | Low | | Low |
| | Base Station | Low | High | | Low |
| | Network | Low | High | | Low |

As illustrated in Table 1, method 1 performs communication with one serving cell and does not perform communication with an optimized cell for each antenna. Therefore, an optimized performance is not accomplished in aspects of a transmission rate and capacity. However, because method 1 is similar to the mobile communication system according to the related art, method 1 has an advantage that complexity of a terminal, a base station, and a network is low.

Because method 2 communicates with data via an optimized cell for each antenna, method 2 accomplishes an optimized performance in aspects of a transmission rate and capacity. However, control information, particularly, a physical layer control channel should be transmitted/received via one cell. For stable control information transmission/reception, a plurality of base stations should cooperate with one another during a physical layer radio resource allocation process, or should exchange at least physical layer radio resource allocation information and inform a terminal of the information. In case of performing this procedure, complexity of a base station and a network is raised very high.

Because method 3 transmits/receives data and control information using an optimized serving cell for each antenna, method 3 accomplishes an optimized performance in aspects of a transmission rate and capacity. In addition, because each cell performs communication independently, implementation complexity is somewhat low. For example, an implementation complexity with which one terminal communicates with one cell via two antennas is compared with an implementation complexity with which one terminal communicates with two cells simultaneously as follows. When comparison is made with a condition of accomplishing the same data transmission rate, in the case in which a terminal communicates with one cell, 2×2 MIMO transmission/reception means are required, but in the case in which one terminal transmits/receives data to/from two cells, only two 1×1 Single Input Single Output (SISO) transmission/ reception means are required. Though complexity may be somewhat different depending on a Forward Error Correction (FEC) method and a MIMO reception technology used, complexity of a modem for two 1×1 SISO and complexity of a modem for one 2×2 MIMO are similar to each other, basically. Therefore, it is not considered that implementation for a terminal of the present disclosure that simultaneously communicates with cells as many as the number of maximum terminal antennas is more complicated or difficult than implementation for the terminal according to the related art that communicates using only one cell.

Therefore, method 3 is most efficient. Hereinafter, the present disclosure describes a multicell communication technique for applying method 3.

In the multicell communication technique according to various embodiments of the present disclosure, a terminal transmits/receives control information and data to/from optimized cells for each antenna. Therefore, best performances of a beamforming base station and a terminal are expected to be accomplished. Particularly, according to various embodiments of the present disclosure, each base station may operate independently without cooperating with other base stations or exchanging radio resource allocation information of each base station when allocating a radio resource for transmitting/receiving data to a terminal. As a result, complexities of a radio network and a base station according to various embodiments of the present disclosure are low. Even in case of a terminal according to various embodiments of the present disclosure, an increase in complexity is extremely imperceptible compared to the terminal according to the related art that communicates with only one cell.

A wireless network structure for multicell communication according to an embodiment of the present disclosure is described below.

Figure 4:
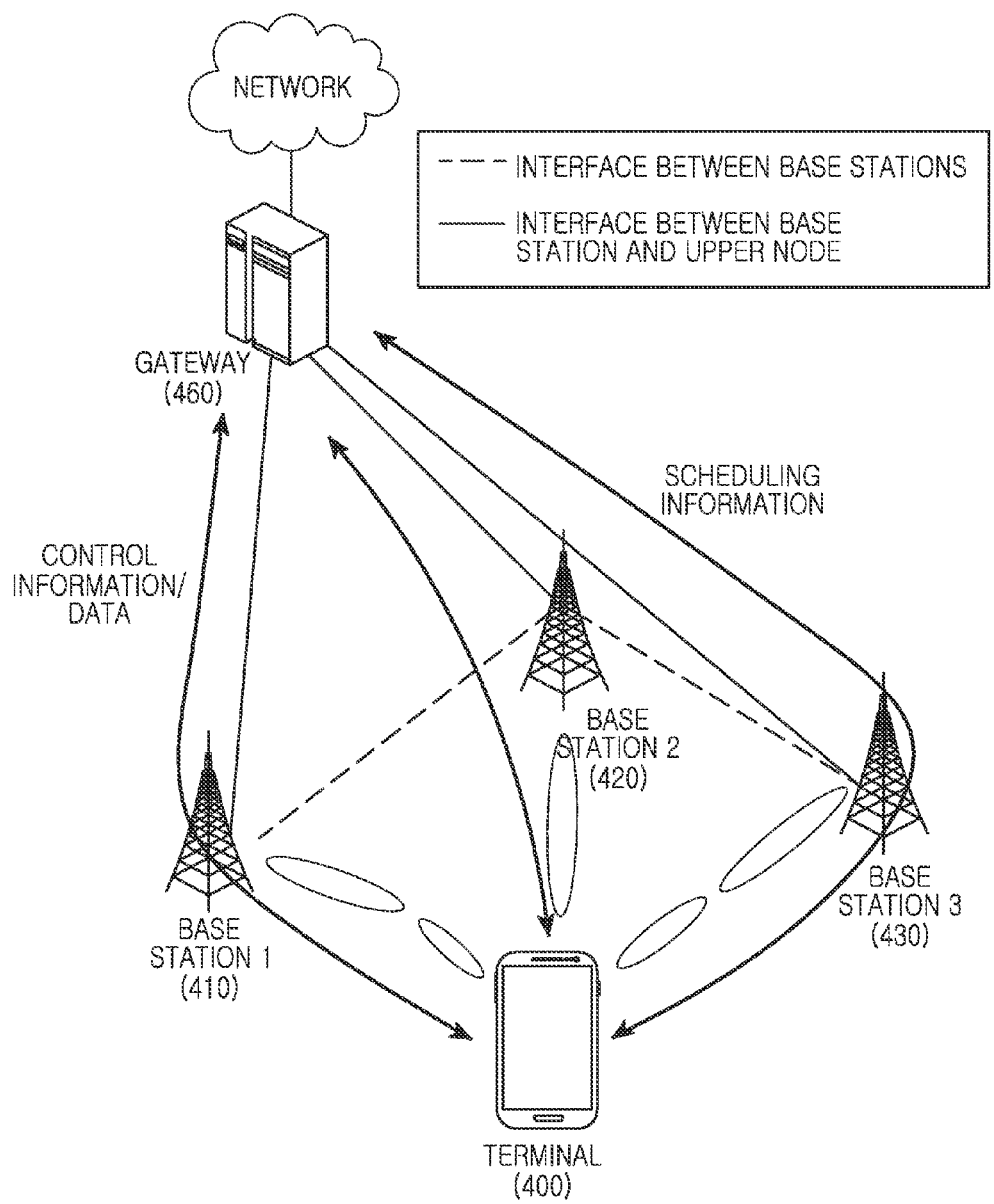
FIG. 4 is a view illustrating an example of network configuration of a wireless communication system according to an embodiment of the present disclosure.

FIG. 4 is a view illustrating an example of network configuration of a wireless communication system according to an embodiment of the present disclosure.

Referring to FIG. 4, a gateway 460 is connected with a plurality of base stations 410, 420, 430 and serves as a path for the base stations 410, 420, 430, and a core network. The base stations 410, 420, 430 form a cell in a predetermined physical region, and are connected via the gateway 460 and an S1 interface. In addition, the base stations 410, 420, 430 may be logically connected with a neighbor base station via an X2 interface, and exchange a control signal and data with a neighbor base station. To prevent disconnection of data transmission when a terminal 400 performs a handover, the X2 interface enables a serving base station and a target base station of the terminal 400 to exchange control information and data. In addition, according to various embodiments of the present disclosure, the terminal 400 accesses one cell or a plurality of cells simultaneously to perform communication depending on a selection result of an optimized cell for each antenna. For this purpose, the terminal 400 should have a communication means for each antenna in a lower layer. A protocol stack of the terminal 400 is illustrated in FIG. 5.

Figure 5:
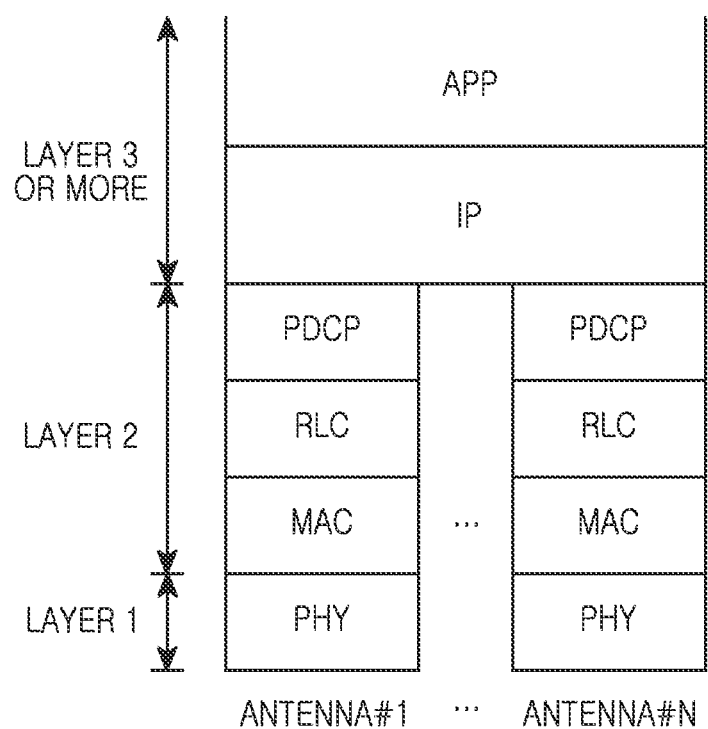
FIG. 5 is a view illustrating a protocol stack corresponding to a user plane of a terminal in a wireless communication system according to an embodiment of the present disclosure.

FIG. 5 is a view illustrating a protocol stack corresponding to a user plane of a terminal in a wireless communication system according to an embodiment of the present disclosure.

Referring to FIG. 5, a layer 1 includes a PHYsical (PHY) lower layer, a layer 2 includes a Medium Access Control (MAC), a Radio Link Control (RLC), and a Packet Data Convergence Protocol (PDCP) lower layer, and a layer 3 includes an Internet Protocol (IP) and an APPlication (APP) layer. Because the terminal may transmit/receive data to/from a base station (=cell) for each antenna, the layer 1 and the layer 2 exist independently by the number of antennas provided to the terminal. The PHY lower layer of the layer 1 performs a transmission/reception function of bit-basis data, the MAC lower layer of the layer 2 performs mapping between a logical channel and a transmission channel, multiplexing/demultiplexing of MAC Service Data Unit (SDU), scheduling information report, and an HARQ error correction function, and the RLC lower layer performs Automatic Repeat Request (ARQ) error correction, concatenation of RLC SDU, segmentation, a reassembly function, and a reordering function of an RLC PDU. In addition, the PDCP lower layer performs compression and release of a data header, and retransmission function of the PDCP SDU during a handover. An IP layer of the layer 3 performs an IP address-based data transmission/reception function, and the APP layer provides end-to-end data transmission and an application service.

Figure 6:
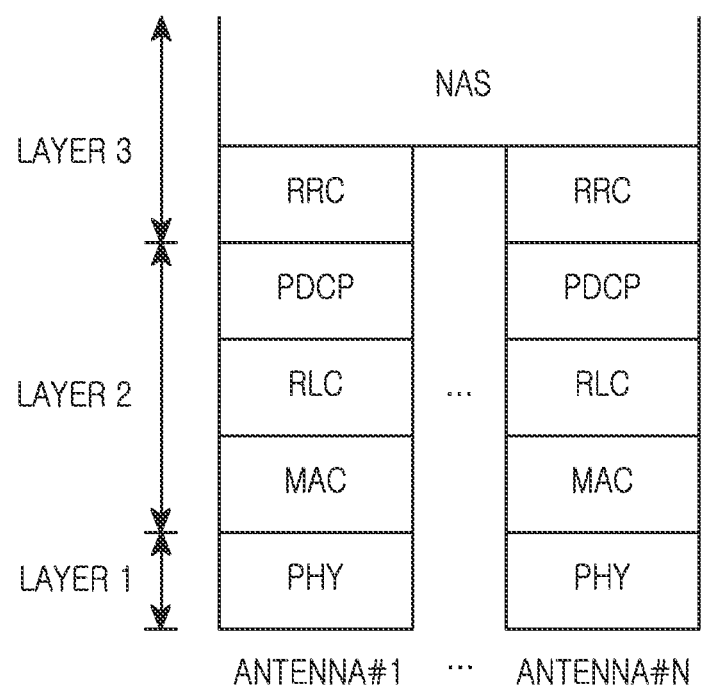
FIG. 6 is a view illustrating a protocol stack corresponding to a control plane of a terminal in a wireless communication system according to an embodiment of the present disclosure.

FIG. 6 is a view illustrating a protocol stack corresponding to a control plane of a terminal in a wireless communication system according to an embodiment of the present disclosure.

Referring to FIG. 6, a layer 1 includes a PHY layer, a layer 2 includes MAC, RLC, PDCP layers, and a layer 3 includes RRC and Non-Access Stratum (NAS) layers. Because the terminal should transmit/receive data to/from a base station (=cell) for each antenna, the RRC layer among the layer 1, the layer 2, and the layer 3 exist independently by the number of antennas provided to the terminal.

The layer 1 is the PHY layer and performs a transmission/reception function of a control channel signal. The MAC layer and the RLC layer of the layer 2 perform the same function as a user plan. In addition, the PDCP layer provides an encryption and integrity test function of control information and an integrity test function of data. The RRC layer of the layer 3 performs broadcast, paging, RRC connection management, Radio Bearer (RB) control, mobility control, measurement reporting, and a control function. The NAS layer is used for exchanging control information between a terminal and a gateway, and performs Evolved Packet System (EPS) bearer management, authentication, an idle mode mobility process of a terminal, a paging function of an idle mode terminal, and a security control function. At this point, the base station does not use NAS control information but performs only a relay function of NAS control information.

A wireless network according to various embodiments of the present disclosure performs two-stage scheduling. In a first stage, a gateway selects one cell which will transmit a data packet to a terminal, and transfers a data packet to a base station of the selected cell. In a second stage, the base station allocates a radio resource for transmitting a data packet to a terminal, performs a layer-2 process procedure, generates and transmits a layer-1 signal. A gateway of a wireless network according to various embodiments of the present disclosure maintains and manages information regarding one cell or a plurality of cells which each terminal has accessed, for example, cell ID information and information regarding the cell, for example, a radio link quality information of a terminal positioned in the cell and load information of the cell. For example, the above-described information may be managed as a table. Thereafter, to transfer a data packet transmitted from a core network to the terminal, the gateway selects one of a plurality of serving cells of the terminal, and transfers a downlink data packet to a base station of the selected one cell. The base station that has received the downlink data packet from the gateway transmits the downlink data packet to a target terminal.

The gateway may select a cell again according to a predetermined scheduling standard every data packet, and at this point, the selected cell may change every data packet. A standard according to which the gateway selects a cell includes at least one of a radio link quality value of a terminal in each cell, a load value of a cell, and Quality of Service (QoS) of data or a delay requirement. To transmit a downlink data packet to the terminal, a base station of each cell allocates a radio resource, and generates and transmits a physical layer signal. Because a base station of each cell does not need to cooperate with other base stations during a process of allocating a radio resource and transmitting a physical layer signal, the base station operates independently. The terminal receives control information and a data packet from one cell or a plurality of cells using a plurality of antennas.

Figure 7:
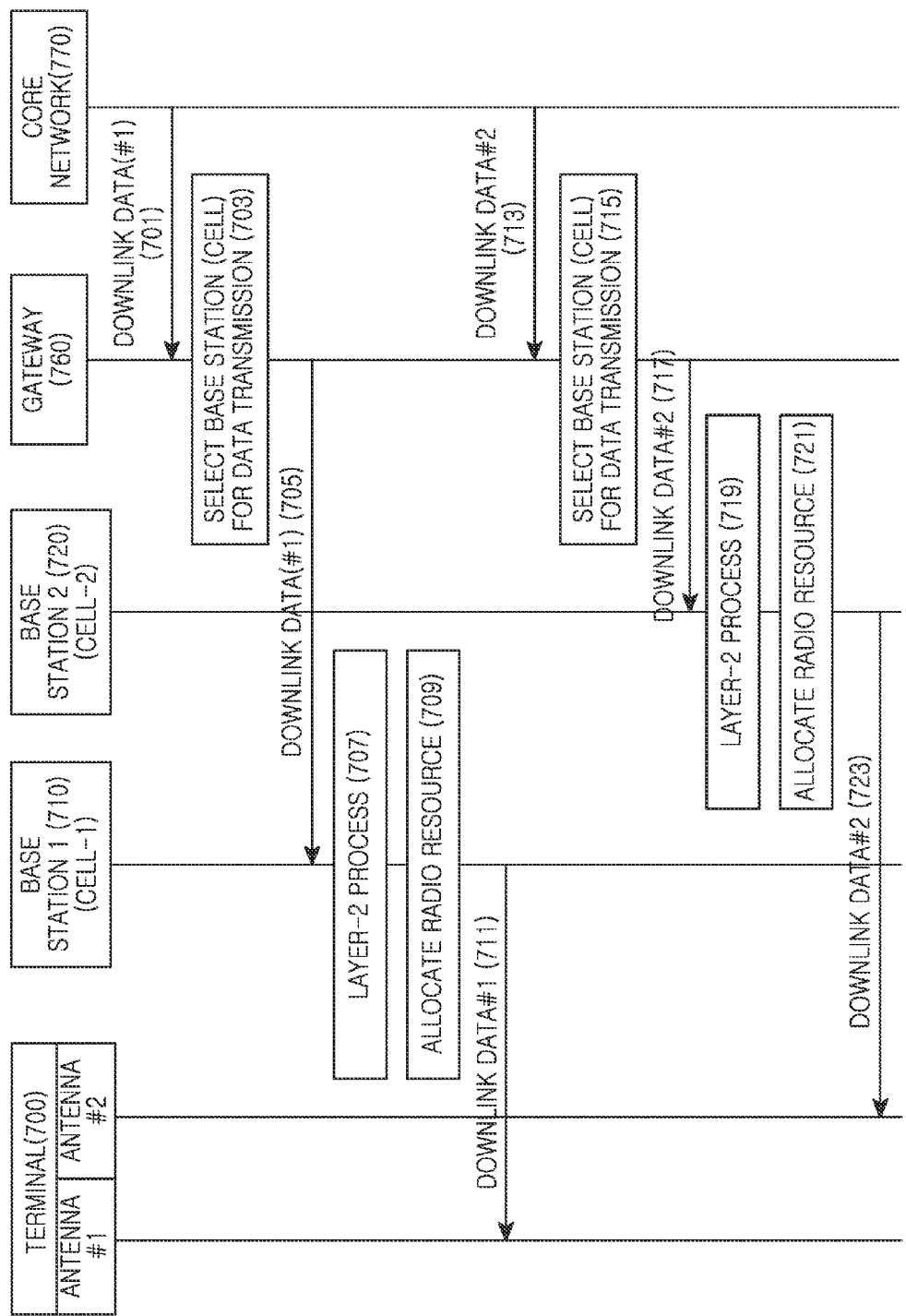
FIG. 7 is a view illustrating a downlink data transmission procedure in a wireless communication system according to an embodiment of the present disclosure.

FIG. 7 is a view illustrating a downlink data transmission procedure in a wireless communication system according to an embodiment of the present disclosure.

FIG. 7 illustrates a case of receiving downlink data #1 and #2 from a core network 770, and illustrates various embodiments of the present disclosure in which the downlink data #1 is received in an antenna #1 of a terminal 700 via a base station 1 710 (Cell-1), and the downlink data #2 is received in an antenna #2 of the terminal 700 via the base station 1 720 (Cell-2).

Referring to FIG. 7, a gateway 760 receives downlink data #1 from the core network 770 at operation 701. The destination of the downlink data #1 is the terminal 700.

At operation 703, the gateway 760 selects a base station which will transmit the downlink data #1. In other words, the gateway 760 selects one serving cell which will transmit the downlink data #1 based on a table storing access cell information of the terminal 700. At this point, the gateway 760 may consider at least one of radio link quality information for each serving cell of the terminal 700, load information for each serving cell, service information for each serving cell, a service type, and a QoS level stored in the table.

At operation 705, the gateway 760 transmits the downlink data #1 to the selected serving cell. The present disclosure assumes the base station 1 710 has been selected. For example, the gateway 760 transmits the downlink data #1 to the base station 1 710.

At operation 707, the base station 1 710 that has received the downlink data #1 from the gateway 760 performs a layer-2 process on the downlink data #1. At this point, the base station 1 710 may add integrity information of a data packet and perform compression of a header in a PDCP lower layer. In addition, the base station 1 710 may concatenate or fragment a data packet in an RLC lower layer.

At operation 709, the base station 1 710 allocates a resource for transmitting the downlink data #1. In other words, the base station 1 710 allocates a time and a frequency for transmission of the downlink data #1 in the MAC lower layer.

At operation 711, the base station 1 710 transmits the downlink data #1 to the terminal 700. For example, the base station 1 710 converts the downlink data #1 to a physical signal in the PHY lower layer of the layer-1, and transmits the physical signal to the antenna #1 of the terminal 700. The terminal 700 receives the signal via the antenna 2, performs a layer-2 process, and then transfers the same to the layer-3.

At operation 713, the gateway 760 receives downlink data #2 from the core network 770. The destination of the downlink data #2 is the terminal 700.

At operation 715, the gateway 760 selects a base station which will transmit the downlink data #2. In other words, the gateway 760 selects one serving cell which will transmit the downlink data #2 based on a table storing access cell information of the terminal 700. At this point, the gateway 760 may consider at least one of radio link quality information for each serving cell of the terminal 700, load information for each serving cell, service information for each serving cell, a service type, and a QoS level stored in the table.

At operation 717, the gateway 760 transmits the downlink data #2 to the selected serving cell. The present disclosure assumes the base station 2 720 has been selected. For example, the gateway 760 transmits the downlink data #2 to the base station 2 720.

At operation 719, the base station 2 720 that has received the downlink data #2 from the gateway 760 performs a layer-2 process on the downlink data #2. At this point, the base station 2 720 may add integrity information of a data packet and perform compression of a header in a PDCP lower layer. In addition, the base station 2 720 may concatenate or fragment a data packet in an RLC lower layer.

At operation 721, the base station 2 720 allocates a resource for transmitting the downlink data #2. In other words, the base station 2 720 allocates a time and a frequency for transmission of the downlink data #2 in the MAC lower layer.

At operation 723, the base station 2 720 transmits the downlink data #2 to the terminal 700. For example, the base station 2 720 converts the downlink data #2 to a physical signal in the PHY lower layer of the layer-1, and transmits the physical signal to the antenna #2 of the terminal 700. The terminal 700 receives the signal via the antenna 2, performs a layer-2 process, and then transfers the same to the layer-3.

Figure 8:
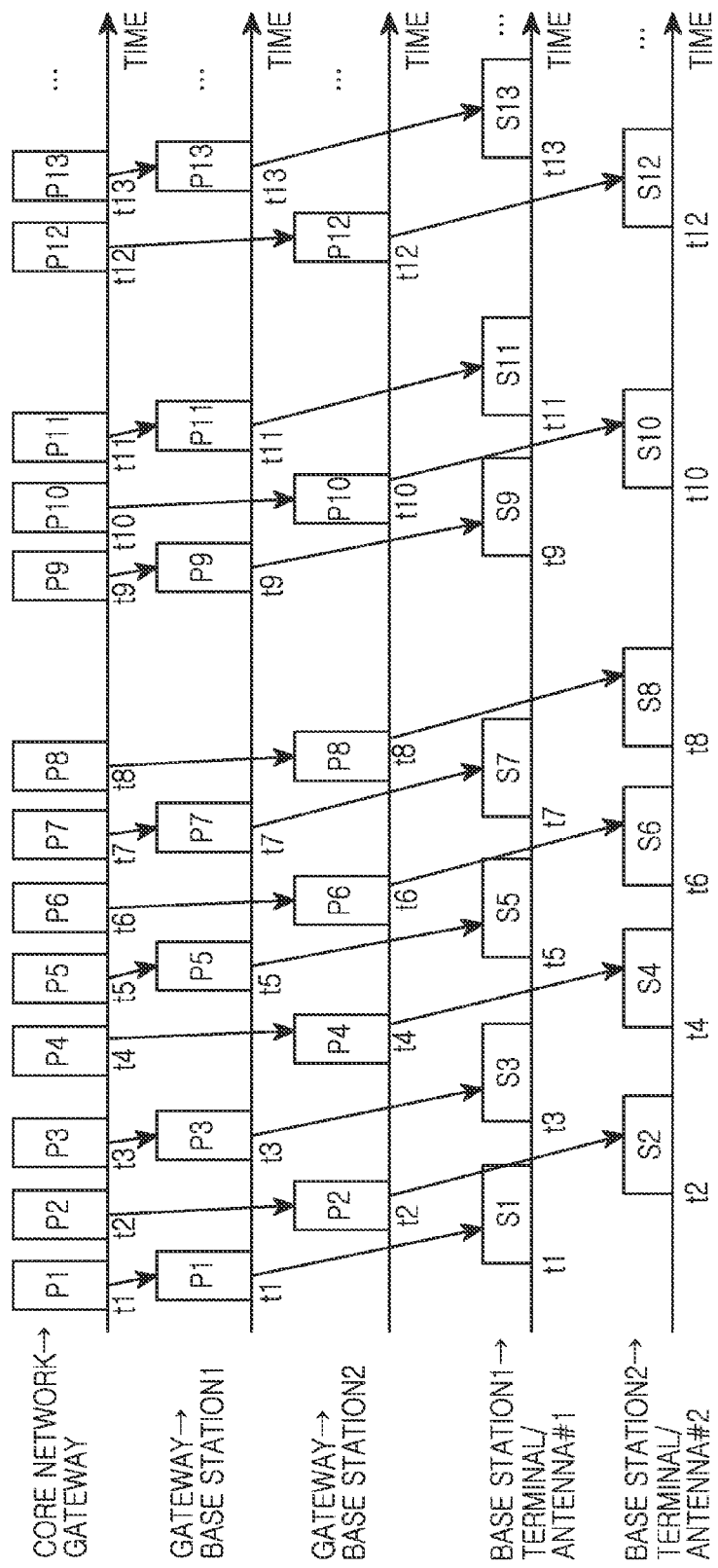
FIGS. 8 and 9 are views illustrating examples of transmitting a downlink data packet and a signal in a wireless communication system according to an embodiment of the present disclosure.
Figure 9:
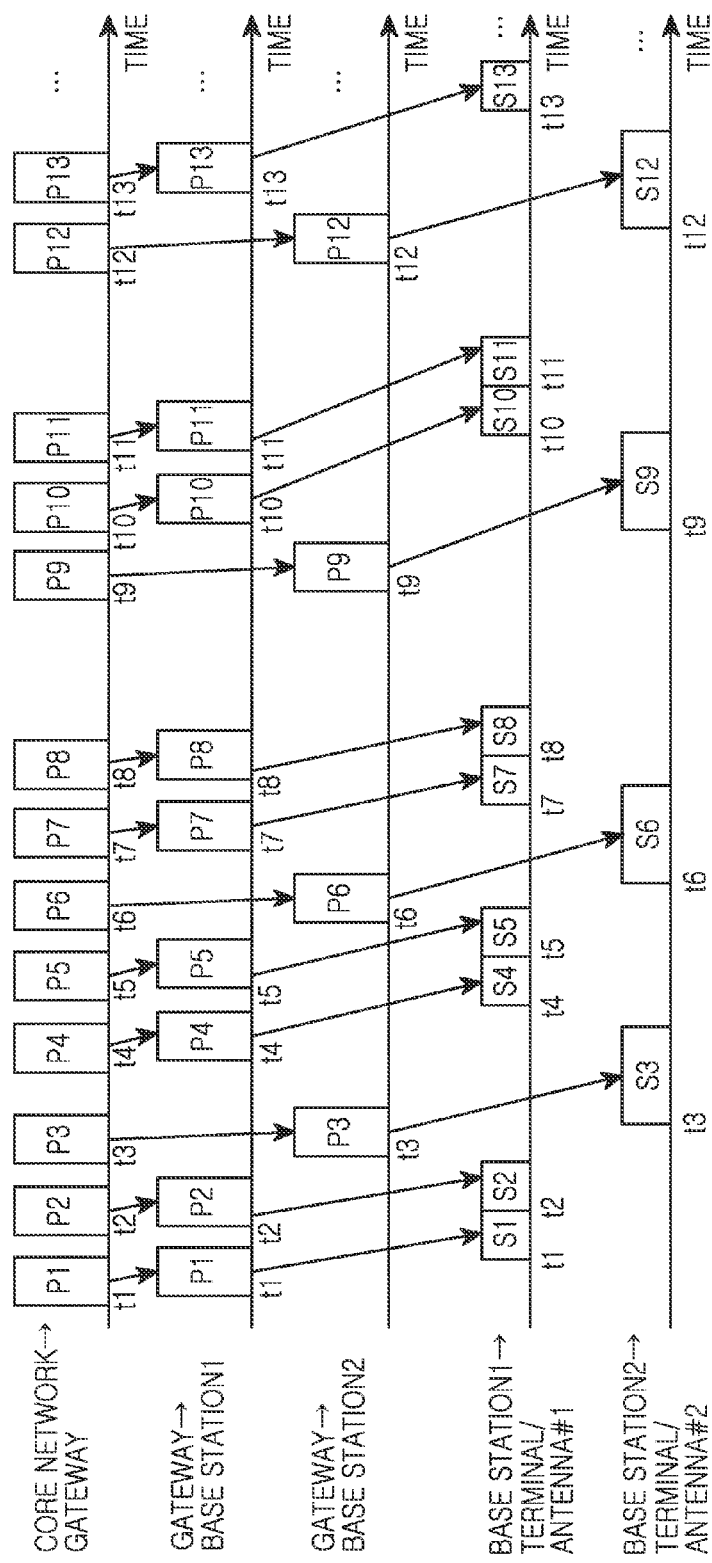

FIGS. 8 and 9 are views illustrating examples of transmitting a downlink data packet and a signal in a wireless communication system according to an embodiment of the present disclosure.

In the case in which one terminal has accessed a cell of the base station 1 and a cell of the base station 2 simultaneously via two antennas A1 and A2, the gateway transfers data packets P1, P2, P3, P4, and/or the like, received from the core network to the terminal via the base station 1 and the base station 2. In the case in which radio link qualities for the two antennas of the terminal and the cells are similar, the gateway may transfer a packet to the two base stations at the same ratio.

FIG. 8 illustrates a case of selecting two base stations at the same ratio and transmitting a packet according to an embodiment of the present disclosure.

Referring to an example of FIG. 8, the gateway transfers odd-numbered packets P1, P3, P5, and/or the like, to the base station 1, and transfers even-numbered packets P2, P4, P6, and/or the like, to the base station 2. Thereafter, the base station 1 allocates a radio resource for transmitting a data packet to the terminal, passes through a layer-2 process procedure, and then generates layer-1 signals S1, S3, S5, and/or the like, and transmits the same to the terminal. Similarly, the base station 2 transmits signals S2, S4, S6, and/or the like, to the terminal. As described above, the terminal receives a signal for a data packet via the two antennas, and may receive a data packet from only one of two cells in one instant, and receive signals of different packets simultaneously from the two cells in another instant.

Receiving a signal from the one cell or receiving signals from a plurality of cells simultaneously is determined based on the size of a data packet, a speed at which a packet arrives, radio link quality of each cell, a transmission rate, and/or the like. For example, in case of FIG. 8, during a section from a time t1 and a time t2, only the base station 1 transmits a signal S1 to the terminal. However, during a section from the time 2 to a point before the base station 1 completes transmission of the signal S1, both the base station 1 and the base station 2 transmit a signal to the terminal.

In contrast to FIG. 8, FIG. 9 illustrates, in the case in which radio link quality of a terminal antenna A1 is better than an antenna A2, the gateway distributes data packets transferred to the base station 1 and the base station 2 at a ratio of about 2:1.

According to various embodiments of the present disclosure, a terminal transfers measurement information regarding radio link quality of at least one serving cell to a base station periodically or non-periodically. Accordingly, the base station transfers the latest radio link quality information of at least one serving cell of the terminal to the gateway, and the gateway changes a table using the latest information and performs data packet scheduling. The radio link quality information includes at least one of an average data transmission rate for the terminal, CQI, Modulation and Coding Scheme (MCS), and a bandwidth.

In the 3rd generation Wideband Code Division Multiple Access (WCDMA) wireless network according to the related art, a Radio Network Controller (RNC) schedules a layer-2 MAC PDU, and a base station or a node B generates and transmits a layer-1 PHY signal. In case of a CoMP of the 4th generation mobile communication network according to the related art, a gateway or a CoMP scheduler schedules radio resources of all cooperative base stations and cells to select the same. However, in case of a system according to various embodiment of the present disclosure, a gateway selects one cell which will transmit a data packet, and transfers a data packet to a base station of the selected cell. In addition, the base station allocates a radio resource for transmitting the data packet to a terminal, passes through a layer-2 process procedure, and generates and transmits a layer-1 signal. For example, the present disclosure is different from the 3rd generation WCDMA wireless network according to the related art, and different from a 4th generation Cooperative Multi-Point (CoMP) technology according to the related art.

In addition, in the soft-handover technology according to the related art, a plurality of cells transmit the same data simultaneously in transmitting data to a terminal positioned at the boundary of the plurality of cells. However, in case of a system according to various embodiment of the present disclosure in which a plurality of cells communicating with one terminal transmit different packets to a terminal, such a system is different from the soft-handover according to the related art.

Various embodiments of the present disclosure related to a case in which a base station and a terminal use one frequency carrier, and is different from the carrier aggregation technology according to the related art in which both a base station and a terminal perform communication using a plurality of carriers simultaneously.

Various embodiments of the present disclosure relate to a case in which a terminal communicates with a plurality of base stations using a plurality of antennas and uses the same radio interface technology, and is different from the technology according to the related art in which a terminal accesses a plurality of different systems simultaneously using different radio interface technologies, for example, the technology according to the related art that accesses a cellular mobile communication system and a wireless LAN system simultaneously.

As described above, for a gateway to select a cell which will transfer data to a terminal that has accessed a plurality of cells, a cell selection scheduling algorithm is required.

For example, an algorithm that has transformed a Proportional Fair (PF) algorithm may be used as an embodiment of the present disclosure. For example, an embodiment of the present disclosure of a scheduling algorithm where the gateway selects a cell transmitting downlink data may be expressed by Equation (1) below.

$$c = \underset{c \in C_u}{\operatorname{argmax}} \frac{R_{c,u}[k]}{T_{c,u}[k]} \quad \text{Equation (1)}$$

where c is an index of a selected cell, $C_u$ is a set of cells which a terminal u has accessed, $R_{c,u}[k]$ is a data transmission rate when a k-th packet is transmitted to a terminal u via a cell c, and $T_{c,u}[k]$ is an amount of data transmitted to a terminal u via a cell c with consideration of up to a (k−1)-th packet.

$T_{c,u}[k]$ of Equation (1) may be defined by Equation (2) below.

$$T_{c,u}[k+1] = \begin{cases} (1 - t_0^{-1})T_{c,u}[k] + (t_0^{-1})P_u[k]\rho_c[k], & \text{when cell } c \text{ is selected for } k\text{-}th \text{ packet transmission} \\ (1 - t_0^{-1})T_{c,u}[k], & \text{otherwise} \end{cases} \quad \text{Equation (2)}$$

where $T_{c,u}[k]$ is an amount of data transmitted to a terminal u via a cell c with consideration of up to a (k−1)-th packet, $P_u[k]$ is a size of a k-th packet for a terminal u, $\rho_c[k]$ is an index representing a load level of a cell c when a k-th packet is transmitted and has a value of 0 to 1, and $t_0$ is a time constant of a moving average for obtaining an average value of a packet size.

In Equation (2), $R_{c,u}[k]$ and $\rho_c[k]$ values for the cell c are values which a base station, for example, a cell c informs to the gateway, and $t_0$ is a system parameter that may be selected when a business operates the gateway.

According to various embodiments of the present disclosure, in a scheduling algorithm for selecting a cell at the gateway, a transmission rate value $R_{c,u}[k]$ and a load level value $\rho_c[k]$ of each cell are used simultaneously, so that the performance of the whole wireless network may improve.

In an uplink, a terminal selects one cell among a plurality of serving cells every data packet, and transmits an uplink data packet via the selected one cell. The base station that has received an uplink data packet transfers the data packet to the gateway, and the gateway transmits the data to a core network. At this point, a cell selected for uplink data packet transmission by the terminal may change every data packet. At this point, base stations do not need to cooperate with other base stations in receiving uplink data. Before a process for transmitting one uplink data packet to one cell is completed, the terminal may transmit another uplink data packet to another cell. Alternatively, after completing transmission of one packet to one cell, the terminal may transmit the next packet to the same cell or another cell.

Figure 10:
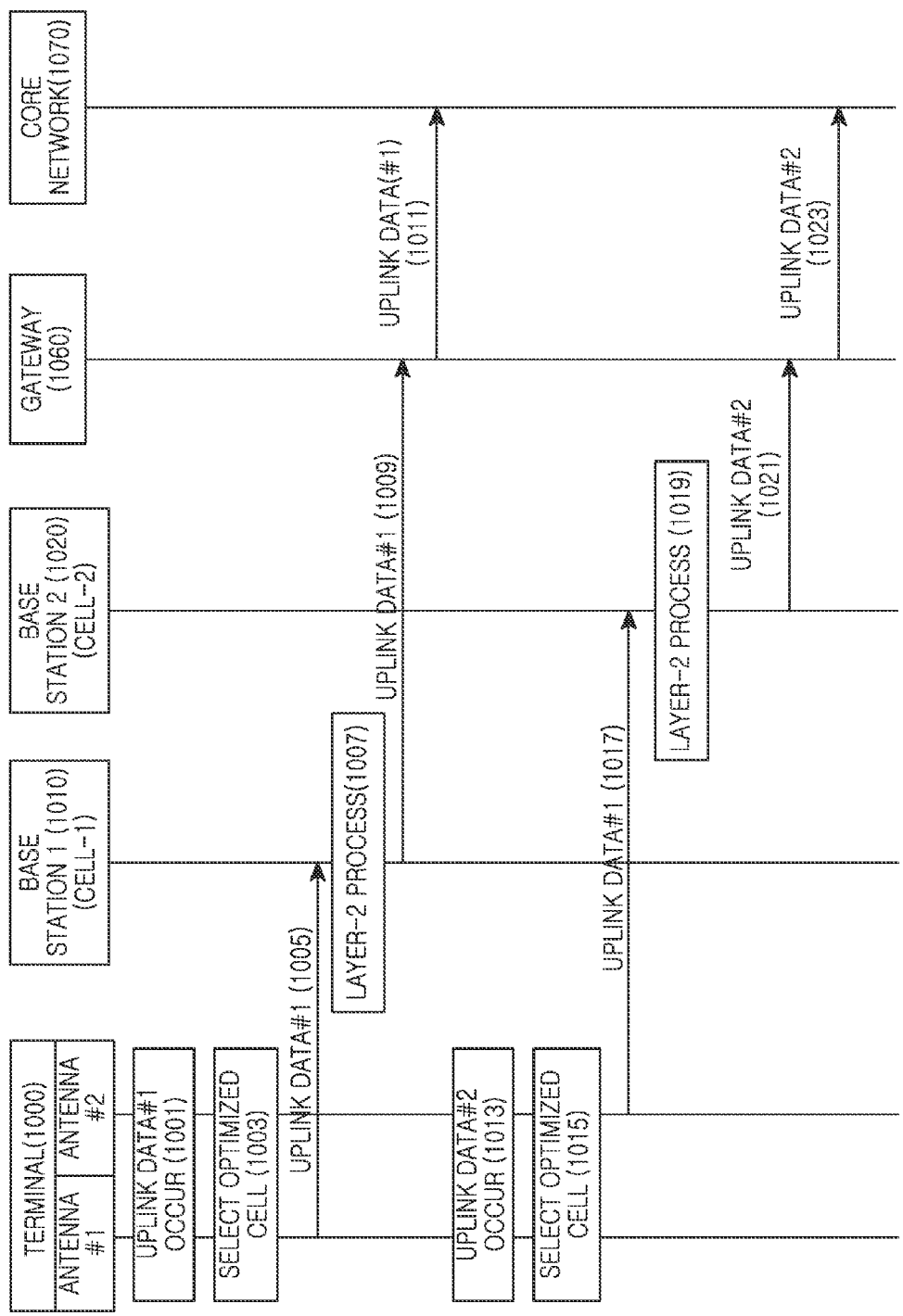
FIG. 10 is a view illustrating an uplink data transmission procedure in a wireless communication system according to an embodiment of the present disclosure.

FIG. 10 is a view illustrating an uplink data transmission procedure in a wireless communication system according to an embodiment of the present disclosure.

FIG. 10 illustrates a case in which uplink data #1 and #2 occur from a terminal 1000, and illustrates an embodiment where the uplink data #1 is transmitted from an antenna #1 of the terminal 1000 to a core network 1070 via a base station 1 1010 (cell-1) and a gateway 1060, and the uplink data #2 is transmitted from an antenna #2 of the terminal 1000 to the core network 1070 via a base station 2 1020 (cell-2) and the gateway 1060.

Referring to FIG. 10, at 1001, uplink data #1 occurs in the terminal 1000. The uplink data #1 is data transmitted to an external network via the core network 1070.

At operation 1003, the terminal 1000 selects an optimized cell which will transmit the uplink data #1. Specifically, the terminal 1000 selects one optimized cell among a plurality of serving cells with consideration of at least one of radio link quality and a base station load. In case of FIG. 10, the present disclosure assumes that the terminal 1000 selects an antenna #1/the base station 1 1010 as an optimized cell.

At operation 1005, the terminal 1000 transmits the uplink data #1 to the base station 1 1010. For this purpose, although not illustrated in FIG. 10, the terminal 1000 may request the base station 1 1010 to allocate a radio resource, and transmit the uplink data #1 via the allocated resource. At this point, the terminal 1000 generates a physical signal via a layer-2 process and a layer-1 process, and then transmits the signal.

At operation 1007, the base station 1 1010 that has received the uplink data #1 performs a layer-2 process on the uplink data #1. At this point, the base station 1 1010 performs reassembly on the uplink data #1 in an RLC lower layer, and performs header compression release on the uplink data #1 in a PDCP lower layer. In addition, the base station 1 1010 performs an integrity test on the uplink data #1, and when the uplink data #1 cannot pass the integrity test, the base station 1 1010 may discard the uplink data #1.

At operation 1009, the base station 1 1010 transmits the uplink data #1 to the gateway 1060.

At operation 1011, the gateway 1060 transmits the uplink data #1 to the core network 1070.

At operation 1013, uplink data #2 occurs in the terminal 1000. The uplink data #2 is a data transmitted to the external network via the core network 1070.

At operation 1015, the terminal 1000 selects an optimized cell which will transmit the uplink data #2. For example, the terminal 1000 selects one optimized cell among a plurality of serving cells with consideration of at least one of radio link quality and a base station load. In case of FIG. 10, the present disclosure assumes that the terminal 1000 selects an antenna #2/the base station 2 1020 as an optimized cell.

At operation 1017, the terminal 1000 transmits the uplink data #2 to the base station 2 1020. For this purpose, though not illustrated in FIG. 10, the terminal 1000 may request the base station 2 1020 to allocate a radio resource, and transmit the uplink data #2 via the allocated resource. At this point, the terminal 1000 generates a physical signal via a layer-2 process and a layer-1 process, and then transmits the signal.

At operation 1019, the base station 2 1020 that has received the uplink data #2 performs the layer-2 process on the uplink data #2. At this point, the base station 2 1020 performs reassembly on the uplink data #2 in the RLC lower layer, and performs header compression release on the uplink data #2 in the PDCP lower layer. In addition, the base station 2 1020 performs an integrity test on the uplink data #2, and when the uplink data #2 cannot pass the integrity test, the base station 2 1020 may discard the uplink data #2.

At operation 1021, the base station 2 1020 transmits the uplink data #2 to the gateway 1060.

At operation 1023, the gateway 1060 transmits the uplink data #2 to the core network 1070.

Figure 11:
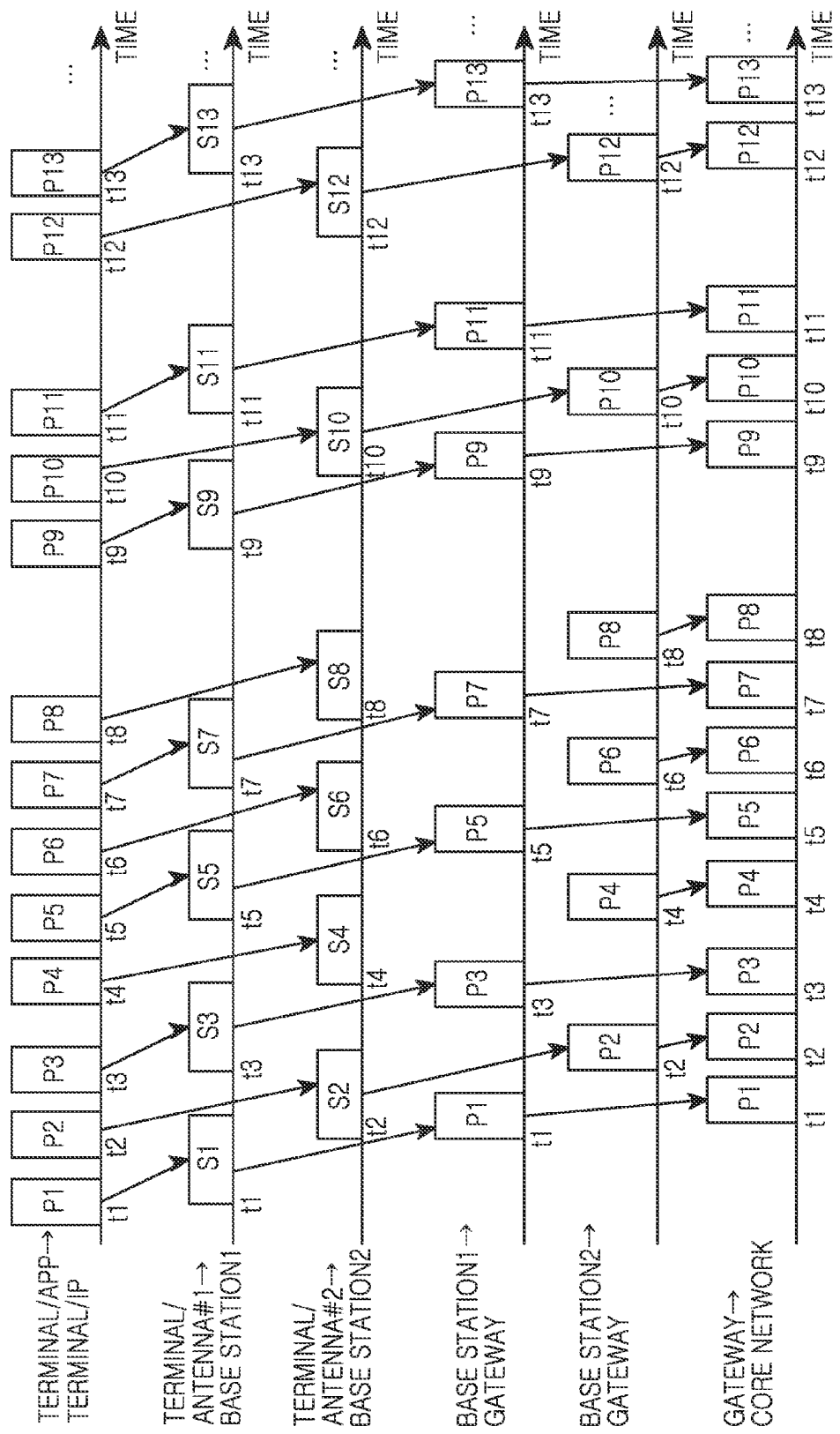
FIG. 11 is a view illustrating examples of transmitting an uplink data packet and a signal in a wireless communication system according to an embodiment of the present disclosure.

FIG. 11 is a view illustrating examples of transmitting an uplink data packet and a signal in a wireless communication system according to an embodiment of the present disclosure.

Referring to FIG. 11, a terminal transmits each uplink data packet to a base station 1 and a base station 2 via a plurality of antennas A1 and A2. The terminal generates IP packets P1, P2, P3, and/or the like, from APP layer data. Subsequently, the terminal transmits each data packet to the base station 1 or the base station 2, and at this point, selects one base station every packet to transmit data. In other words, the terminal generates layer-1 signals S1, S3, S5, and/or the like, or S2, S4, S6, and/or the like, of a packet which the terminal desires to transmit, and transmits the same. The base station 1 and the base station 2 transmit data packets P1, P3, P5, and/or the like, or P2, P4, P6, and/or the like, received from the terminal to the gateway, and the gateway transfers the data packets received from the base station 1 and the base station 2 to the core network.

According to various embodiments of the present disclosure, a method for raising transmission/reception performance of data and control information by a wireless network operation when a terminal moves among a plurality of cells is described below.

Figure 12:
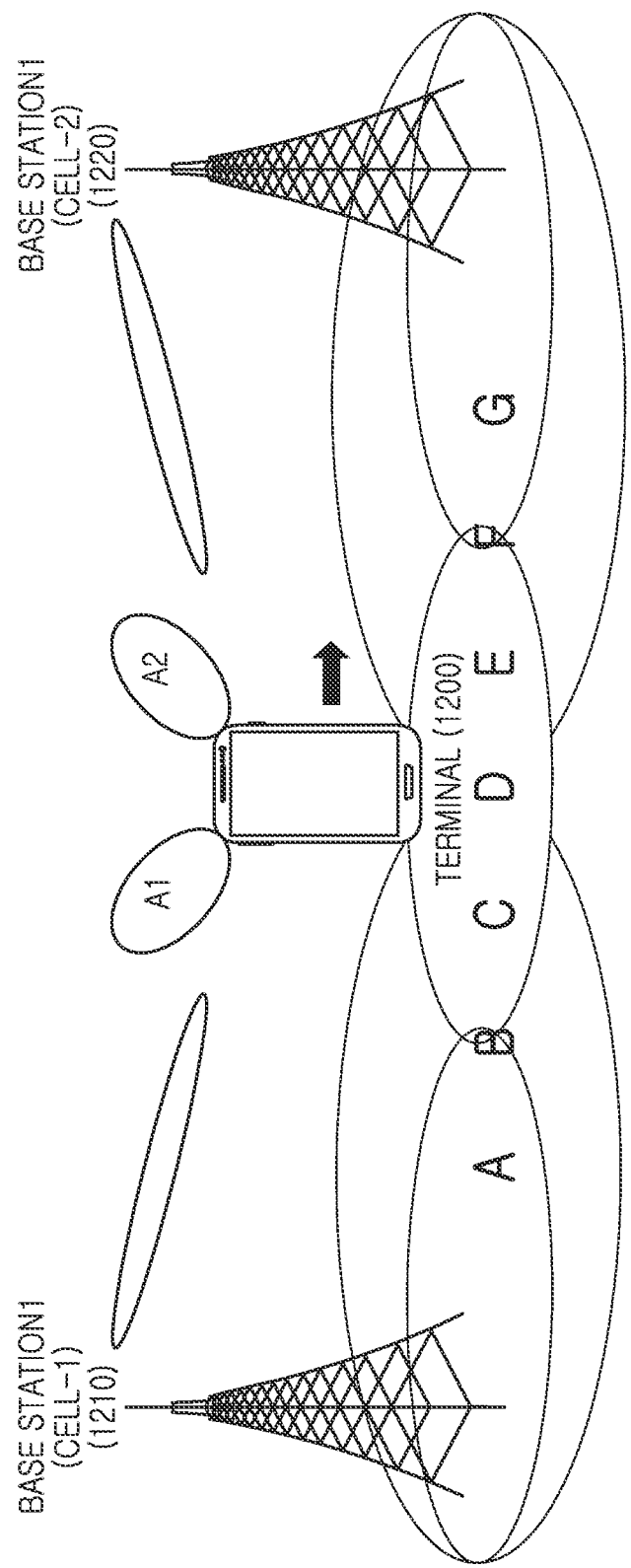
FIG. 12 is a view illustrating an example of a position of a terminal in a wireless communication system according to an embodiment of the present disclosure.

FIG. 12 is a view illustrating an example of a position of a terminal in a wireless communication system according to an embodiment of the present disclosure.

Referring to FIG. 12, in the case in which the one terminal 1200 having a plurality of antennas communicates with a plurality of cells, a cell range for the same base station is different depending on an antenna. Therefore, at a specific position, the terminal 1200 is positioned inside a cell with respect to an antenna A1 of the terminal 1200, so that radio link quality may be very excellent, but the terminal 1200 is positioned on the boundary of the cell with respect to an antenna A2, so that radio link quality may be very poor. In FIG. 12, in case of a point B, when a cell of the base station 1 1210 is considered, the terminal is positioned inside the cell with respect to the antenna A1 but is positioned on the cell boundary with respect to the antenna A2.

Therefore, in the case in which the terminal 1200 is positioned on the point B, the gateway solves a problem that a transmission rate reduces due to poor radio link quality at the cell boundary by transmitting downlink data to the antenna A1 via a cell-1 1210 of the base station 1 1210, and not transmitting the downlink data to the antenna A2. In addition, in the case in which the terminal 1200 is positioned on the point B, the terminal 1200 transmits uplink data to the antenna A1 and the cell-1 1210, and does not transmit the uplink data via the antenna A2.

In the case in which the terminal 1200 is positioned on the point F, unlike the point B, radio link quality for the antenna A1 is poor, so that the terminal 1200 does not transmit data via the antenna A1 and transmits data via only the antenna A2 and the cell-2 1220, thereby solving a data transmission rate reduction problem at the cell boundary.

Referring to FIG. 12, in the case in which the terminal 1200 is positioned at the point C, the point D, and the point E, an optimized cell of the antenna A1 is the cell-1 1210, and an optimized cell of the antenna A2 is the cell-2 1220, so that respective antennas perform communication with different optimized cells.

In the case in which the terminal 1200 is positioned at the point A, the optimized cell for both the antenna A1 and the antenna A2 is the cell-1 1210, and the terminal 1200 performs communication with the cell-1 1210 using both two antennas. In contrast, in the case in which the terminal 1200 is positioned at the point G, the optimized cell for both the antenna A1 and the antenna A2 is the cell-2 1220, and the terminal 1200 performs communication with the cell-2 1220 using both two antennas.

In the case in which the terminal 1200 is positioned at the point C, the point D, and the point E, the terminal 1200 accesses the cell-1 1210 and the cell-2 1220 simultaneously using both two antennas. Therefore, the terminal 1200 distributes data based on the loads of the cell-1 1210 and the cell-2 1220 when selecting a cell for transmission of data of the terminal 1200, so that a cell load balancing effect may be additionally obtained. For example, in the case in which radio link qualities of the terminal 1200 with respect to two cells which the terminal 1200 accesses are the same but the loads of the two cells are different (e.g., the load of the cell-1 1210 is 60%, and the load of the cell-2 1220 is 30%), the gateway or the terminal 1200 may adjust loads between the two cells by distributing (e.g., the cell-1 1210 is 33% selected, and the cell-2 1220 is 67% selected) packets in inverse proportion to a cell load.

The load balancing according to various embodiments of the present disclosure is different from the load balancing method according to the related art. The load balancing method according to the related art adjusts the load of a cell via admission control. As a representative example, to reduce the load of a certain cell whose load is high, a base station does not allow admission of a terminal which intends to migrate to the base station via a handover, or allows a portion of terminals belonging to the base station to forcibly perform a handover to a neighbor cell. According to the method according to the related art, because both power of an uplink signal and power of a downlink signal for a terminal which has been hand-overed to the neighbor cell should be raised, both power consumption of the terminal and power consumption of the base station increase, and inter-cell interference increases. However, in load balancing according to various embodiments of the present disclosure, the gateway may adjust a cell load by adjusting cell selection, so that the problem of the method according to the related art does not occur.

A system according to various embodiments of the present disclosure may control data of an application whose packet size is small and which is sensitive to a small delay such as Voice over IP (VoIP) or data for a game to be transferred to only an optimized cell of the terminal 1200. For example, at the point A, the point B, and the point C of FIG. 12, because an optimized cell of the terminal 1200 is the cell-1 1210, the gateway or the terminal 1200 transmits/receives the VoIP or the game data via the cell-1 1210 and the antenna A1. At the point E, the point F, and the point G of FIG. 12, because an optimized cell of the terminal 1200 is the cell-2 1220, the gateway or the terminal 1200 transmits/receives the VoIP or the game data via the cell-2 1220 and the antenna A2. The point D of FIG. 12 is a boundary at which the optimized cell of the terminal 1200 changes, the gateway or the terminal 1200 changes a path of transmitting/receiving the VoIP or the game data.

A path change due to change of the optimized cell is different from the handover according to the related art. According to the handover of the related art, in the case in which a terminal moves from a serving base station to a target base station, the serving base station transfers data remaining in a buffer of the serving base station to the target base station, and the target base station transmits the data again, so that a transmission delay occurs. However, in a system according to an embodiment of the present disclosure, even when an optimized cell changes at the point D of FIG. 12, the previous optimized cell continues to transmit remaining data, and after an optimized cell change, only a new optimized cell transmits/receives data. For example, because data transfer between base stations is not needed, a transmission delay is prevented.

Table 2 shows an example of a result of selecting a cell which will transmit/receive data with consideration of radio link quality of an antenna as described above, at the position of the terminal 1200 illustrated in FIG. 12.

TABLE 2

| Position | A | B | C | D | E | F | G |
|---|---|---|---|---|---|---|---|
| Antenna A1 | cell-1 | cell-1 | cell-1 | cell-1 | cell-1 | — | cell-2 |
| Antenna A2 | cell-1 | — | cell-2 | cell-2 | cell-2 | cell-2 | cell-2 |

Referring to Table 2, in case of the point B, the antenna A2 is positioned at the cell boundary, and in case of the point F, the antenna A1 is positioned at the cell boundary, any cell is not selected. In addition, because the point D is a point at which radio link qualities of serving cells of respective antennas are similar, the point D may be a point at which cell switching is performed with respect to a service sensitive to a delay.

According to various embodiments of the present disclosure, when a terminal transmits/receives data to/from a plurality of cells using a plurality of antennas, each cell transmits/receives data and control information to/from another cell independently. However, in case of specific control information, it may be advantageous to transmit/receive it via a cell whose radio link quality is best. For example, in case of handover-related control information, because it is general that the handover-related control information is transmitted/received at a cell boundary, it is advantageous to transmit/receive the handover-related control information via a cell whose radio link quality is best for reliability of transmission/reception. Hereinafter, the present disclosure is described using the handover-related control information as an example.

When independence for each antenna of the control information is strictly applied, in the case in which the terminal 1200 is positioned at the point B of FIG. 12, the terminal 1200 should transmit a measurement report to a base station in order to change a cell of the antenna A2, and the base station should transmit RRC connection reconfiguration message indicating cell change to the terminal 1200.

However, according to various embodiments of the present disclosure, the terminal transmits handover-related control information via a cell whose radio link quality is best regardless of a serving cell for each antenna. Specifically, the terminal 1200 does not transmit a handover-related control message via the antenna A2 that changes a cell, but transmits/receives the handover-related control message via the antenna A1 and the cell-1 1210 whose radio link quality is good. Accordingly, the cell-1 1210 transfers this handover-related control message to the cell-2 1220 via an X2 interface.

Similarly, in the case in which the terminal 1200 is positioned at the point F of FIG. 12, the terminal intends to change a cell for the antenna A1. At this point, the terminal 1200 transmits/receives the handover-related control message via the antenna A2 and the cell-2 1220, not the antenna A1. In addition, the cell-2 1220 transfers the handover-related control message to the cell-1 1210 via the X2 interface.

Because a handover is not performed at other points of FIG. 12, the terminal 1200 transmits/receives control information and data independently for each antenna. As described above, by transmitting/receiving a handover message via an antenna and a cell having an always optimized radio link, a system according to various embodiments of the present disclosure may raise a transmission rate for control information and remarkably reduce a delay at a cell boundary.

Table 3 shows an example of a result of selecting a cell which will transmit/receive control information with consideration of radio link quality of an antenna as described above, at the position of the terminal 1200 illustrated in FIG. 12.

TABLE 3

| Position | A | B | C | D | E | F | G |
|---|---|---|---|---|---|---|---|
| Antenna A1 | cell-1 | cell-1 | cell-1 | cell-1 | cell-1 | — | cell-2 |
| Antenna A2 | cell-1 | — | cell-2 | cell-2 | cell-2 | cell-2 | cell-2 |

Referring to Table 3, in case of the point B, control information for the cell-2 may be transmitted/received via the cell-1, and in case of the point F, control information for the cell-1 may be transmitted/received via the cell-2.

According to various embodiments of the present disclosure, not only the handover-related control message but also other control messages exchanged between a terminal and a gateway may be transmitted/received via only an optimized cell. For example, a terminal position information update message, a network access release request message, and/or the like, may be transmitted/received via only the optimized cell.

Figure 13:
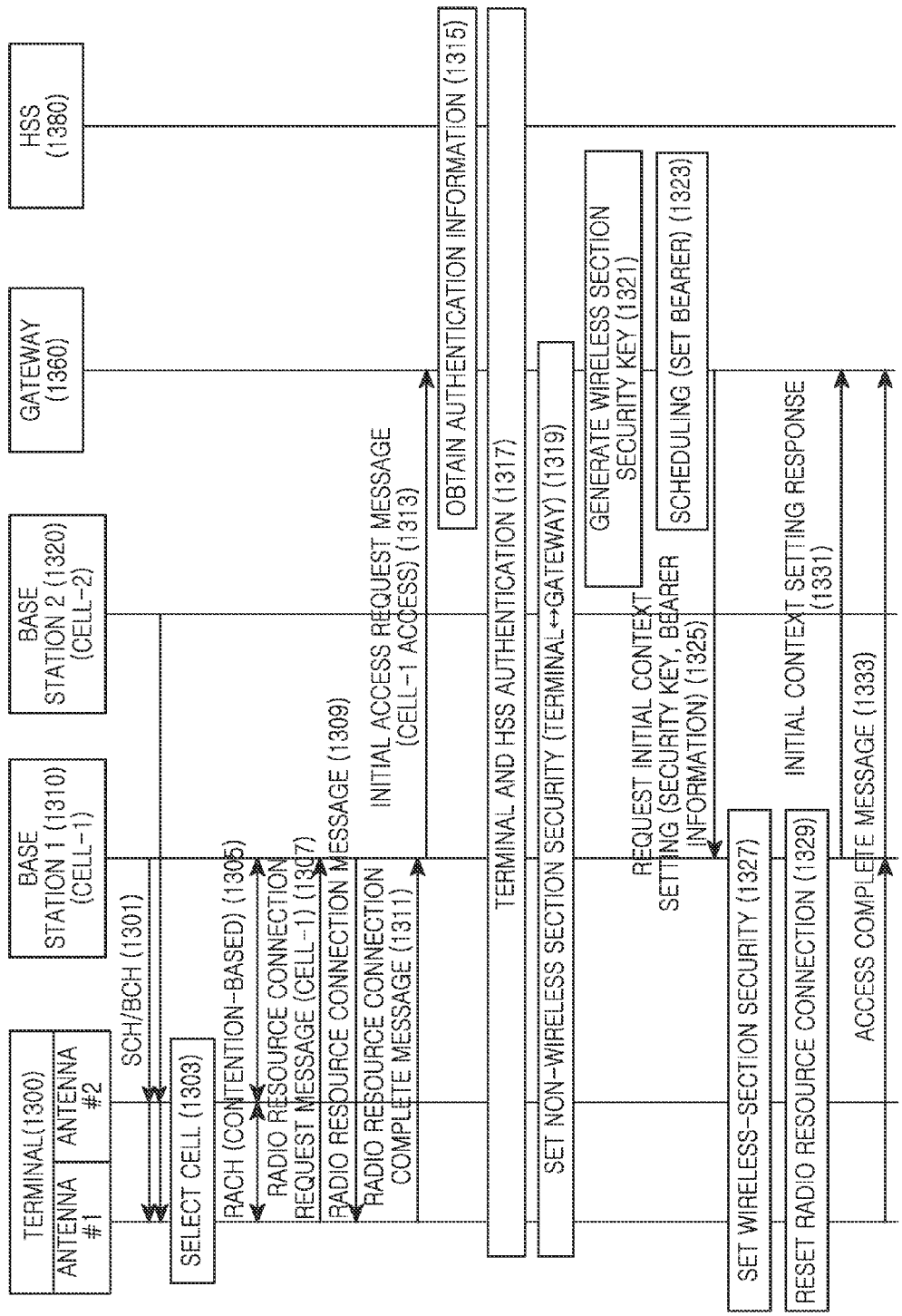
FIG. 13 is a view illustrating a single cell access procedure in a wireless communication system according to an embodiment of the present disclosure.

FIG. 13 is a view illustrating a single cell access procedure in a wireless communication system according to an embodiment of the present disclosure.

An embodiment illustrated in FIG. 13 may be performed in the case in which a terminal 1300 is positioned at the point A or the point G in FIG. 12. According to an embodiment illustrated in FIG. 13, the terminal 1300 selects an optimized single cell and performs an initial access procedure with consideration of both the antenna #1 and the antenna #2.

Referring to FIG. 13, at operation 1301, the terminal 1300 receives a Synchronization CHannel (SCH) and a Broadcast CHannel (BCH) from a base station 1 1310 (cell-1) and a base station 2 1320 (cell-2). The terminal 1300 obtains base station synchronization by receiving the SCH. The terminal 1300 obtains system information of each base station via the BCH.

At operation 1303, the terminal 1300 selects an optimized cell based on radio signal quality, a load level of a cell, and/or the like, with consideration of all antennas. In case of FIG. 13, the present disclosure assumes the base station 1 1310 has been selected.

At operation 1305, the terminal 1300 performs a random access procedure via a Random Access CHannel (RACH) in order to obtain an uplink resource from the base station 1 1310. The random access procedure may be contention-based performed. Specifically, the terminal 1300 transmits a random access preamble to the base station 1 1310. In the case in which the base station 1 1310 receives the random access preamble successfully, the base station 1 1310 allocates an uplink resource by transmitting a random access response. At this point, because a preamble transmitted by the terminal 1300 is arbitrarily selected, in the case in which the plurality of terminals 1300 perform transmission using the same preamble, collision may occur.

At operation 1307, the terminal 1300 transmits a radio resource connection request message to the base station 1 1310 using the uplink resource allocated by the base station 1 1310. In FIG. 13, the present disclosure assumes a case in which the terminal 1300 selects the cell-1 1310 and transmits a message via the cell-1 1310.

At operation 1309, the base station 1 1310 determines whether radio resource connection requested by the terminal 1300 is possible. When the radio resource connection is determined to be possible, the terminal 1300 transmits a radio resource connection message. In the case in which the connection is determined not to be possible, subsequent steps are not performed.

At operation 1311, the terminal 1300 sets a radio resource based on radio resource information obtained via the radio resource connection message, and then transmits a radio resource connection complete message to the base station 1 1310.

At operation 1313, after radio resource connection between the terminal 1300 and the base station 1 1310 is completed, the base station 1 1310 transmits an initial access request message to a gateway 1360 in order to allow the terminal 1300 to access a network. The initial access request message includes an identifier of the terminal 1300 and information of a cell accessed by the cell 1300. In FIG. 13, the present disclosure assumes a case in which the terminal 1300 accesses the cell-1 1310.

At operation 1315, the gateway 1360 obtains information for authenticating the terminal 1300 from a Home Subscriber Server (HSS) 1380 using identifier information of the terminal 1300. The HSS may be denoted by an 'authentication server'. Information for authenticating the terminal 1300 includes at least one of a RANDom number (RAND), an AUthentication TokeN (AUTN), EXpected RESponse (XRES), and Access Security Management Entity (KASME).

At operation 1317, the terminal 1300 and the HSS 1380 perform a mutual authentication procedure based on authentication information obtained from the HSS 1380. The terminal 1300 authenticates the HSS 1380 via an authentication request message transmitted by the gateway 1360, and then generates an authentication response message by generating a RESponse (RES), and transmits the authentication response to the gateway 1360. The gateway 1360 that has received the authentication response determines whether the RES and the XRES coincide, and when they coincide with each other, the gateway 1360 determines the terminal 1300 has a right to access.

At operation 1319, the terminal 1300 and the gateway 1360 perform a non-wireless section security setting procedure to set security (e.g., integrity and encryption) for a message exchanged therebetween. The non-wireless section security setting denotes a procedure for performing integrity and encryption of a Non-Access Stratum (NAS) message directly exchanged between the terminal 1300 and the gateway 1360. For example, the base station 1360 does not examine content of an NAS message received from the terminal 1300 or the gateway 1360 but simply performs a retransmission function. The non-wireless section security setting procedure includes a process according to which when the gateway 1360 transmits a security setting request message, the terminal 1300 receives the security setting request message, and transmits a security setting response message.

At operation 1321, the gateway 1360 generates a wireless section security key based on information obtained from the HSS 1380. A specific procedure of the security key generation may change depending on a security algorithm.

At operation 1323, the gateway 1360 sets bearer information based on QoS information requested by the terminal 1300. A specific procedure for setting the bearer information may change depending on a scheduling policy of the gateway 1360 and an algorithm.

At operation 1325, the gateway 1360 transmits an initial context setting request message to the base station 1 1310. The initial context setting request at operation 1321 and the bearer information generated at operation 1323.

At operation 1327, the base station 1 1310 performs a wireless section security (e.g., integrity and encryption) setting procedure with the terminal 1300 using the wireless section security key.

At operation 1329, the terminal 1300 and the base station 1 1310 perform a wireless resource connection resetting procedure. Through the wireless resource connection resetting procedure, the terminal 1300 and the base station 1 1310 exchange information regarding a wireless section quality report period and method, and/or the like.

At operation 1331, after connection resetting between the terminal 1300 and the base station 1 1310 is completed, the base station 1 1310 transmits an initial context setting response message to the gateway 1360.

At operation 1333, the terminal 1300 transmits an access completion message to the gateway 1360. For example, the terminal 1300 informs the gateway 1360 of final network access completion.

Figure 14:
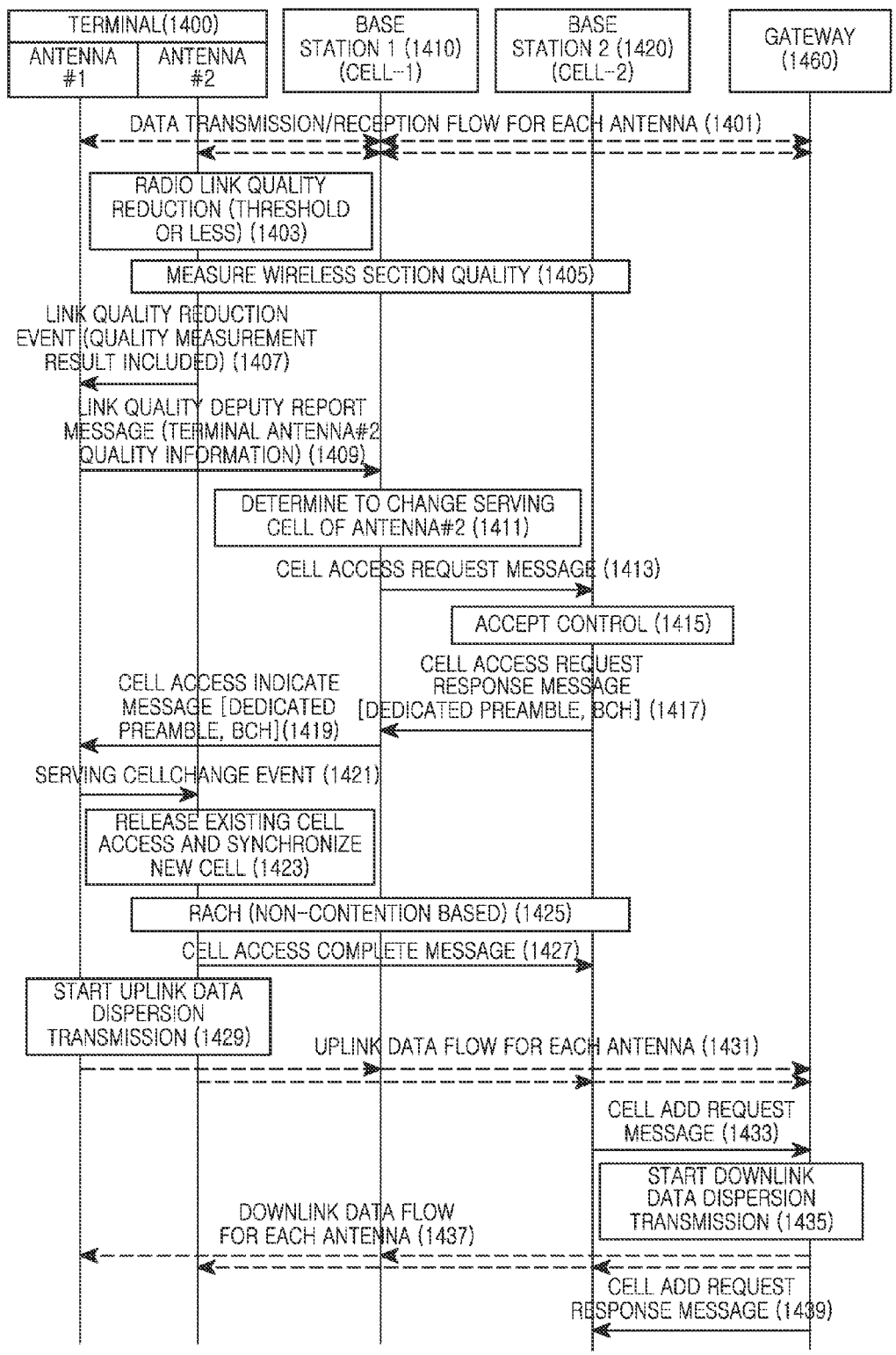
FIG. 14 is a view illustrating a procedure for changing from a single cell access to a multicell access in a wireless communication system according to an embodiment of the present disclosure.

FIG. 14 is a view illustrating a procedure for changing from a single cell access to a multicell access in a wireless communication system according to an embodiment of the present disclosure. An embodiment illustrated in FIG. 14 may be embodied in the case in which a terminal 1400 moves from the point B to the point C in FIG. 12.

According to various embodiments of the present disclosure illustrated in FIG. 14, in the case in which the terminal 1400 moves while accessing a cell-1 1410 via an antenna #1 and an optimized cell of an antenna #2 becomes a cell-2 1420, the terminal 1400 transmits/receives a control message for allowing the antenna #2 to access the cell-2 1420 using the antenna #1 and the cell-1 1410 whose radio link quality is good. Accordingly, cell capacity reduction is prevented, and a fast access speed may be supported.

Referring to FIG. 14, at operation 1401, the terminal 1400 accesses a single optimized cell via a plurality of antennas. The terminal 1400 transmits/receives data via one serving cell using the plurality of antennas. In FIG. 14, the present disclosure assumes the terminal 1400 accesses the base station 1 1410 (cell-1).

At operation 1403, radio link quality of a portion of the plurality of antennas of the terminal 1400 deteriorates to a threshold or less, and the terminal recognizes radio link quality deterioration. For example, the terminal 1400 may recognize radio link quality deterioration by determining whether a packet error frequently occurs in a relevant radio link or whether reception power lowers to a reference value or less. In FIG. 14, the present disclosure assumes the radio link quality of the antenna #2 lowers to a threshold or less.

At operation 1405, the terminal 1400 explores an optimized cell for an antenna whose quality has deteriorated via radio section quality measurement. In FIG. 14, the present disclosure assumes an optimized cell for the antenna #2 is explored. For example, the terminal 1400 measures wireless section quality.

At operation 1407, the antenna #2 of the terminal 1400 whose radio link quality has deteriorated transfers a link quality deterioration event to the antenna #1 whose quality is good. A radio section quality measurement result for the antenna #2 is transferred together.

In At operation 1409, the terminal 1400 transmits a link quality deputy report message to the base station 1 1410 using the antenna #1 whose link quality is good. The link quality deputy report message may include an ID of the antenna #2 whose link quality is poor and quality measurement information that uses the antenna #2.

At operation 1411, the base station 1 1410 determines whether to change a serving cell to the base station 2 1420 based on radio link quality information measured by the terminal 1400. In the case in which it is determined that the serving cell is not changed, subsequent steps are not performed. In FIG. 14, the present disclosure assumes a case in which the base station 2 1420 has determined to change a serving cell of the antenna #2.

At operation 1413, as the base station 1 1410 accepts serving cell change for the antenna #2 of the terminal 1400, the base station 1 1410 transmits a cell access request message to the base station 2 1420.

At operation 1415, the base station 2 1420 determines whether a cell access request is accepted. When the cell access request is not accepted, subsequent steps are not performed. In FIG. 14, the present disclosure assumes the cell access request is accepted.

At operation 1417, as the cell access request is accepted by the base station 2 1420, the base station 2 1420 transmits a cell access request response message to the base station 1 1410 which is the previous serving cell. At this point, to shorten an access time to the base station 2 1420 which is a new cell, the cell access request response message may include at least one of dedicated preamble information and BCH information of the base station 2 1420.

At operation 1419, the base station 1 1410 transmits a cell access indicate message to an antenna of the terminal 1400 whose quality is good. In case of FIG. 14, the cell access indicate message is transmitted to the antenna #1. The cell access indicate message may include at least one of the dedicated preamble information and the BCH information of the base station 2 1420.

At operation 1421, the terminal 1400 that has received the cell access indicate message transfers a serving cell change event to the antenna #2 whose quality is poor. In case of FIG. 14, the present disclosure assumes the antenna #1 transfers an event to the antenna #2.

At operation 1423, the antenna #2 of the terminal 1400 whose equality is poor releases an access with the base station 1 1410 which is an existing serving cell, and performs a synchronization procedure with the base station 2 1420 which is a new cell.

At operation 1425, the antenna #2 of the terminal 1400 performs a random access procedure via RACH in order to obtain an uplink resource from a new cell. At this point, the terminal 1400 may access fast without collision with other terminals using the dedicated preamble and the BCH information received from the base station 1 1410 at operation 1419. Specifically, the terminal transmits the dedicated preamble to the base station 2 1420. In case of receiving the dedicated preamble successfully, the base station 2 1420 allocates an uplink resource by transmitting a random access response.

At operation 1427, the terminal 1400 transmits a cell access complete message to the base station 2 1420. In other words, the terminal 1400 informs the base station 2 1420 of cell access completion.

At operation 1429, the terminal starts uplink data dispersion transmission using a plurality of antennas. Specifically, the terminal 1400 disperses and allocates data to transmit a portion of data via the antenna #1 and transmit the rest of the data via the antenna #2.

At operation 1431, the terminal 1400 transmits uplink data using a plurality of antennas. Specifically, the terminal 1400 transmits uplink data via the base station 1 1410 using the antenna #1, and transmits uplink data via the base station 2 1420 using the antenna #2.

At operation 1433, for downlink data dispersion transmission, the base station 2 1420 transmits a cell addition request message to a gateway 1460. For example, the base station 2 1420 informs a serving cell for a portion of antennas of the terminal has changed, specifically, the base station 2 1420 has been added as a serving cell.

At operation 1435, the gateway 1460 starts downlink data dispersion transmission. For example, the gateway 1460 disperses and allocates data to transmit a portion of data via the base station 1 1410 and transmit the rest of the data via the base station 2 1420.

At operation 1437, the gateway 1460 disperses and transmits downlink data to the base station 1 1410 and the base station 2 1420. Specifically, the gateway 1460 transmits a portion of downlink data via the base station 1 1410 and the rest of the data via the base station 2 1420. Accordingly, the terminal 1400 receives downlink data via the base station 1 1410 using the antenna #1, and receives downlink data via the base station 2 1420 using the antenna #2.

At operation 1439, the gateway 1460 transmits a cell addition request response message to the base station 2 1420. For example, the gateway 1460 informs the base station 2 1420 that a serving cell for the terminal 1400 has been added.

Figure 15:
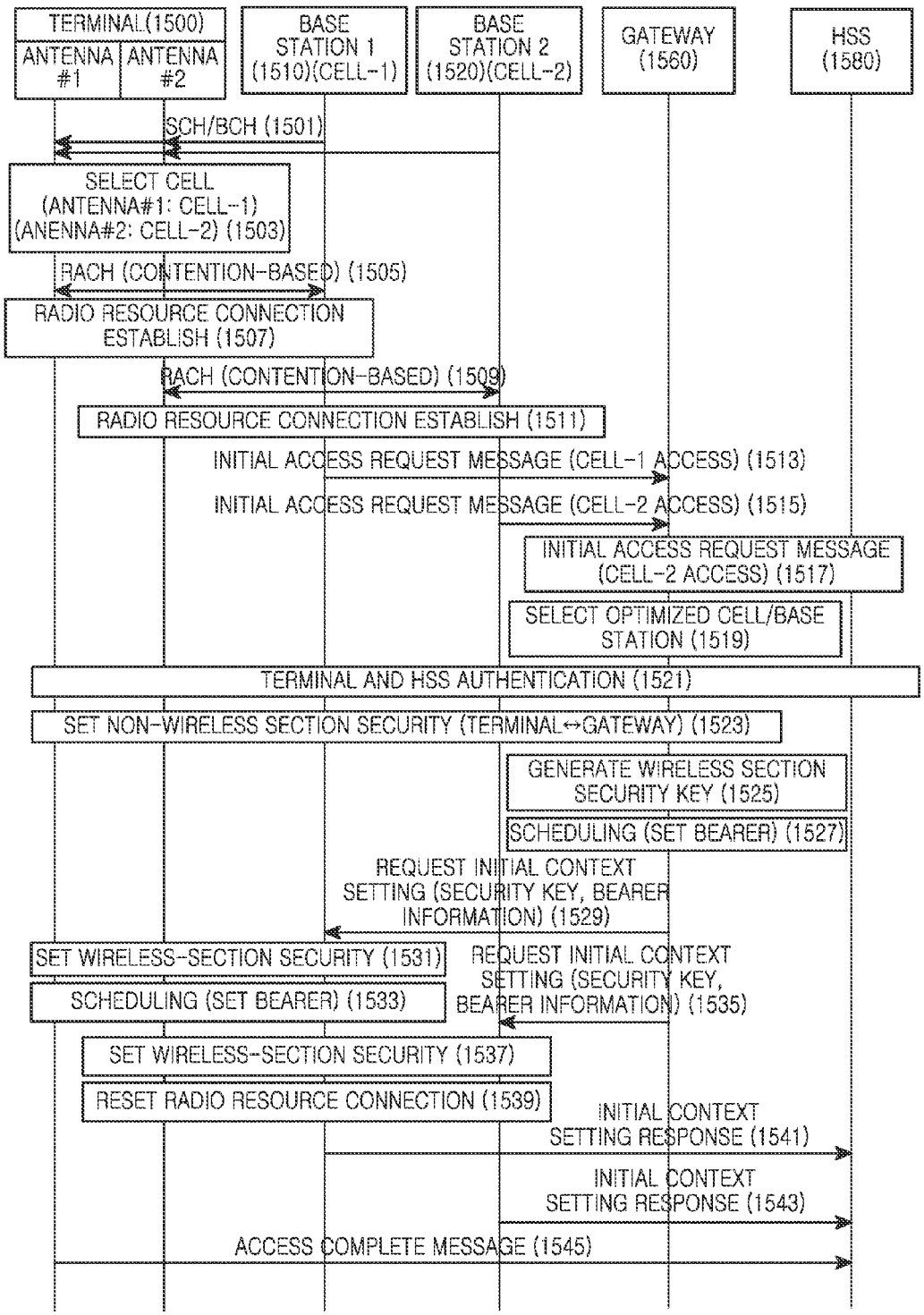
FIG. 15 is a view illustrating a multicell simultaneous access procedure according to which a base station or gateway resource does not exist in a wireless communication system according to an embodiment of the present disclosure.

FIG. 15 is a view illustrating a multicell simultaneous access procedure according to which a base station or gateway resource does not exist in a wireless communication system according to an embodiment of the present disclosure.

An embodiment illustrated in FIG. 15 may be performed in the case in which a terminal 1500 is positioned at the point D in FIG. 12. According to the embodiment illustrated in FIG. 15, the terminal 1500 accesses a cell-1 1510 via an antenna #1 and accesses a cell-2 1520 via an antenna #2, simultaneously.

Referring to FIG. 15, at operation 1501, the terminal 1500 receives SCH and BCH from a base station 1 1510 (cell-1) and a base station 2 1520 (cell-2). The terminal 1500 obtains base station synchronization by receiving the SCH. The terminal 1500 obtains system information of each base station via the BCH.

At operation 1503, the terminal 1500 selects an optimized cell for each antenna with consideration of radio signal quality for each antenna, a load level of a cell, and/or the like. In FIG. 15, the present disclosure assumes that the base station 1 1510 is selected for the antenna #1, and the base station 2 1520 has been selected for the antenna #2.

At operation 1505, the antenna #1 of the terminal 1500 performs a random access procedure via RACH in order to obtain an uplink resource from the base station 1 1510 (cell-1). Specifically, the terminal 1500 transmits a random access preamble to the base station 1 1510. In the case in which the base station 1 1510 receives the random access preamble successfully, the base station 1 1510 allocates an uplink resource by transmitting a random access response. At this point, because a preamble transmitted by the terminal 1500 is arbitrarily selected, in the case in which a plurality of terminals 1500 perform transmission using the same preamble, collision may occur.

At operation 1507, the terminal 1500 performs a radio resource connection establish procedure in order to set a radio section connection with the base station 1 1510 (cell-1). For example, the terminal 1500 transmits a radio resource connection request message to the base station 1 1510 using an uplink resource allocated by the base station 1 1510. In addition, the base station 1 1510 determines whether a radio resource connection requested by the terminal 1500 is possible, and when it is determined that the radio resource connection is possible, the base station 1 1510 transmits a radio resource connection message to the terminal 1500. The terminal 1500 sets a radio resource based on radio resource information obtained via the radio resource connection message, and then transmits a radio resource connection complete message to the base station 1 1510.

At operation 1509, the antenna #2 of the terminal 1500 performs a random access procedure via an RACH in order to obtain an uplink resource from the base station 2 1520 (cell-1). For example, the terminal 1500 transmits a random access preamble to the base station 2 1520. In the case in which the base station 2 1520 receives the random access preamble successfully, the base station 2 1520 allocates an uplink resource by transmitting a random access response. At this point, because a preamble transmitted by the terminal 1500 is arbitrarily selected, in the case in which a plurality of terminals 1500 perform transmission using the same preamble, collision may occur.

At operation 1511, the terminal 1500 performs a radio resource connection establish procedure in order to set a radio section connection with the base station 2 1520 (cell-1). For example, the terminal 1500 transmits a radio resource connection request message to the base station 2 1520 using an uplink resource allocated by the base station 2 1520. In addition, the base station 2 1520 determines whether a radio resource connection requested by the terminal 1500 is possible, and when it is determined that the radio resource connection is possible, the base station 2 1520 transmits a radio resource connection message to the terminal 1500. The terminal 1500 sets a radio resource based on radio resource information obtained via the radio resource connection message, and then transmits a radio resource connection complete message to the base station 2 1520.

At operation 1513, after radio resource connection between the terminal 1500 and the base station 1 1510 is completed, the base station 1 1510 transmits an initial access request message to the gateway 1560 in order to allow the terminal 1500 to access a network. At this point, the initial access request message includes an identifier of the terminal 1500 and information of the cell-1 1410 accessed by the terminal 1500.

At operation 1515, in the case in which radio resource connection between the terminal 1500 and the base station 2 1520 is completed, the base station 2 1520 transmits an initial access request message to the gateway 1560 to allow the terminal 1500 to access the network. At this point, the initial access request message includes an identifier of the terminal 1500 and information of the cell-2 1420 accessed by the terminal 1500.

At operation 1517, the gateway 1560 obtains information for authenticating the terminal 1500 from the HSS 1580 using identify information of the terminal 1500. The HSS 1580 may be denoted by an 'authentication server'. The information for authenticating the terminal 1500 may include at least one of RAND, AUTN, XRES, and KASME.

At operation 1519, the gateway 1560 selects an optimized cell with consideration of a radio section quality, a load level of a cell, and/or the like. In case of FIG. 15, the present disclosure assumes a case in which the base station 1 1510 has been selected.

At operation 1521, the terminal 1500 and the HSS 1580 perform a mutual authentication procedure based on authentication information obtained from the HSS 1580. At this point, the authentication procedure is performed via the base station 1 1510. Through an authentication request message transmitted by the gateway 1560, the terminal 1500 authenticates the HSS 1580, and then generates an authentication response message by generating RES, and transmits the authentication response to the gateway 1560. The gateway 1560 that has received the authentication response determines whether the RES and the XRES coincide, and when the RES and the XRES coincide, the gateway 1560 determines that the terminal 1500 has a right to access.

At operation 1523, the terminal 1500 and the gateway 1560 perform a non-wireless section security setting procedure to set security (e.g., integrity and encryption) for a message exchanged therebetween. The non-wireless section security setting denotes a procedure for performing integrity and encryption of a NAS message directly exchanged between the terminal and the gateway. For example, the base station 1560 does not examine content of an NAS message received from the terminal 1500 or the gateway 1560 but simply performs a retransmission function. The non-wireless section security setting procedure includes a process according to which when the gateway 1560 transmits a security setting request message, the terminal 1500 receives the security setting request message, and transmits a security setting response message.

At operation 1525, the gateway 1560 generates a wireless section security key based on information obtained from the HSS 1580. A specific procedure of the security key generation may change depending on a security algorithm.

At operation 1527, the gateway 1560 sets bearer information based on QoS information requested by the terminal 1500. A specific procedure for setting the bearer information may change depending on a scheduling policy of the gateway 1560 and an algorithm.

At operation 1529, the gateway 1560 transmits an initial context setting request message to the base station 1 1510. The initial context setting request message may include the wireless section security key information generated at operation 1525 and the bearer information generated at operation 1527.

At operation 1531, the base station 1 1510 and the terminal 1500 perform a wireless section security (e.g., integrity and encryption) setting procedure using the wireless section security key.

At operation 1533, the terminal 1500 and the base station 1 1510 perform a wireless resource connection resetting procedure. Through the wireless resource connection resetting procedure, the terminal 1500 and the base station 1 1510 exchange information regarding a wireless section quality report period and method, and/or the like.

At operation 1535, the gateway 1560 transmits initial context setting request message to the base station 2 1520. The initial context setting request message may include the wireless section security key information generated at operation 1525 and the bearer information generated at operation 1527.

At operation 1537, the base station 2 1520 performs a wireless section security (e.g., integrity and encryption) setting procedure with the terminal 1500 using the wireless section security key.

At operation 1539, the terminal 1500 and the base station 2 1520 perform a wireless resource connection resetting procedure. Through the wireless resource connection resetting procedure, the terminal 1500 and the base station 2 1520 exchange information regarding a wireless section quality report period and method, and/or the like.

At operation 1541, after connection resetting between the terminal 1500 and the base station 1 1510 is completed, the base station 1 1510 transmits an initial context setting response message to the gateway 1560.

At operation 1543, after connection resetting between the terminal 1500 and the base station 2 1520 is completed, the base station 2 1520 transmits an initial context setting response message to the gateway 1560.

At operation 1545, the terminal 1500 transmits an access complete message to the gateway 1560 via the base station 1 1410. For example, the terminal 1500 informs the gateway 1560 of final network access completion.

Figure 16:
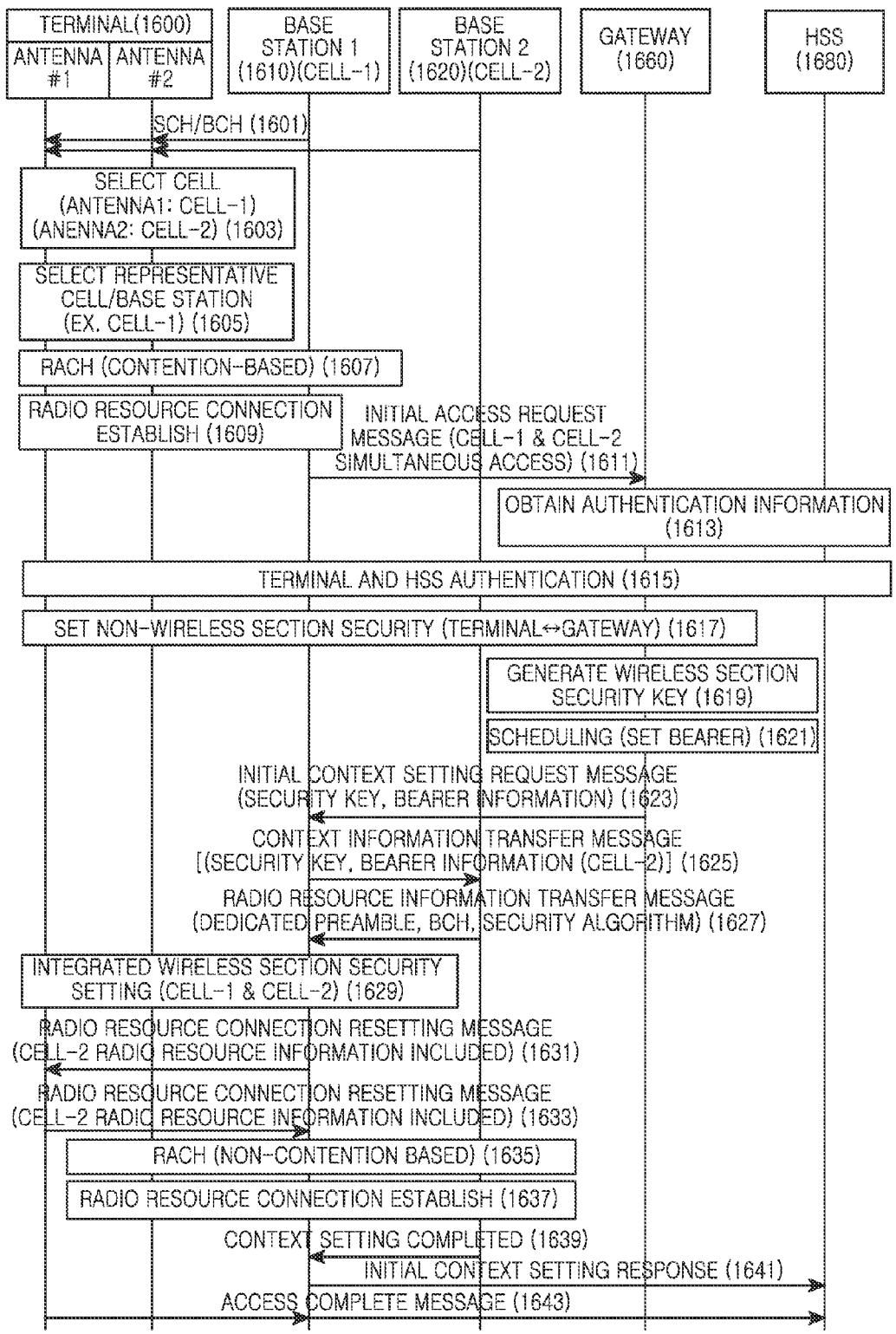
FIG. 16 is a view illustrating a multicell simultaneous access procedure via a base station resource in a wireless communication system according to an embodiment of the present disclosure.

FIG. 16 is a view illustrating a multicell simultaneous access procedure via a base station resource in a wireless communication system according to an embodiment of the present disclosure. An embodiment illustrated in FIG. 16 may be performed in the case in which a terminal 1600 is positioned at the position D in FIG. 12.

According to various embodiments of the present disclosure illustrated in FIG. 16, the terminal 1600 accesses a base station 1 1610 (cell-1) via an antenna #1, and accesses a base station 2 1620 (cell-2) via an antenna #2. The terminal 1600 does not access via a separate base station for each antenna but selects one representative base station to transmit/receive an access-related control message, and provides a fast and efficient access procedure using a single base station via information exchange between the base stations 1610 and 1620.

Referring to FIG. 16, at operation 1601, the terminal 1600 receives an SCH and a BCH from the base station 1 1610 and the base station 2 1620. The terminal 1600 obtains base station synchronization by receiving the SCH. The terminal 1600 obtains system information of each base station via the BCH.

At operation 1603, the terminal 1600 selects an optimized cell based on radio signal quality, a load level of a cell, and/or the like, with consideration of all antennas. In FIG. 16, the present disclosure assumes the base station 1 1610 is selected as an optimized cell with respect to the antenna #1 and the base station 2 1620 is selected as an optimized cell with respect to the antenna #2.

At operation 1605, the terminal 1600 selects a representative base station with consideration of radio link quality for each antenna, a load level of a cell, and/or the like. In FIG. 16, the present disclosure assumes the base station 1 1610 is selected as the representative base station via the antenna #1.

At operation 1607, the antenna #1 of the terminal 1600 performs a random access procedure via an RACH in order to obtain an uplink resource from the base station 1 1610. For example, the terminal 1600 transmits a random access preamble to the base station 1 1610. In the case in which the base station 1 1610 receives the random access preamble successfully, the base station 1 1610 allocates an uplink resource by transmitting a random access response. At this point, because the preamble transmitted by the terminal 1600 is arbitrarily selected, in the case in which a plurality of terminals 1600 perform transmission using the same preamble, collision may occur.

At operation 1609, the terminal 1600 performs a radio resource connection establish procedure in order to set a wireless section connection with the base station 1 1610. For example, the terminal 1600 transmits a radio resource connection request message to the base station 1 1610 using an uplink resource allocated from the base station 1 1610. In addition, the base station 1 1610 determines whether a radio resource connection requested by the terminal 1600 is possible, and when it is determined that the radio resource connection is possible, the base station 1 1610 transmits a radio resource connection message to the terminal 1600. The terminal 1600 sets a radio resource based on radio resource information obtained via the radio resource connection message, and then transmits a radio resource connection complete message to the base station 1 1610. At this point, the radio resource connection complete request message includes information representing the terminal 1600 requests an access to a plurality of cells.

At operation 1611, after radio resource connection between the terminal 1600 and the base station 1 1610 is completed, the base station 1 1610 transmits an initial access request message to a gateway 1660 in order to allow the terminal 1600 to access a network. At this point, the initial access request message includes an identifier of the terminal 1600 and information of a cell-1 1610 and a cell-2 1620 which the terminal 1600 intends to access. In addition, the initial access request message includes information representing that the terminal 1600 requests an access to a plurality of cells. For example, the initial access request message includes information for accessing the cell-1 1610 and the cell-2 1620 simultaneously.

At operation 1613, the gateway 1660 obtains information for authenticating the terminal 1600 from an HSS 1680 using identify information of the terminal 1600. The HSS 1680 may be denoted by an 'authentication server'. The information for authenticating the terminal 1600 may include at least one of RAND, AUTN, XRES, and KASME.

At operation 1615, the terminal 1600 and the HSS 1680 perform a mutual authentication procedure based on authentication information obtained from the HSS 1680. At this point, the authentication procedure is performed by the representative base station. Through an authentication request message transmitted by the gateway 1660, the terminal 1600 authenticates the HSS 1680, and then generates an authentication response message by generating an RES, and transmits the authentication response to the gateway 1660. The gateway 1660 that has received the authentication response determines whether the RES and the XRES coincide, and when the RES and the XES coincide, the gateway 1660 determines that the terminal 1600 has a right to access.

At operation 1617, the terminal 1600 and the gateway 1660 perform a non-wireless section security setting procedure to set security (e.g., integrity and encryption) for an exchanged message. The non-wireless section security setting denotes a procedure for performing integrity and encryption of a NAS message directly exchanged between the terminal and the gateway. For example, the base station 1660 does not examine content of an NAS message received from the terminal 1600 or the gateway 1660 but simply performs a retransmission function. The non-wireless section security setting procedure includes a process where when the gateway 1660 transmits a security setting request message, the terminal 1600 receives the security setting request message, and transmits a security setting response message.

At operation 1619, the gateway 1660 generates a wireless section security key based on information obtained from the HSS 1680. A specific procedure of the security key generation may change depending on a security algorithm. The gateway 1660 generates a security key for the base station 1 1610 and a security key for the base station 2 1620. A specific procedure of the security key generation may change depending on a security algorithm.

At operation 1621, the gateway 1660 sets bearer information based on QoS information requested by the terminal 1600. The gateway 1660 sets bearer information for the base station 1 1610 and the bearer information for the base station 2 1620. A specific procedure for setting the bearer information may change depending on a scheduling policy of the gateway 1660 and an algorithm.

At operation 1623, the gateway 1660 transmits an initial context setting request message to the base station 1 1610. The initial context setting request message may include wireless section security key information for the base station 1 1610 and the base station 2 1620 generated at operation 1619 and bearer information for the base station 1 1610 and the base station 2 1620 generated at operation 1621.

At operation 1625, the base station 1 1610 transmits a context information transfer message to the base station 2 1620. The context information transfer message may include a security key for the base station 2 1620 and bearer information. For example, the base station 1 1610 extracts information regarding the base station 2 1620 among information included in the initial context setting request message, and transmits the extracted information to the base station 2 1620.

At operation 1627, the base station 2 1620 transmits a radio resource information transfer message for accessing via the antenna #2 of the terminal 1600 to the base station 1 1610. To shorten an access time of the terminal 1600, the radio resource information transfer message may include at least one of dedicated preamble information, BCH information, and a security algorithm.

At operation 1629, the terminal 1600 and the base station 1 1610 perform a wireless section security (e.g., integrity and encryption) setting procedure using the wireless section security key. At this point, the wireless section security is set for not only a wireless section with the base station 1 1610 but also a wireless section with the base station 2 1620.

At operation 1631, the base station 1 1610 transmits a radio resource connection resetting message to the terminal 1600 via the antenna #1 of the terminal 1600. The radio resource connection resetting message may include at least one of dedicated preamble information which is radio resource information of the base station 2 1620, and BCH information.

At operation 1633, the terminal 1600 transmits a radio resource connection resetting complete message to the base station 1 1610 via the antenna #1.

At operation 1635, the terminal 1600 performs an RACH procedure via the antenna #2. At this point, the terminal 1600 may perform non-contention based RACH procedure in order to allocate an uplink resource using information regarding the base station 2 1620 obtained at operation 1633.

At operation 1637, the antenna #2 of the terminal 1600 performs a radio resource connection establish procedure using the uplink resource allocated via operation 1637. For example, the terminal 1600 transmits a radio resource connection request message to the base station 2 1620 using an uplink resource allocated from the base station 2 1620. In addition, the base station 2 1620 determines whether the radio resource connection requested by the terminal 1600 is possible. When it is determined that the radio resource connection is possible, the base station 2 1620 transmits a radio resource connection message to the terminal 1600. The terminal 1600 sets a radio resource based on radio resource information obtained via the radio resource connection message, and then transmits a radio resource connection complete message to the base station 2 1620.

At operation 1639, the base station 2 1620 transmits a context setting complete message to the base station 1 1610. In other words, the base station 2 1620 informs the base station 1 1610 that the terminal 1600 completes a cell access.

At operation 1641, the base station 1 1610 transmits an initial context setting response message to the gateway 1660.

At operation 1643, the terminal 1600 transmits an access complete message to the gateway 1660. For example, the terminal 1600 informs multicell access completion. At this point, the terminal 1600 transmits the access complete message via the base station 1 1610 using the antenna #1.

Figure 17:
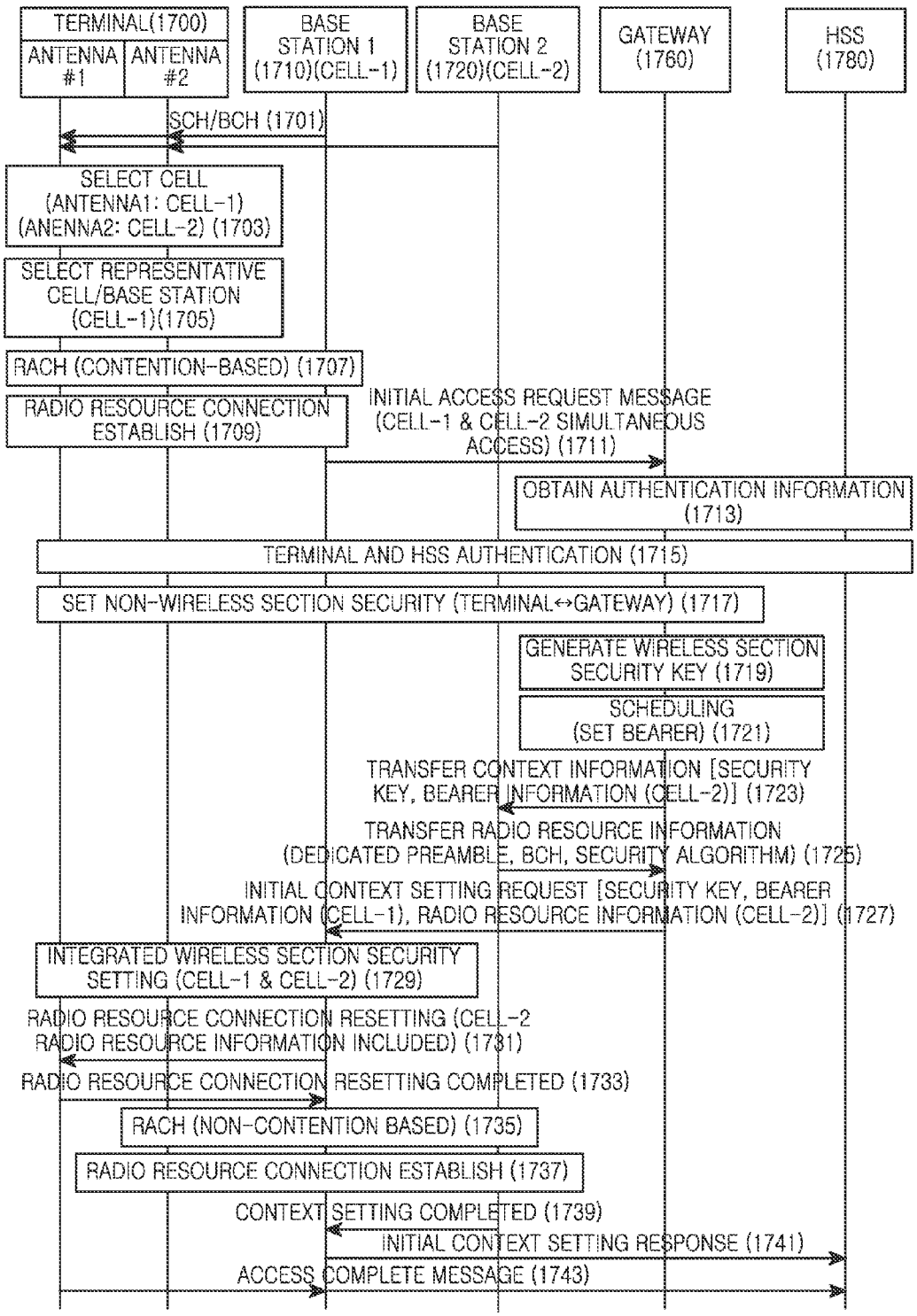
FIG. 17 is a view illustrating a multicell simultaneous access procedure via a gateway resource in a wireless communication system according to an embodiment of the present disclosure.

FIG. 17 is a view illustrating a multicell simultaneous access procedure via a gateway resource in a wireless communication system according to an embodiment of the present disclosure. The embodiment of FIG. 17 may be performed in the case in which a terminal 1700 is positioned at the point D in FIG. 12.

According to various embodiments of the present disclosure illustrated in FIG. 17, the terminal 1700 accesses a base station 1 1710 (cell-1) via an antenna #1, and accesses a base station 2 1720 (cell-2) via an antenna #2. The terminal 1700 does not access via a separate base station for each antenna but selects one representative base station to transmit/receive an access-related control message, and provides a fast and efficient access procedure using a single base station via information exchange between the base stations 1710 and 1720 that uses a gateway 1760.

Referring to FIG. 17, at operation 1701, the terminal 1700 receives an SCH and a BCH from the base station 1 1710 and the base station 2 1720. The terminal 1700 obtains base station synchronization by receiving the SCH. The terminal 1700 obtains system information of each base station via the BCH.

At operation 1703, the terminal 1700 selects an optimized cell based on radio signal quality, a load level of a cell, and/or the like, with consideration of all antennas. In FIG. 17, the present disclosure assumes the base station 1 1710 is selected as an optimized cell with respect to the antenna #1 and the base station 2 1720 is selected as an optimized cell with respect to the antenna #2.

At operation 1705, the terminal 1700 selects a representative base station with consideration of radio link quality for each antenna, a load level of a cell, and/or the like. In FIG. 17, the present disclosure assumes the base station 1 1710 is selected as the representative base station via the antenna #1.

At operation 1707, the antenna #1 of the terminal 1700 performs a random access procedure via an RACH in order to obtain an uplink resource from the base station 1 1710. For example, the terminal 1700 transmits a random access preamble to the base station 1 1710. In the case in which the base station 1 1710 receives the random access preamble successfully, the base station 1 1710 allocates an uplink resource by transmitting a random access response. At this point, because the preamble transmitted by the terminal 1700 is arbitrarily selected, in the case in which a plurality of terminals 1700 perform transmission using the same preamble, collision may occur.

At operation 1709, the terminal 1700 performs a radio resource connection establish procedure in order to set a wireless section connection with the base station 1 1710. For example, the terminal 1700 transmits a radio resource connection request message to the base station 1 1710 using an uplink resource allocated from the base station 1 1710. In addition, the base station 1 1710 determines whether a radio resource connection requested by the terminal 1700 is possible, and when it is determined that the radio resource connection is possible, the base station 1 1710 transmits a radio resource connection message to the terminal 1700. The terminal 1700 sets a radio resource based on radio resource information obtained via the radio resource connection message, and then transmits a radio resource connection complete message to the base station 1 1710.

At operation 1711, after radio resource connection between the terminal 1700 and the base station 1 1710 is completed, the base station 1 1710 transmits an initial access request message to a gateway 1760 in order to allow the terminal 1700 to access a network. At this point, the initial access request message includes an identifier of the terminal 1700 and information of a cell-1 1710 and a cell-2 1720 which the terminal 1700 has accessed. For example, the initial access request message includes information for accessing the cell-1 1710 and the cell-2 1720 simultaneously.

At operation 1713, the gateway 1760 obtains information for authenticating the terminal 1700 from an HSS 1780 using identify information of the terminal 1700. The HSS 1780 may be denoted by an 'authentication server'. The information for authenticating the terminal 1700 may include at least one of RAND, AUTN, XRES, and KASME.

At operation 1715, the terminal 1700 and the HSS 1780 perform a mutual authentication procedure based on authentication information obtained from the HSS 1780. At this point, the authentication procedure is performed by the representative base station. Through an authentication request message transmitted by the gateway 1760, the terminal 1700 authenticates the HSS 1780, and then generates an authentication response message by generating an RES, and transmits the authentication response to the gateway 1760. The gateway 1760 that has received the authentication response determines whether the RES and the XRES coincide, and when the RES and the XRES coincide, the gateway 1760 determines that the terminal 1700 has a right to access.

At operation 1717, the terminal 1700 and the gateway 1760 perform a non-wireless section security setting procedure to set security (e.g., integrity and encryption) for an exchanged message. The non-wireless section security setting denotes a procedure for performing integrity and encryption of a NAS message directly exchanged between the terminal and the gateway. For example, the base station 1760 does not examine content of an NAS message received from the terminal 1700 or the gateway 1760 but simply performs a retransmission function. The non-wireless section security setting procedure includes a process according to which when the gateway 1760 transmits a security setting request message, the terminal 1700 receives the security setting request message, and transmits a security setting response message.

At operation 1719, the gateway 1760 generates a wireless section security key based on information obtained from the HSS 1780. A specific procedure of the security key generation may change depending on a security algorithm. The gateway 1760 generates a security key for the base station 1 1710 and a security key for the base station 2 1720. A specific procedure of the security key generation may change depending on a security algorithm.

At operation 1721, the gateway 1760 sets bearer information based on QoS information requested by the terminal 1700. The gateway 1760 sets bearer information for the base station 1 1710 and the bearer information for the base station 2 1720. A specific procedure for setting the bearer information may change depending on a scheduling policy of the gateway 1760 and an algorithm.

At operation 1723, the gateway 1760 transmits a context information transfer message to the base station 2 1720. The context information transfer message includes at least one of a wireless section security key information for the base station 2 1720 generated at operation 1721 and bearer information for the base station 2 1720 generated at operation 1723.

At operation 1725, the base station 2 1720 transmits a radio resource information transfer message to the gateway 1760. To shorten an access time of the terminal 1700, the radio resource information transfer message may include at least one of dedicated preamble information, BCH information, and security algorithm information.

At operation 1727, the gateway 1760 transmits an initial context setting request message to the base station 1 1710. The initial context setting request message includes at least one of wireless section security key information for the base station 1 1710 generated at operation 1719, bearer information for the base station 1 1710 generated at operation 1721, and radio resource information of the base station 2 1720 obtained at operation 1725. The radio resource information includes at least one of the dedicated preamble information and the BCH information.

At operation 1729, the terminal 1700 and the base station 1 1710 perform a wireless section security (e.g., integrity and encryption) setting procedure using the wireless section security key. At this point, the wireless section security is set for not only a wireless section with the base station 1 1710 but also a wireless section with the base station 2 1720.

At operation 1731, the base station 1 1710 transmits a radio resource connection resetting message to the terminal 1700 via the antenna #1 of the terminal 1700. The radio resource connection resetting message may include at least one of dedicated preamble information which is radio resource information of the base station 2 1720, and BCH information.

At operation 1733, the terminal 1700 transmits a radio resource connection resetting complete message to the base station 1 1710 via the antenna #1.

At operation 1735, the terminal 1700 performs an RACH procedure via the antenna #2. At this point, the terminal 1700 may perform non-contention based RACH procedure in order to allocate an uplink resource using information regarding the base station 2 1720 obtained at operation 1733.

At operation 1737, the antenna #2 of the terminal 1700 performs a radio resource connection establish procedure using the uplink resource allocated via operation 1737. For example, the terminal 1700 transmits a radio resource connection request message to the base station 2 1720 using an uplink resource allocated from the base station 2 1720. In addition, the base station 2 1720 determines whether the radio resource connection requested by the terminal 1700 is possible. When it is determined that the radio resource connection is possible, the base station 2 1720 transmits a radio resource connection message to the terminal 1700. The terminal 1700 sets a radio resource based on radio resource information obtained via the radio resource connection message, and then transmits a radio resource connection complete message to the base station 2 1720.

At operation 1739, the base station 2 1720 transmits a context setting complete message to the base station 1 1710. In other words, the base station 2 1720 informs the base station 1 1710 that the terminal 1700 completes a cell access.

At operation 1741, the base station 1 1710 transmits an initial context setting response message to the gateway 1760.

At operation 1743, the terminal 1700 transmits an access complete message to the gateway 1760. For example, the terminal 1700 informs multicell access completion. At this point, the terminal 1700 transmits the access complete message via the base station 1 1710 using the antenna #1.

Figure 18:
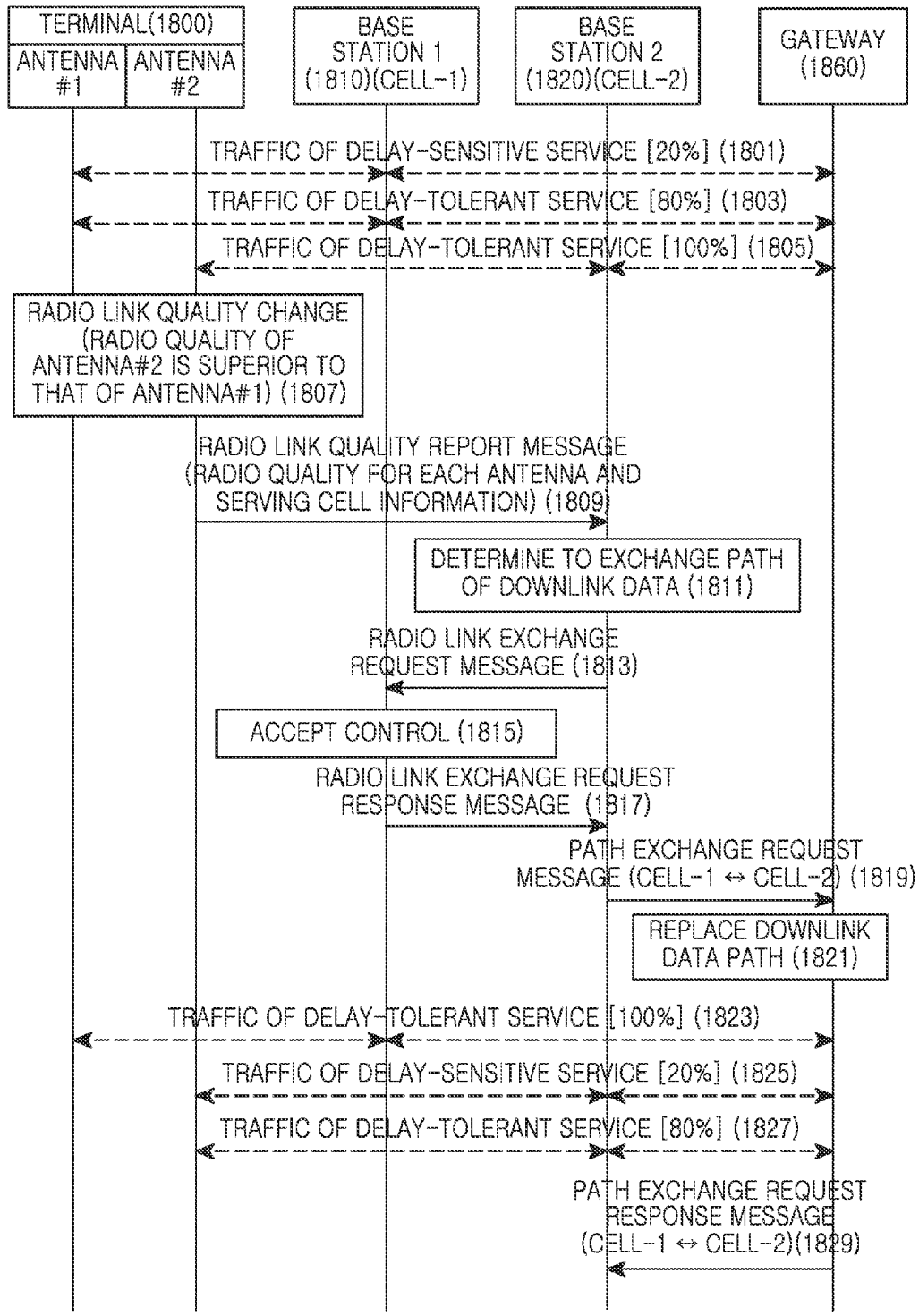
FIG. 18 is a view illustrating an optimized cell exchange procedure in a wireless communication system according to an embodiment of the present disclosure.

FIG. 18 is a view illustrating an optimized cell exchange procedure in a wireless communication system according to an embodiment of the present disclosure. The embodiment of FIG. 18 may be performed when a terminal 1800 passes through the point D in FIG. 12.

According to various embodiments of the present disclosure illustrated in FIG. 18, in the case in which the terminal 1800 uses a delay-sensitive service such as VoIP via an antenna #1 and a cell-1 1810, and uses a delay-tolerant service such as a File Transfer Protocol (FTP) via an antenna #2 and a cell-2 1820, when radio link quality of the antenna #1 deteriorates compared to the antenna #2 as the terminal 1800 moves, the system may provide high Quality of Experience (QoE) and User eXperience (UX) to a user by exchanging traffic paths of a service provided using the antenna #1 and the cell-1 1810 and a service provided using the antenna #2 and the cell-2 1820.

Referring to FIG. 18, at operation 1801, the terminal 1800 is provided with a data path of a delay-sensitive service via the base station 1 1810 using the antenna #1. For example, the delay-sensitive service may include a real-time service such as VoIP, and/or the like. At this point, traffic for the delay-sensitive service occupies 20% of traffic transmitted/received between the base station 1 1810 and the terminal 1800.

At operation 1803, the terminal 1800 is provided with a data path of a delay-tolerant service via the base station 1 1810 using the antenna #1. For example, the delay-tolerant service may include a non real-time service such as FTP, and/or the like. At this point, traffic for the delay-tolerant service occupies 80% of traffic transmitted/received between the base station 1 1810 and the terminal 1800.

At operation 1805, the terminal 1800 is provided with a data path of a delay-tolerant service via the base station 2 1820 using the antenna #2. For example, the delay-tolerant service denotes a non real-time service such as FTP, and/or the like. At this point, traffic for the delay-tolerant service occupies 100% of traffic transmitted/received between the base station 2 1820 and the terminal 1800.

At operation 1807, radio section signal quality of the antenna #1 of the terminal 1800 deteriorates compared to the antenna #2, and the terminal 1800 recognizes the radio link quality deterioration. For example, the terminal 1800 may recognize the radio link quality deterioration by determining whether a packet error frequently occurs in a relevant radio link or whether reception power lowers to a reference value or less.

At operation 1809, because signal quality of the antenna #1 is poor, the terminal 1800 transmits a radio link quality report message to the base station 2 1820 accessed using the antenna #2 whose quality is relatively better. The radio link quality report message includes radio section quality information of the antenna #1 and the antenna #2 and serving cell information for each antenna.

At operation 1811, the base station 2 determines exchange of a downlink data transmission path of the antenna #1 and the antenna #2 of the terminal 1800 based on quality information obtained via operation 1809. In other words, because signal quality of the antenna #1 is poor compared to signal quality of the antenna #2, the base station 2 1820 determines to change a data path of the delay-sensitive service to the base station 2 1820 accessed by the antenna #2.

At operation 1813, the base station 2 1820 transmits a radio link exchange request message to the base station 1 1810 which is a serving cell of the antenna #1.

At operation 1815, the base station 1 1810 determines whether to accept a link exchange request based on available resource information. When the link exchange request is not accepted, subsequent steps are not performed. In FIG. 18, the present disclosure assumes the link exchange request is accepted.

At operation 1817, as the link exchange request is accepted, the base station 1 1810 transmits a radio link exchange response message to the base station 2 1820. For example, the base station 1 1810 transmits a radio link exchange request response message informing link exchange is accepted. When the link exchange is not accepted, the base station 1 1810 transmits a radio link exchange request response message informing rejection of link exchange, and subsequent steps may not be performed.

At operation 1819, the base station 2 1820 transmits a path exchange request message to the gateway 1860 in order to exchange a data transmission path corresponding to the antenna #1 and the antenna #2 of the terminal 1800.

At operation 1821, the gateway 1860 exchanges a downlink data path. For example, the gateway 1860 changes path setting to transmit data of a delay-sensitive service that has been transmitted to the base station 1 1810 to the base station 2 1820, and transmit data that has been transmitted to the base station 2 1820 to the base station 1 1810. In addition, the gateway 1860 adjusts a ratio of traffic transmitted/received via the base station 1 1810 and the base station 2 1820.

At operation 1823, depending on a data transmission path exchange result, the terminal 1800 transmits/receives data of a delay-tolerant service via the base station 1 1810 using the antenna #1. At this point, traffic for the delay-tolerant service occupies 100% of traffic transmitted/received between the base station 1 1810 and the terminal 1800.

At operation 1825, depending on the data transmission path exchange result, the terminal 1800 transmits/receives data of a delay-sensitive service via the base station 2 1820 using the antenna #2. At this point, traffic for the delay-sensitive service occupies 20% of traffic transmitted/received between the base station 2 1820 and the terminal 1800.

At operation 1827, depending on the data transmission path exchange result, the terminal 1800 transmits/receives data of a delay-tolerant service via the base station 2 1820 using the antenna #2. At this point, traffic for the delay-tolerant service occupies 80% of traffic transmitted/received between the base station 2 1820 and the terminal 1800.

At operation 1829, the gateway 1860 transmits a path exchange request response message to the base station 2 1820. For example, the gateway 1860 informs the base station 2 1820 of path exchange completion.

Figure 19:
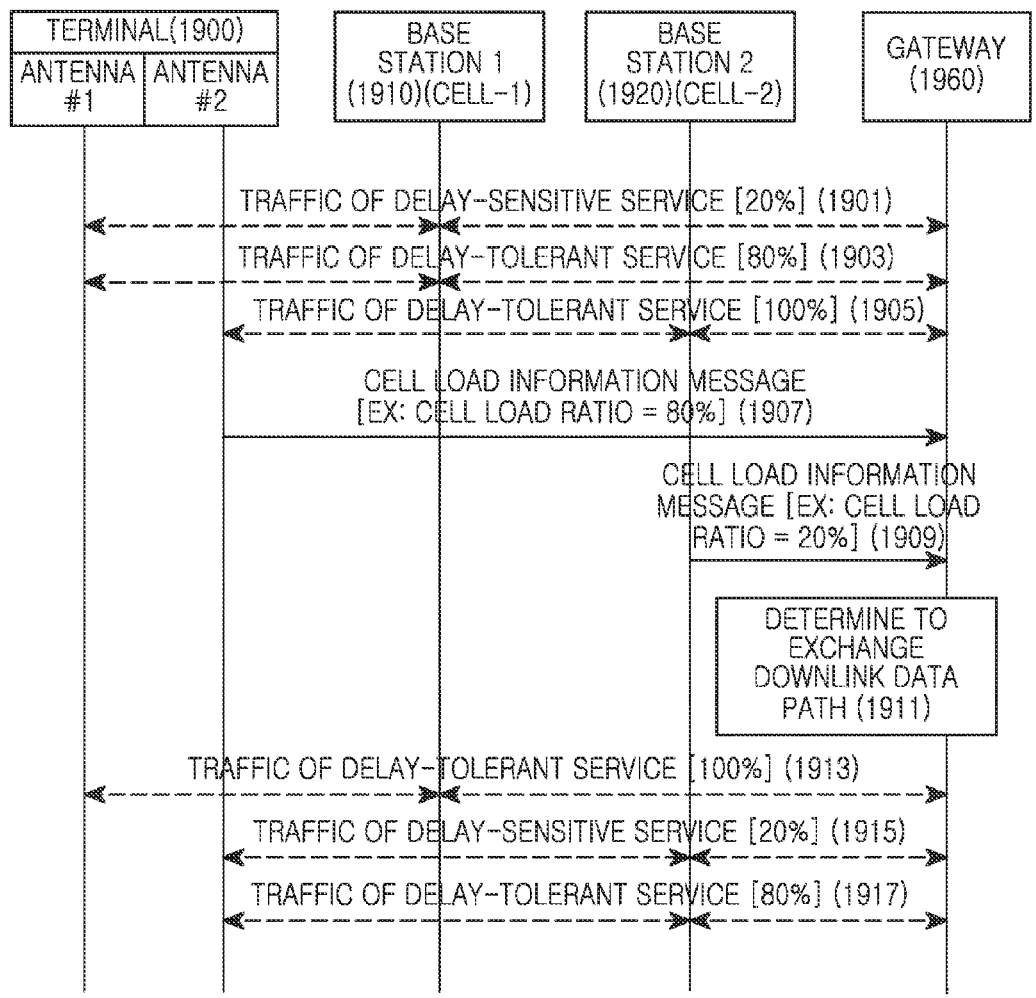
FIG. 19 is a view illustrating an optimized cell exchange procedure in a wireless communication system according to an embodiment of the present disclosure.

FIG. 19 is a view illustrating an optimized cell exchange procedure in a wireless communication system according to an embodiment of the present disclosure. The embodiment of FIG. 19 may be performed when a terminal 1900 passes through the point D in FIG. 12.

According to the embodiment illustrated in FIG. 19, in the case in which the terminal 1900 uses a delay-sensitive service such as VoIP via an antenna #1 and a cell-1 1910, and uses a delay-tolerant service such as a FTP via an antenna #2 and a cell-2 1920, as load levels of the cell-1 1910 and the cell-2 1920 change, the system may provide high QoE and UX to a user by exchanging traffic paths of a service provided using the antenna #1 and the cell-1 1910 and a service provided using the antenna #2 and the cell-2 1920.

Referring to FIG. 19, at operation 1901, the terminal 1900 is provided with a data path of a delay-sensitive service via the base station 1 1910 using the antenna #1. For example, the delay-sensitive service may include a real-time service such as VoIP, and/or the like. At this point, traffic for the delay-sensitive service occupies 20% of traffic transmitted/received between the base station 1 1910 and the terminal 1900.

At operation 1903, the terminal 1900 is provided with a data path of a delay-tolerant service via the base station 1 1910 using the antenna #1. For example, the delay-tolerant service may include a non real-time service such as FTP, and/or the like. At this point, traffic for the delay-tolerant service occupies 80% of traffic transmitted/received between the base station 1 1910 and the terminal 1900.

At operation 1905, the terminal 1900 is provided with a data path of a delay-tolerant service via the base station 2 1920 using the antenna #2. For example, the delay-tolerant service denotes a non real-time service such as FTP, and/or the like. At this point, traffic for the delay-tolerant service occupies 100% of traffic transmitted/received between the base station 2 1920 and the terminal 1900.

At operation 1907, the base station 1 1910 transmits a cell load information message to the gateway 1960. The cell load information message includes information indicating a cell load level of the base station 1 1910. At this point, the cell load level of the base station 1 1910 is 80%. As an example, 80% is a ratio of a load capacity in use to an entire load capacity of the base station 1 1910, and is a value that considers both a load occupied by the terminal 1900 and a load occupied by other terminals. Accordingly, the gateway 1960 updates serving cell management information of the terminal 1900 by reflecting information regarding the load level of the base station 1 1910.

At operation 1909, the base station 2 1920 transmits a cell load information message to the gateway 1960. The cell load information message includes information indicating the cell load level of the base station 2 1920. At this point, the cell load level of the base station 2 1920 is 20%. As an example, 20% is a ratio of a load capacity in use to an entire load capacity of the base station 2 1920, and is a value that considers both a load occupied by the terminal 1900 and a load occupied by other terminals. Accordingly, the gateway 1960 updates serving cell management information of the terminal 1900 by reflecting information regarding the load level of the base station 2 1920.

At operation 1911, the gateway 1960 exchanges a downlink data path. In other words, the gateway 1960 compares load levels of the base station 1 1910 and the base station 2 1920 and determines to provide the delay-sensitive service via the base station 2 1920 having a relatively low load level. For example, the gateway 1960 changes path setting to transmit data of a delay-sensitive service that has been transmitted to the base station 1 1910 to the base station 2 1920, and transmit data that has been transmitted to the base station 2 1920 to the base station 1 1910. In addition, the gateway 1960 adjusts a ratio of traffic transmitted/received via the base station 1 1910 and the base station 2 1920.

At operation 1913, depending on a data transmission path exchange result, the terminal 1900 transmits/receives data of a delay-tolerant service via the base station 1 1910 using the antenna #1. At this point, traffic for the delay-tolerant service occupies 100% of traffic transmitted/received between the base station 1 1910 and the terminal 1900.

At operation 1915, depending on the data transmission path exchange result, the terminal 1900 transmits/receives data of a delay-sensitive service via the base station 2 1920 using the antenna #2. At this point, traffic for the delay-sensitive service occupies 20% of traffic transmitted/received between the base station 2 1920 and the terminal 1900.

At operation 1917, depending on the data transmission path exchange result, the terminal 1900 transmits/receives data of a delay-tolerant service via the base station 2 1920 using the antenna #2. At this point, traffic for the delay-tolerant service occupies 80% of traffic transmitted/received between the base station 2 1920 and the terminal 1900.

Figure 20:
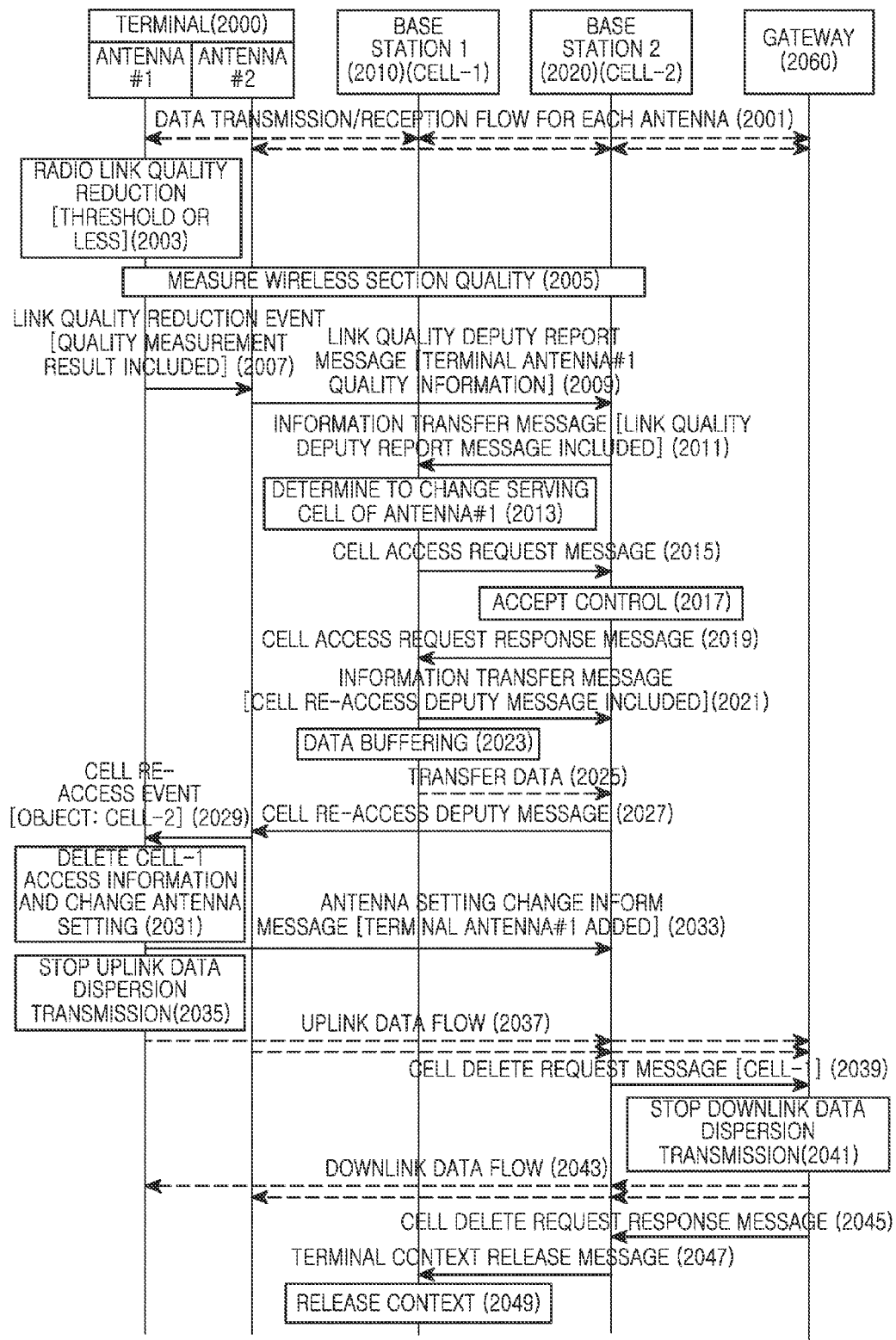
FIG. 20 is a view illustrating an optimized cell change procedure in a wireless communication system according to an embodiment of the present disclosure.

FIG. 20 is a view illustrating an optimized cell change procedure in a wireless communication system according to an embodiment of the present disclosure. The embodiment of FIG. 20 may be performed when a terminal 2000 moves from the point F to the point G in FIG. 12.

According to various embodiments of the present disclosure illustrated in FIG. 20, in case of intending to change an optimized cell to a cell-2 2020 as the terminal 2000 moves while receiving a service via a cell-1 2010 which is the optimized cell accessed via an antenna #1, the terminal 2000 transmits a control message for changing an optimized cell via an antenna #2 and the cell-2 2020 whose radio link quality is relatively good instead. Accordingly, effects of a cell capacity increase and a delay time reduction are expected.

Referring to FIG. 20, at operation 2001, the terminal 2000 is in a multicell access state by accessing a base station 1 2010 using the antenna #1 and accessing a base station 2 2020 using the antenna #2. In other words, the terminal 2000 transmits/receives data to/from the base station 1 2010 using the antenna #1, and transmits/receives data to/from the base station 2 2020 using the antenna #2.

At operation 2003, wireless section quality of the antenna #1 of the terminal 2000 lowers to a threshold or less, and the terminal 2000 recognizes the wireless section quality of the antenna #1 of the terminal 2000 lowers to the threshold or less.

At operation 2005, the terminal 2000 measures the wireless section quality to determine an optimized cell for the antenna #1. In FIG. 20, the present disclosure assumes it is determined that the optimized cell for the antenna #1 is the base station 1 2010.

At operation 2007, the antenna #1 of the terminal 2000 transfers a link quality deterioration event to the antenna #2 of the terminal 2000 whose quality is relatively good. At this point, a wireless section quality measurement result is transferred together.

At operation 2009, the terminal 2000 transmits a link quality deputy report message to the base station 2 2020 accessed via the antenna #2 using the antenna #2. The link quality deputy report message includes radio link quality measurement information of the antenna #1. The 'deputy report' means transferring the radio link quality measurement information of the antenna #1 of the terminal 2000 in a roundabout way via the base station 2 2020.

At operation 2011, the base station 2 2020 transmits an information transfer message to the base station 1 2010. The information transfer message includes the link quality deputy report message received from the antenna #2 of the terminal 2000.

At operation 2013, the base station 1 2010 determines change of a serving cell of the antenna #1. For example, the base station 1 2010 determines to change the serving cell of the antenna #1 of the terminal 2000 to the base station 2 2020.

At operation 2015, the base station 1 2010 transmits a cell access request message to the base station 2 2020. For example, the base station 1 2010 requests the base station 2 2020 to become a serving cell for the antenna #1 of the terminal 2000.

At operation 2017, the base station 2 2020 performs an acceptance control for the antenna #1 of the terminal 2000. In other words, the base station 2 2020 determines whether the base station 2 2020 may operate as the serving cell for the antenna #1 of the terminal 2000 based on a load level, the number of access terminals, an available resource, and/or the like, of the base station 2 2020. At this point, the present disclosure assumes an access is accepted.

At operation 2019, the base station 2 2020 transmits a cell access request response message to the base station 1 2010. In other words, the base station 2 2020 informs the base station 1 2010 that an access for the antenna #1 of the terminal 2000 is accepted. When an access for the antenna #1 of the terminal 2000 is rejected, subsequent steps may not be performed.

At operation 2021, the base station 1 2010 transmits an information transfer message to the base station 2 2020. The information transfer message includes a cell re-access deputy message. The 'deputy' means transferring a re-access message to be transmitted to the terminal 2000 in a roundabout way via the base station 2 2020.

At operation 2023, the base station 1 2010 buffers data transmitted to the antenna #1 of the terminal 2000. For example, the base station 1 2010 determines signal reception using the antenna #1 of the terminal 2000 becomes difficult, and buffers the data in preparation for an access release with the antenna #1.

At operation 2025, the base station 1 2010 transfers the buffered data to the base station 2 2020. For example, the base station 1 2020 transfers the buffered data in order to transmit the data via the base station 2 2020.

At operation 2027, the base station 2 2020 transmits the cell re-access deputy message to the antenna #2 of the terminal 2000. For example, the base station 2 2020 instructs the base station 2000 to change the serving cell of the antenna #2.

At operation 2029, the antenna #2 of the terminal 2000 transfers a cell re-access event to the antenna #1 of the terminal 2000. At this point, an object of re-access is the base station 2 2020 is indicted together.

At operation 2031, the terminal 2000 deletes access information for the antenna #1, and changes an antenna mode for the base station 2 2020. In other words, the terminal 2000 releases an access with the base station 1 2010, and changes an antenna mode for the base station 2 2020 from an SISO mode to an MIMO mode.

At operation 2033, the terminal 2000 transmits an antenna setting change inform message to the base station 2 2020 using the antenna #2. For example, the terminal 2000 informs that the antenna #1 has been additionally allocated with respect to the base station 2 2020. In other words, the terminal 2000 informs the antenna mode has changed from the SISO mode to the MIMO mode.

At operation 2035, the terminal 2000 stops uplink data dispersion transmission. For example, because both the antenna #1 and the antenna #2 are connected to the base station 2 2020, the terminal 2000 does not disperse the uplink data.

At operation 2037, the terminal 2000 transmits/receives uplink data via the base station 2 2020 using a plurality of antennas.

At operation 2039, the base station 2 2020 transmits a cell delete request message to a gateway 2070. In other words, the base station 2 2020 informs the gateway 2060 that an access with the base station 1 2010 using the antenna #1 of the terminal 2000 is released. For example, the base station 2 2020 informs an access release of the terminal 2000 and the base station 1 2010 in order to stop dispersion transmission of downlink data. Accordingly, the gateway 2060 updates serving cell information of the terminal 2000. In other words, the gateway 2060 updates a serving cell of the terminal 2000 in a table representing information regarding one or a plurality of cells which each terminal has accessed, in other words, deletes the base station 1 2010 from the serving cell of the terminal.

At operation 2041, the gateway 2060 stops downlink dispersion transmission for the terminal 2000. For example, as a serving cell of the terminal 2000 becomes one, the gateway 2060 stops dispersion of downlink data.

At operation 2043, the gateway 2070 transmits downlink data of the terminal 2000 via the base station 2 2020. In addition, the terminal 2000 receives the downlink data from the base station 2 2020 using both the antenna #1 and the antenna #2. For example, as downlink data dispersion transmission of the gateway 2060 is stopped, all of downlink data to the terminal 2000 is transmitted via the base station 2 2020.

At operation 2045, the gateway 2070 transmits a cell delete request response confirm message to the base station 2 2020.

At operation 2047, the base station 2 2020 transmits a terminal context release message to delete context of the terminal 2000 stored in the base station 1 2010.

At operation 2049, the base station 1 2010 releases context of the terminal 2000.

Figure 21:
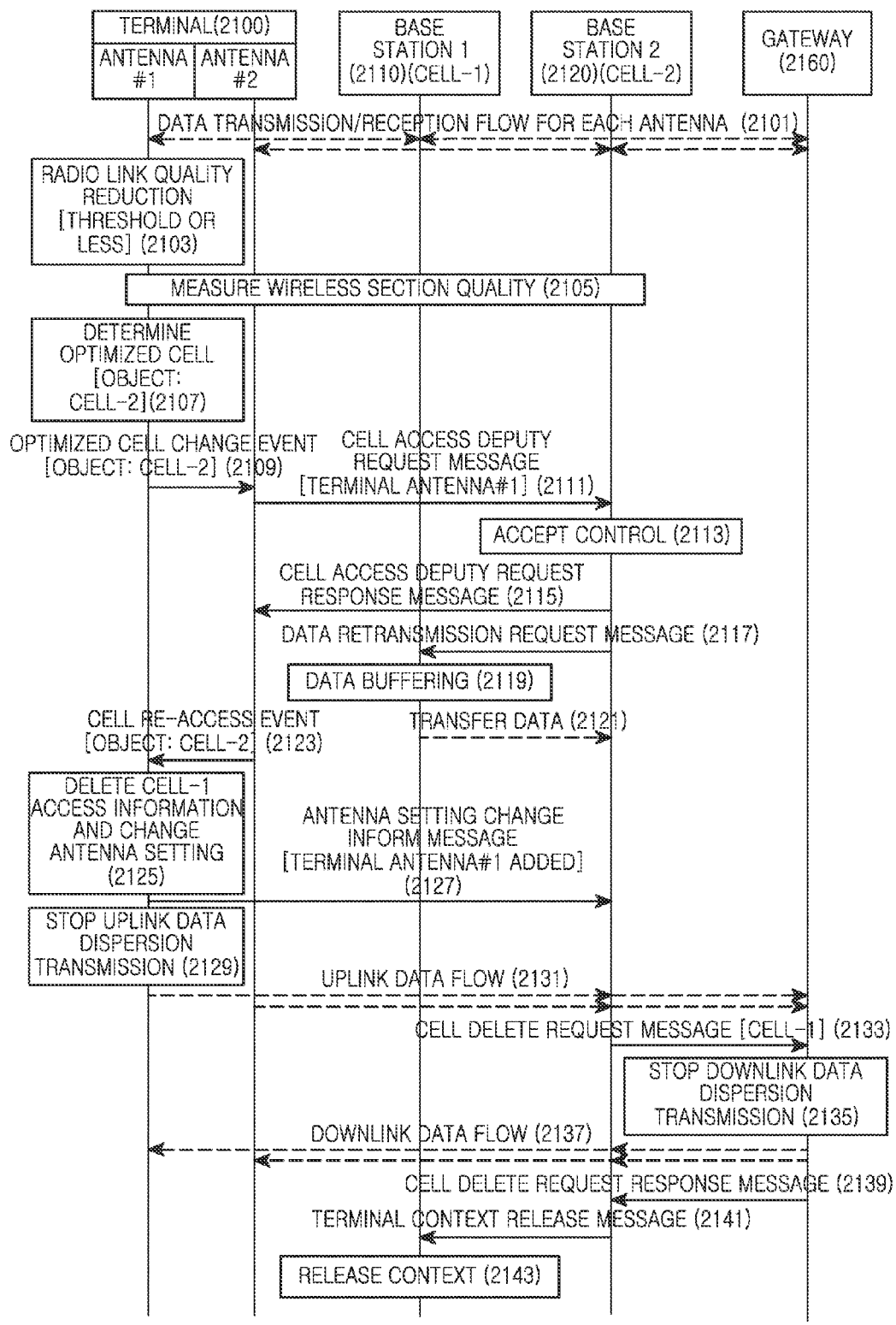
FIG. 21 is a view illustrating an optimized cell change procedure in a wireless communication system according to an embodiment of the present disclosure.

FIG. 21 is a view illustrating an optimized cell change procedure in a wireless communication system according to an embodiment of the present disclosure. The embodiment of FIG. 21 may be performed when a terminal 2100 moves from the point F to the point G in FIG. 12.

According to various embodiments of the present disclosure illustrated in FIG. 21, in case of intending to change an optimized cell to a cell-2 2120 as the terminal 2100 moves while receiving a service via a cell-1 2110 which is the optimized cell accessed via an antenna #1, the terminal 2100 transmits a control message for changing an optimized cell via an antenna #2 and the cell-2 2120 whose radio link quality is relatively good instead. Accordingly, effects of a cell capacity increase and a delay time reduction are expected.

Referring to FIG. 21, at operation 2101, the terminal 2100 is in a multicell access state by accessing a base station 1 2110 using the antenna #1 and accessing a base station 2 2120 using the antenna #2. In other words, the terminal 2100 transmits/receives data to/from the base station 1 2110 using the antenna #1, and transmits/receives data to/from the base station 2 2120 using the antenna #2.

At operation 2103, wireless section quality of the antenna #1 of the terminal 2100 lowers to a threshold or less, and the terminal 2100 recognizes the wireless section quality of the antenna #1 of the terminal 2100 lowers to the threshold or less.

At operation 2105, the terminal 2100 measures the wireless section quality to determine an optimized cell for the antenna #1. In FIG. 21, the present disclosure assumes it is determined that the optimized cell for the antenna #1 is the base station 1 2110.

At operation 2107, the terminal 2100 determines an optimized cell based on a wireless section quality measurement result for the antenna #1. In other words, the terminal 2100 determines to change a serving cell for the antenna #1. At this point, the present disclosure assumes the terminal 2100 determines to change the serving cell for the antenna #1 to the base station 2 2120.

At operation 2109, the antenna #1 of the terminal 2100 transfers a link quality deterioration event to the antenna #2 of the terminal 2100 whose quality is relatively good. At this point, a wireless section quality measurement result is transferred together.

At operation 2111, the terminal 2100 transmits a cell access deputy request message to the base station 2 2120 accessed via the antenna #2 using the antenna #2. The cell access deputy request message includes information that an existing serving cell for the antenna #1 indicates the base station 1 2110. The 'deputy' means a message to be transmitted via the antenna #1 is transmitted via the antenna #2.

At operation 2113, the base station 2 2120 performs an acceptance control for the antenna #1 of the terminal 2100. In other words, the base station 2 2120 determines whether the base station 2 2120 may operate as a serving cell for the antenna #1 of the terminal 2100 based on a load level, the number of access terminals, an available resource, and/or the like, of the base station 2 2120. At this point, the present disclosure assumes an access is accepted.

At operation 2115, the base station 2 2120 transmits a cell access deputy request response message to the base station 1 2110. In other words, the base station 2 2120 informs the base station 1 2110 that an access for the antenna #1 of the terminal 2100 is accepted. The 'deputy' means a message to be transmitted to the antenna #1 of the terminal 2100 is transmitted to the antenna #2.

At operation 2117, the base station 2 2120 transmits a data retransmission request message to the base station 1 2110. For example, the base station 2 2120 requests the base station 1 2110 to re-transfer data transferred to the base station 1 2110 to the base station 2 2120.

At operation 2119, the base station 1 2110 buffers data transmitted to the antenna #1 of the terminal 2100. For example, the base station 1 2110 determines a serving cell of the antenna #1 of the terminal 2100 will changes, and buffers the data in preparation for an access release with the antenna #1.

At operation 2121, the base station 1 2110 transfers the buffered data to the base station 2 2120. For example, the base station 1 2110 transfers the buffered data in order to transmit the data via the base station 2 2120.

At operation 2123, the antenna #2 of the terminal 2100 transfers a cell re-access event to the antenna #1 of the terminal 2100. At this point, an object of re-access is the base station 2 2120 is indicted together.

At operation 2125, the terminal 2100 deletes access information for the antenna #1, and changes an antenna mode for the base station 2 2120. In other words, the terminal 2100 releases an access with the base station 1 2110, and changes an antenna mode for the base station 2 2120 from an SISO mode to an MIMO mode.

At operation 2127, the terminal 2100 transmits an antenna setting change inform message to the base station 2 2120 using the antenna #2. For example, the terminal 2100 informs that the antenna #1 has been additionally allocated with respect to the base station 2 2120. In other words, the terminal 2100 informs the antenna mode has changed from the SISO mode to the MIMO mode.

At operation 2129, the terminal 2100 stops uplink data dispersion transmission. For example, because both the antenna #1 and the antenna #2 are connected to the base station 2 2120, the terminal 2100 does not disperse the uplink data.

At operation 2131, the terminal 2100 transmits/receives uplink data via the base station 2 2120 using a plurality of antennas.

At operation 2133, the base station 2 2120 transmits a cell delete request message to a gateway 2160. In other words, the base station 2 2120 informs the gateway 2160 that an access with the base station 1 2110 using the antenna #1 of the terminal 2100 is released. For example, the base station 2 2120 informs an access release of the terminal 2100 and the base station 1 2110 in order to stop dispersion transmission of downlink data. Accordingly, the gateway 2160 updates serving cell information of the terminal 2100. In other words, the gateway 2160 updates a serving cell of the terminal 2100 in a table representing information regarding one or a plurality of cells which each terminal has accessed, in other words, deletes the base station 1 2110 from the serving cell of the terminal.

At operation 2135, the gateway 2160 stops downlink dispersion transmission for the terminal 2100. For example, as a serving cell of the terminal 2100 becomes one, the gateway 2160 stops dispersion of downlink data.

At operation 2137, the gateway 2160 transmits downlink data of the terminal 2100 via the base station 2 2120. In addition, the terminal 2100 receives the downlink data from the base station 2 2120 using both the antenna #1 and the antenna #2. For example, as downlink data dispersion transmission of the gateway 2160 is stopped, all of downlink data to the terminal 2100 is transmitted via the base station 2 2120.

At operation 2139, the gateway 2160 transmits a cell delete request response confirm message to the base station 2 2120.

At operation 2141, the base station 2 2120 transmits a terminal context release message to delete context of the terminal 2100 stored in the base station 1 2110.

At operation 2143, the base station 1 2110 releases context of the terminal 2100.

Figure 22:
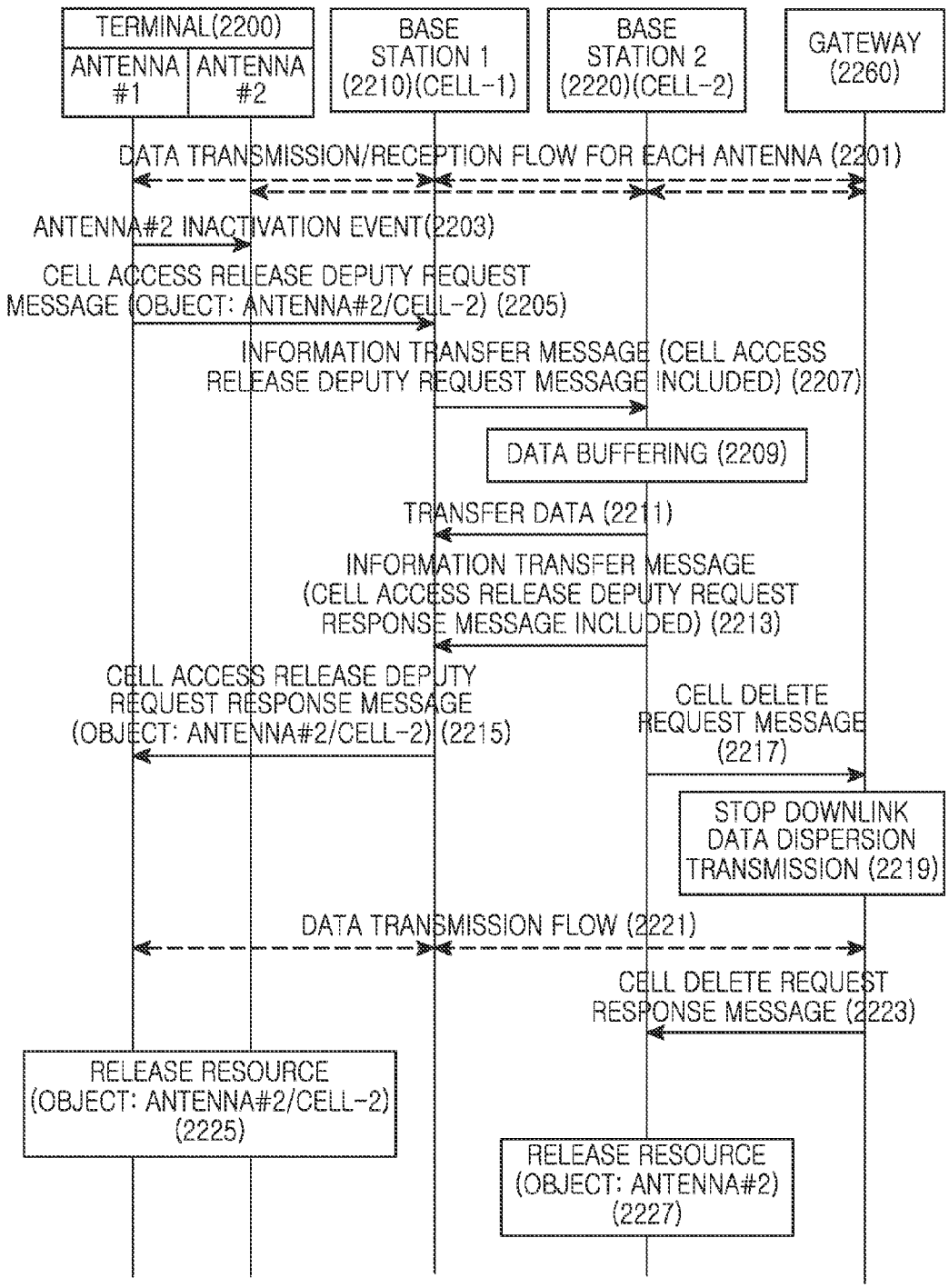
FIG. 22 is a view illustrating an access release procedure for one cell in a wireless communication system according to an embodiment of the present disclosure.

FIG. 22 is a view illustrating an access release procedure for one cell in a wireless communication system according to an embodiment of the present disclosure. The embodiment of FIG. 22 may be performed in the case in which signal quality of a specific antenna deteriorates or a signal is blocked due to an obstacle.

According to the embodiment illustrated in FIG. 22, in the case in which an antenna #2 is inactivated, a terminal 2200 performs signaling releasing an access via an antenna #2 and a cell-2 2220 via an antenna #1 and a cell-1 2210 which are in an active state.

Referring to FIG. 22, at operation 2201, the terminal 2200 is in a multicell access state by accessing a base station 1 2210 using the antenna #1 and accessing a base station 2 2220 using the antenna #2. In other words, the terminal 2200 transmits/receives data to/from the base station 1 2210 using the antenna #1, and transmits/receives data to/from the base station 2 2220 using the antenna #2.

At operation 2203, the terminal 2200 recognizes an inactivation event of the antenna #2, and transfers the inactivation event to the antenna #1. An inactivation event of a specific antenna may occur due to deterioration of signal quality of a specific antenna or signal blocking by an obstacle.

At operation 2205, to inform a communication impossible state of the antenna #2 of the terminal 2200, the terminal 2200 transmits a cell access release deputy request message to the base station 1 2210 accessed via the antenna #1 using the antenna #1. The cell access release deputy request message includes at least one of an ID of an antenna whose access release is desired, for example, the antenna #2, and information of a cell accessed via the antenna #2.

At operation 2207, the base station 1 2210 transfers an information transfer message to the base station 2 2220 to which the antenna #2 of the terminal 2200 has been connected. The information transfer message includes the cell access release deputy request message received in operation 2205.

At operation 2209, the base station 2 2220 buffers data that has been transmitted to the antenna #2 of the terminal 2200. For example, the base station 2 2220 determines signal reception using the antenna #2 of the terminal becomes difficult, and buffers the data in preparation for an access release with the antenna #2.

At operation 2211, the base station 2 2220 transfers buffered data to the base station 1 2210. For example, the base station 2 2220 transfers the buffered data in order to transmit the data via the base station 1 2210.

At operation 2213, the base station 2 2220 transmits an information transfer message to the base station 1 2210. The information transfer message includes a cell access release deputy request response message.

At operation 2215, the base station 1 2210 transmits the cell access release deputy request response message obtained at operation 2213 to the antenna #1 of the terminal 2200.

At operation 2217, the base station 2 2220 transmits a cell delete request message to the gateway 2270. In other words, the base station 2 2220 informs a gateway 2270 that an access with the terminal 2200 using the antenna #2 is released. For example, the base station 2 2220 informs an access release with the terminal 2200 in order to stop dispersion transmission of downlink data.

At operation 2219, the gateway 2260 updates serving cell information of the terminal 2200. In other words, the gateway 2260 updates a serving cell of the terminal 2200 in a table representing information regarding one or a plurality of cells which each terminal has accessed, in other words, deletes the base station 2 2220 from the serving cell of the terminal. Accordingly, the gateway 2260 stops downlink data dispersion transmission.

At operation 2221, the terminal 2200 transmits/receives data to/from the base station 1 2210 using the antenna #1. For example, as downlink data dispersion transmission of the gateway 2260 is stopped, all of data that have been transmitted to the terminal 2200 are received via the antenna #1.

At operation 2223, the gateway 2270 transmits a cell delete request response message to the base station 2 2220.

At operation 2225, the terminal 2200 releases a resource occupied using the antenna #2.

At operation 2227, the base station 2 2220 releases a resource for the antenna #2 of the terminal 2200.

Figure 23:
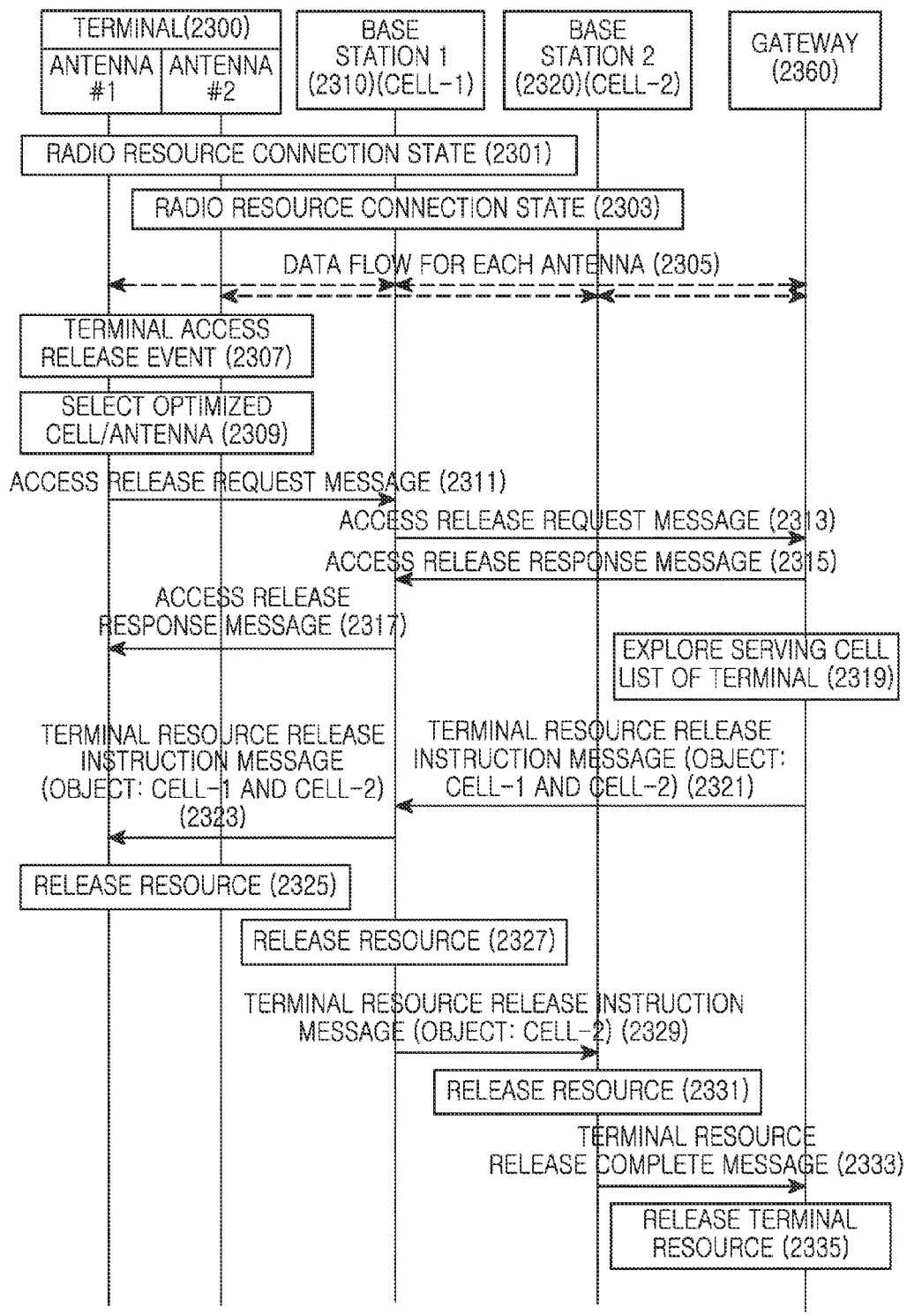
FIG. 23 is a view illustrating an access release procedure for all cells in a wireless communication system according to an embodiment of the present disclosure.

FIG. 23 is a view illustrating an access release procedure for all cells in a wireless communication system according to an embodiment of the present disclosure. The embodiment illustrated in FIG. 23 may be performed in the case in which a terminal 1300 turns off power.

According to various embodiments of the present disclosure illustrated in FIG. 23, the terminal 2300 selects an optimized antenna and a representative base station. When the terminal 2300 transmits an access release request message to the representative base station, a gateway 2360 determines a list of serving cells which the terminal 2300 currently accesses, and transfers an access release message to the representative base station. Accordingly, the representative base station transmits a wireless release request message to the terminal 2300, and transfers a resource release message to at least a different cell included in the access cell list of the terminal 2300 instead.

Referring to FIG. 23, at operation 2301, a radio resource between the antenna #1 of the terminal 2300 and a base station 1 2310 (cell-1) is allocated.

At operation 2303, a radio resource between the antenna #1 of the terminal 2300 and a base station 2 2320 (cell-2) is allocated.

At operation 2305, the terminal 2300 is in a multicell access state by accessing a base station 1 2310 using the antenna #1 and accessing a base station 2 2320 using the antenna #2. In other words, the terminal 2300 transmits/receives data to/from the base station 1 2310 using the antenna #1, and transmits/receives data to/from the base station 2 2320 using the antenna #2.

At operation 2307, a multicell access release event occurs at the terminal 2300, and the terminal 2300 recognizes occurrence of the multicell access release event. For example, power of the terminal 2300 is turned off.

At operation 2309, the terminal 2300 selects a representative base station with consideration of signal quality of a plurality of antennas, a load level of an accessed cell, and/or the like.

At operation 2311, the terminal transmits an access release request message to the base station 1 2310.

At operation 2313, the base station 1 2310 transfers an access release request message to the gateway 2360.

At operation 2315, the gateway 2360 transmits an access release response message to the base station 1 2310.

At operation 2317, the base station 1 2310 transmits the access release response message received at operation 2315 to an optimized antenna of the terminal 2300.

At operation 2319, the gateway 2360 determines a serving cell list of the terminal 2300. In other words, the gateway 2360 determines cells which respective antennas of the terminal 2300 have accessed.

At operation 2121, the gateway 2360 transmits a terminal resource release instruction message including a list of cells which the terminal 2300 has accessed to the base station 1 2310.

At operation 2323, the base station 1 2310 transmits a radio resource release message to the terminal 2300.

At operation 2325, the terminal 2300 releases all resources.

At operation 2327, the base station 1 2310 returns a resource allocated to the terminal 2300, and transmits a terminal resource release message to the base station 2 2320 where a resource for the terminal 2300 remains. At this point, the base station 1 2310 may know that the base station 2 2320 has allocated a resource for the terminal 2300 via a cell list included in the resource release instruction message received in operation 2321.

At operation 2329, the base station 1 2310 transmits a terminal resource release instruction message to the base station 2 2320.

At operation 2331, the base station 2 2320 returns a resource allocated to the terminal 2300.

At operation 2333, the base station 2 2320 (cell-2) transmits a terminal resource release complete message to the gateway 2360.

At operation 2335, the gateway 2360 releases all of resources allocated to the terminal 2300.

Figure 24:
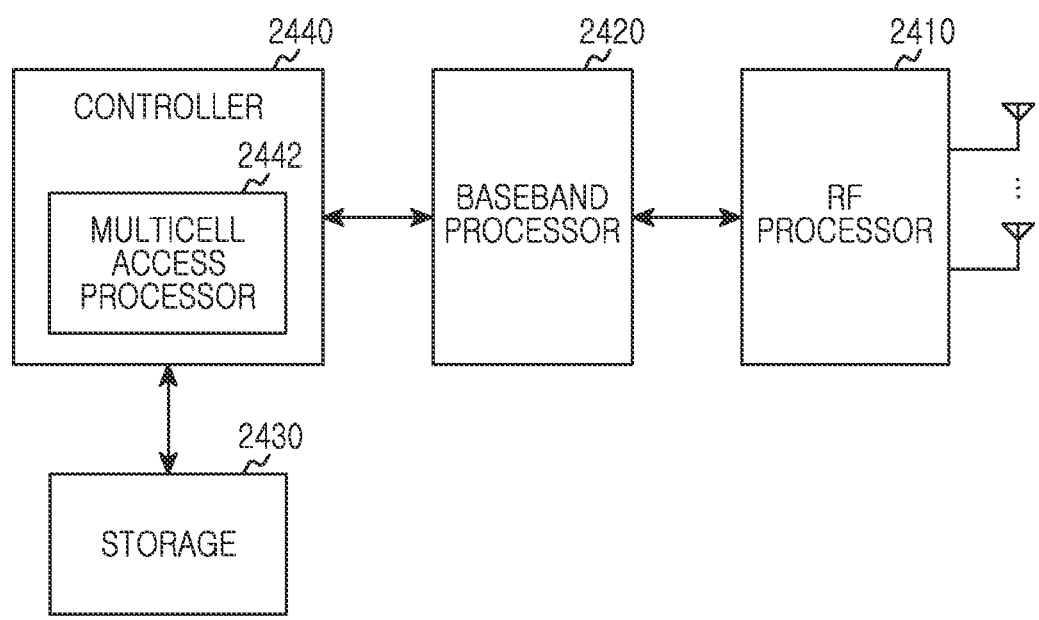
FIG. 24 is a block diagram illustrating a terminal in a wireless communication system according to an embodiment of the present disclosure.

FIG. 24 is a block diagram illustrating a terminal in a wireless communication system according to an embodiment of the present disclosure.

Referring to FIG. 24, the terminal includes a Radio Frequency (RF) processor 2410, a baseband processor 2420, a storage 2430, and a controller 2440.

The RF processor 2410 performs a function for transmitting/receiving a signal via a radio channel such as band conversion, amplification, and/or the like, of a signal. For example, the RF processor 2410 up-converts a baseband signal provided from the baseband processor 2420 to an RF band signal, and then transmits the same via an antenna, and down-converts an RF band signal received via the antenna to a baseband signal. The RF processor 2410 includes RF chains for a plurality of respective antennas, and each RF chain may include a transmission filter, a reception filter, an amplifier, a mixer, an oscillator, a Digital to Analog Converter (DAC), an Analog to Digital Converter (ADC), and/or the like.

The baseband processor 2420 performs a conversion function between a baseband signal and a bit string depending on a physical layer standard of a system. For example, when transmitting data, the baseband processor 2420 generates complex symbols by encoding and modulating a transmission bit string. In addition, when receiving data, the baseband processor 2420 recovers a reception bit string by demodulating and decoding a baseband signal provided from the RF processor 2410. For example, according to an Orthogonal Frequency Division Multiplexing (OFDM) scheme, when transmitting data, the baseband processor 2420 generates complex symbols by encoding and modulating a transmission bit string, maps the complex symbols to subcarriers, and then forms OFDM symbols via an Inverse Fast Fourier Transform (IFFT) operation and Cyclic Prefix (CP) insertion. In addition, when receiving data, the baseband processor 2420 divides a baseband signal provided from the RF processor 2410 on an OFDM symbol basis, recovers signals mapped to subcarriers via a Fast Fourier Transform (FFT) operation, and then recovers a reception bit string via demodulation and decoding.

The baseband processor 2420 and the RF processor 2410 transmits and receives a signal as described above. Accordingly, the baseband processor 2420 and the RF processor 2410 may be denoted by a transmitter, a receiver, a transceiver, or a communication unit.

The storage 2430 stores data such as a basic program for an operation of the terminal, an application, setting information, and/or the like. For example, the storage 2430 may store radio link quality measurement information for each antenna, and/or the like. In addition, the storage 2430 provides stored data according to a request of the controller 2440.

The controller 2440 controls the overall operations of the terminal. For example, the controller 2440 transmits/receives a signal via the baseband processor 2420 and the RF processor 2410. According to various embodiments of the present disclosure, the controller 2440 includes a multicell access processor 2442 for processing a procedure related to a multicell access. The procedure related to the multicell access includes a data transmission and reception procedure based on a multicell access, a multicell access procedure, an access release procedure, an optimized cell exchange procedure, and/or the like. For example, the controller 2440 controls the terminal to perform the procedures illustrated in FIG. 7, FIG. 10, and FIGS. 13 to 23. An operation of the controller 2440 according to various embodiments of the present disclosure is described below.

The controller 2440 controls to determine a first base station to access using a first antenna and a second base station to access using a second antenna, to perform an access procedure for accessing the first base station and the second base station, and to transmit/receive a signal to/from the first base station using the first antenna, and to transmit/receive a signal to/from the second base station using the second antenna. According to various embodiments of the present disclosure, the controller 2440 controls to perform a radio resource connection establish procedure with the first base station using the first antenna, perform an authentication procedure using the first antenna, to perform a wireless section security setting procedure and a radio resource connection resetting procedure with the first base station using the first antenna, and to perform a radio resource connection establish procedure, a wireless section security setting procedure, and a radio resource connection resetting procedure with the second base station using the second antenna. According to various embodiments of the present disclosure, the controller 2440 controls to perform a radio resource connection establish procedure with the first base station using the first antenna, to perform a wireless section security setting procedure, and a radio resource connection resetting procedure on both the first base station and the second base station, and to perform a radio resource connection establish procedure with the second base station using the second antenna.

As described above, in case of transmitting uplink data after accessing a multicell, the controller 2440 controls to select one of the first base station and the second base station, and to transmit the data to the selected base station using an antenna corresponding to the selected base station.

In addition, the controller 2440 transmits/receives data of a delay-sensitive service via a corresponding base station using an antenna whose radio link quality is best. At this point, when an antenna whose radio link quality is best changes, the controller 2440 reports radio link quality of each antenna to a base station accessed via an antenna whose radio link quality is best. In addition, the controller 2440 changes a data path for data of the delay-sensitive service.

When radio link quality of the specific antenna reduces to a threshold, the controller 2440 transmits a message reporting the radio link quality reduction to a base station accessed via a different antenna, releases a resource of the specific antenna, and changes a communication mode for the base station accessed via the different antenna from a single antenna mode to a multi-antenna mode.

In addition, in the case in which signaling of a control message for one antenna is required, the controller 2440 performs the signaling with the first base station accessed via a different antenna. The signaling includes signaling for one of a handover, position update, and a network access release. In case of releasing all accesses, the controller 2440 determines a representative base station among serving cells, and performs signaling for releasing the accesses with the representative base station using an antenna corresponding to the representative base station.

Figure 25:
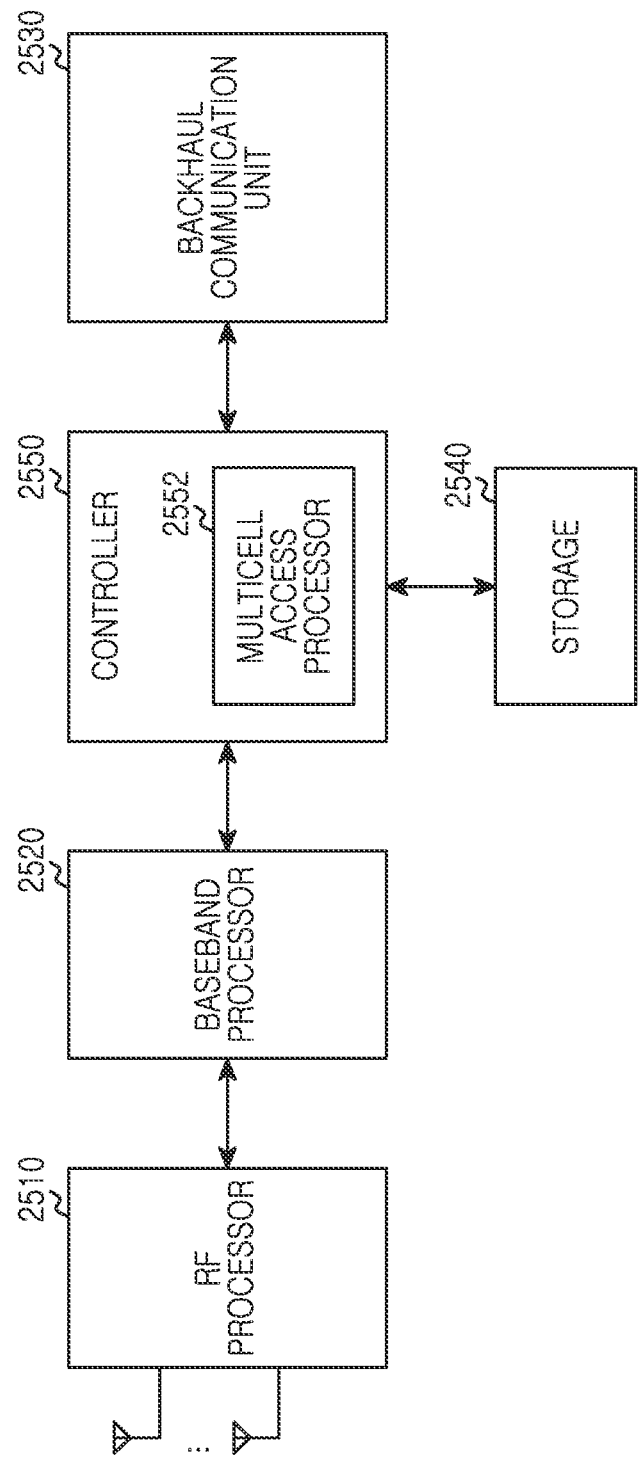
FIG. 25 is a block diagram illustrating a base station in a wireless communication system according to an embodiment of the present disclosure.

FIG. 25 is a block diagram illustrating a base station in a wireless communication system according to an embodiment of the present disclosure.

Referring to FIG. 25, the base station includes an RF processor 2510, a baseband processor 2520, a backhaul communication unit 2530, a storage 2540, and a controller 2550.

The RF processor 2510 performs a function for transmitting/receiving a signal via a radio channel such as band conversion, amplification, and/or the like, of a signal. For example, the RF processor 2510 up-converts a baseband signal provided from the baseband processor 2520 to an RF band signal, and then transmits the same via an antenna, and down-converts an RF band signal received via the antenna to a baseband signal. The RF processor 2510 includes RF chains for a plurality of respective antennas, and each RF chain may include a transmission filter, a reception filter, an amplifier, a mixer, an oscillator, a DAC, an ADC, and/or the like.

The baseband processor 2520 performs a conversion function between a baseband signal and a bit string depending on a physical layer standard of a system. For example, according to an OFDM scheme, when transmitting data, the baseband processor 2520 generates complex symbols by encoding and modulating a transmission bit string, maps the complex symbols to subcarriers, and then forms OFDM symbols via an IFFT operation and CP insertion. In addition, when receiving data, the baseband processor 2520 divides a baseband signal provided from the RF processor 2510 on an OFDM symbol basis, recovers signals mapped to subcarriers via a FFT operation, and then recovers a reception bit string via demodulation and decoding.

The baseband processor 2520 and the RF processor 2510 transmit and receives a signal as described above. Accordingly, the baseband processor 2520 and the RF processor 2510 may be denoted by a wireless transmitter, a wireless receiver, a wireless transceiver, or a wireless communication unit.

The backhaul communication unit 2530 provides an interface for performing communication with other nodes within a network. For example, the backhaul communication unit 2530 converts a bit string transmitted from the base station to a different node, for example, a different base station, a core network, and/or the like, to a physical signal, and converts a physical signal received from the different node to a bit string. The storage 2540 stores data such as a basic program for an operation of the base station, an application, setting information, and/or the like. In addition, the storage 2540 provides stored data according to a request of the controller 2550.

The controller 2550 controls overall operations of the base station. For example, the controller 2540 transmits/receives a signal via the baseband processor 2520 and the RF processor 2510 or the backhaul communication unit 2530. In addition, the controller 2540 records data on the storage 2540 and reads data. According to various embodiments of the present disclosure, the controller 2550 includes a multicell access processor 2552 for supporting a multicell access of the terminal. The multicell access processor 2552 controls signaling for a multicell access related procedure. For example, the controller 2550 controls the base station to perform the procedure illustrated in FIGS. 7, 10, 13 to 23. An operation of the controller 2540 according to various embodiments of the present disclosure is described below.

The controller 2550 controls to perform an access procedure with the terminal as a serving cell for a first antenna of the terminal, and to transmit/receive a signal to/from the terminal via the first antenna of the terminal. At this point, the controller 2550 transmits a message including information regarding a different base station which the base station and the terminal intend to access using a second antenna to a gateway. According to various embodiments of the present disclosure, the controller 2550 may receive a message including first context information for communication with the first base station and second context information for communication from the second base station from the gateway, and may transmit a message including the second context information to the second base station. According to various embodiments of the present disclosure, the controller 2550 may receive a message including radio resource information to be used for radio resource connection establishment between the terminal and the second base station from the second base station, and may transmit a message including the radio resource information to the terminal According to various embodiments of the present disclosure, the controller 2550 may receive a message including first context information for communication with the first base station from the second base station, and may transmit a message including radio resource information to be used for radio resource connection establishment between the terminal and the first base station to the second base station. According to various embodiments of the present disclosure, the controller 2550 may receive a message including context information for communication with the first base station and radio resource information to be used for radio resource connection establishment between the terminal and the second base station, and may transmit a message including the radio resource information to the terminal.

When a message including quality of a first radio link between the first antenna and the first base station and quality of a second radio link between the second antenna and the second base station is received from the terminal, the controller 2440 determines to exchange data paths of a service provided in the first radio link and a service provided in the second radio link based on qualities of the first radio link and the second radio link, and transmits a message requesting exchange of the data paths to the second base station. In addition, when a message requesting to exchange data paths of a service provided in the first radio link between the first antenna and the first base station and a service provided in the second radio link between the second antenna and the second base station is received from the gateway, the controller 2550 transmits a message requesting to exchange the data paths to the second base station.

When a message including radio link quality with the second base station is received from the terminal, the controller 2550 transmits a message including the radio link quality with the second base station to the second base station. When a message requesting an access release with the terminal is received from the terminal via the second base station, the controller 2550 transmits a message responding to a request of the access release to the terminal via the second base station, and transmits a message informing the access release with the terminal to the gateway. When a message requesting access releases for the first base station and the second base station is received from the terminal, the controller 2550 transmits a message requesting the access release to the gateway, receives a message instructing a resource release of the terminal, releases the resource for the terminal, and transmits a message instructing the resource release of the terminal to the second base station.

Figure 26:
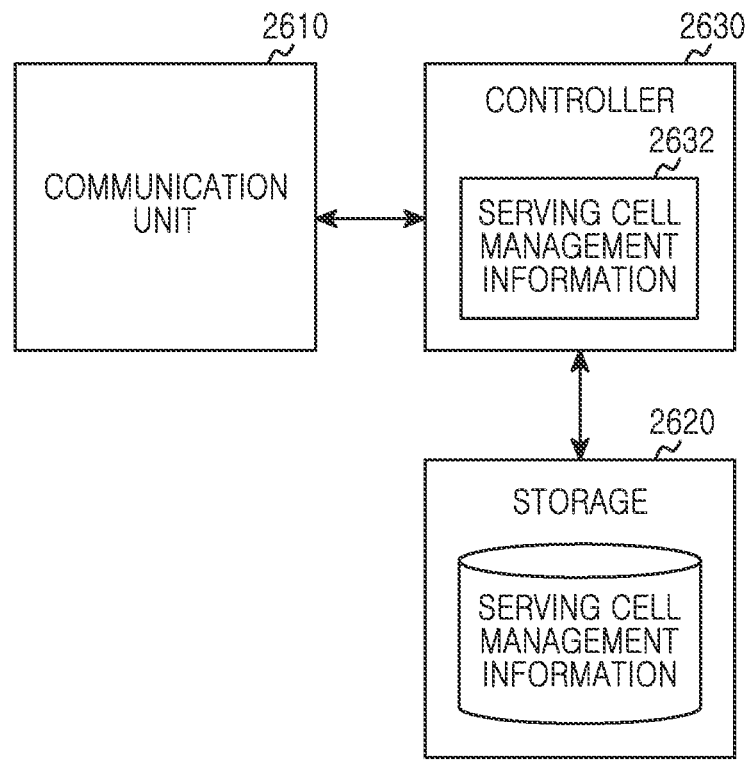
FIG. 26 is a block diagram illustrating a gateway in a wireless communication system according to an embodiment of the present disclosure.

FIG. 26 is a block diagram illustrating a gateway in a wireless communication system according to an embodiment of the present disclosure.

Referring to FIG. 26, the gateway includes a communication unit 2610, a storage 2620, and a controller 2630.

The communication unit 2610 provides an interface for performing communication with other nodes within a network. For example, the backhaul communication unit 2610 converts a bit string transmitted from the gateway to a different node, for example, a different base station, a core network, an authentication server, and/or the like, to a physical signal, and converts a physical signal received from the different node to a bit string.

The storage 2620 stores data such as a basic program for an operation of the gateway, an application, setting information, and/or the like. Particularly, the storage 2620 stores serving cell management information of terminals. The serving cell management information includes a serving cell list of each of the terminals, radio link quality information for each serving cell, load level information for each serving cell, service information for each serving cell, type information of a provided service, QoS level information of a service, and/or the like, and may be configured in the form of a table. In addition, the storage 2620 provides stored data according to a request of the controller 2630.

The controller 2630 controls overall operations of the gateway. For example, the controller 2630 transmits/receives a signal via the communication unit 2610. In addition, the controller 2630 records data on the storage and reads data. According to various embodiments of the present disclosure, the controller 2530 includes a multicell access processor 2632 for supporting a multicell access of the terminal. The multicell access processor 2632 performs cell level scheduling for downlink data of the terminal, maintain, update, and manage serving cell management information stored in the storage 2620. For example, the controller 2630 controls the gateway to perform the procedure illustrated in FIGS. 7, 10, 13 to 23. An operation of the gateway 2620 according to various embodiments of the present disclosure is described below.

The controller 2630 controls to perform an access procedure for allowing a terminal to access a first base station using a first antenna, and allowing the terminal to access a second base station using a second antenna, and to transmit/receive data to/from the terminal via the second base station. At this point, the controller 2630 receives a message including information regarding the first base station and the second base station from the first base station. According to various embodiments of the present disclosure, the controller 2630 may transmit a message including first context information for communication with the first base station and second context information for communication with the second base station to the first base station. According to various embodiments of the present disclosure, the controller 2630 may transmit a message including second context information for communication with the second base station to the second base station, may receive a message including radio resource information to be used for an access with the second base station from the second base station, and may transmit a message including first context information for communication with the first base station and the radio resource information to the first base station.

In case of transmitting downlink data to the terminal, the controller 2630 distributes the downlink data to the first base station and the second base station based on at least one of radio link quality for each antenna of the terminal, and load levels of the first base station and the second base station. In addition, the controller 2630 controls to transmit/receive data of a delay-sensitive service via a cell accessed using an antenna whose link quality is relatively good.

When a message informing a release for at least one access of the terminal is received, the controller 2630 deletes information regarding released at least one cell from the serving cell management information. When a message requesting exchange for a data path of services provided in each radio link of the terminal is received, the controller 2630 updates service information for each serving cell in the serving cell management information. When a message informing a release for all accesses of the terminal is received from the first base station, the controller 2630 determines a serving cell list of the terminal, and transmits a message instructing a resource release of base stations included in the serving cell list to the first base station.

According to a multicell access according to various embodiments of the present disclosure, the terminal may optimize a transmission/reception performance by communicating with an optimized cell for each antenna, and performance is optimized via scheduling and load dispersion of a network. Furthermore, a scheduling gain effect via data transmission path switching depending on radio link quality occurs, and a path is dispersed depending on a load of a cell, so that a wireless network performance improves. In addition, data is transmitted to an optimized serving cell with consideration of a kind of an application and a level of a QoS, so that service quality is raised.

In addition, radio link quality report and control information for a cell switch region are transmitted/received to/from an optimized cell of the terminal, so that performance improves. Accordingly, a capacity of a cell increases, and a delay time is minimized. Because a gateway considers an inter-cell load when selecting a cell, a load dispersion effect occurs, and a problem that power consumption of a terminal and a base station increases or an inter-cell interference increases during the load dispersion process does not occur.

In addition, because each base station does not cooperate with other base stations when scheduling a radio resource for data transmission/reception, implementation complexity of a network and a base station is small. In addition, because each base station does not require radio resource allocation information of other base stations when scheduling a radio resource for data transmission/reception, implementation complexity of a network and a base station is also small.

In the specific embodiments of the present disclosure, an element included in the present disclosure has been expressed as the singular or the plural depending on a suggested specific embodiment. However, the expression of the singular or the plural has been selected so that it is suitable for a suggested circumstance for convenience in description, and the present disclosure is not limited to a singular or plural element. Even an element expressed in a plural form may be configured as the singular, or even an element expressed in a singular form may be configured as the plural.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a terminal in a wireless communication system, the method comprising:
    performing at least one access procedure for accessing a base station of a wireless network using a first antenna and for accessing another base station of the wireless network using a second antenna; and
    communicating with the base station using the first antenna and communicating with the other base station using the second antenna;
    determining, based on information regarding a state of a first radio link between the base station and the first antenna and a state of a second radio link between the other base station and the second antenna, a representative base station for transmitting control information for the second antenna among the base station and the other base station; and
    transmitting, based on determining the representative base station as the base station, the control information for the second antenna to the base station using the first antenna.

2. The method of claim 1, wherein the performing of the at least one access procedure comprises:
    performing a radio resource connection establish procedure with the base station using the first antenna;
    performing an authentication procedure with the base station using the first antenna;
    performing a wireless section security setting procedure and a radio resource connection resetting procedure with the base station using the first antenna; and
    performing the radio resource connection establish procedure, the wireless section security setting procedure, and the radio resource connection resetting procedure with the other base station using the second antenna.

3. The method of claim 1, wherein the performing of the at least one access procedure comprises:
    performing a radio resource connection establish procedure with the base station using the first antenna;
    performing a wireless section security setting procedure and a radio resource connection resetting procedure for both the base station and the other base station using the first antenna; and
    performing a radio resource connection establish procedure with the other base station using the second antenna.

4. The method of claim 1, wherein the communicating comprises:
    selecting a base station for transmitting uplink data among the base station and the other base station; and
    transmitting the uplink data to the selected base station using an antenna corresponding to the selected base station.

5. The method of claim 1, wherein the performing communicating comprises:
    upon determining that the state of the first radio link is better than the state of the second radio link, communicating data of a delay-sensitive service with the base station using the first antenna.

6. The method of claim 5, further comprising:
    upon determining that the state of the second radio link becomes better than the state of the first radio link, transmitting a message comprising information regarding the state of the first radio link and the state of the second radio link to the other base station; and
    communicating the data of the delay-sensitive service with the other base station using the second antenna.

7. The method of claim 1, wherein the determining the representative base station comprises:
    in response to determining that a transmission of control information for the second antenna is required, determining the representative base station among the base station and the other base station based on the information regarding the state of the first radio link and the state of the second radio link.

8. The method of claim 1, wherein the transmitted control information for the second antenna is used for performing one of a handover, a position update, and a network access release.

9. The method of claim 1, further comprising:
    determining that a value for indicating the state of the first radio link becomes less than or equal to a threshold;
    transmitting a message reporting that the value becomes less than or equal to the threshold to the other base station using the second antenna;
    receiving a message requesting a cell re-access for the first antenna;
    releasing a first antenna resource allocated for accessing the base station; and
    changing a communication mode for the other base station from a single antenna mode to a multi-antenna mode.

10. The method of claim 1, further comprising:
    determining that a value for indicating the state of the first radio link becomes less than or equal to a threshold;
    determining to change a serving cell for the first antenna to the other base station;
    transmitting a message requesting a cell re-access for the first antenna to the other base station using the second antenna;
    receiving a message informing that the cell re-access for the first antenna is accepted from the other base station using the second antenna;
    releasing a first antenna resource allocated for accessing the base station; and
    changing a communication mode for the other base station from a single antenna mode to a multi-antenna mode.

11. The method of claim 1, further comprising:
upon determining to release accesses for both the base station and the other base station, determining a representative base station for releasing the accesses among the base station and the other base station; and
performing signaling for releasing the accesses with the representative base station using an antenna corresponding to the representative base station.

12. A non-transitory computer-readable storage medium storing instructions that, when executed, cause at least one processor to perform the method of claim 1.

13. A method for operating a base station of a wireless network, the method comprising:
performing an access procedure with a terminal for operating as a serving cell for a first antenna of the terminal;
communicating with the terminal via the first antenna of the terminal; and
receiving, from the terminal, control information for a second antenna of the terminal,
wherein the control information for the second antenna is transmitted, based on determining that a representative base station for transmitting the control information for the second antenna as the base station, from the terminal using the first antenna,
wherein the representative base station is determined, based on information regarding a state of a first radio link between the first antenna and the base station and a state of a second radio link between the second antenna and another base station of the wireless network, among the base station and the other base station, and
wherein the other base station is configured to perform another access procedure with the terminal for operating as a serving cell for the second antenna of the terminal.

14. The method of claim 13, wherein the performing of the access procedure comprises:
receiving, from a gateway, a message comprising first context information for communicating with the base station and second context information for communicating with the other base station; and
transmitting a message comprising the second context information to the other base station.

15. The method of claim 13, wherein the performing of the access procedure comprises:
receiving a message comprising radio resource information to be used for establishing radio resource connection between the terminal and the other base station from the other base station; and
transmitting a message comprising the radio resource information to the terminal,
wherein the radio resource information comprises one or more of a dedicated preamble, broadcast channel (BCH) information, or a security algorithm.

16. The method of claim 13, wherein the performing of the access procedure comprises:
receiving a message comprising first context information for communicating with the base station from the other base station; and
transmitting a message comprising radio resource information to be used for establishing radio resource connection between the terminal and the base station to the other base station,
wherein the radio resource information comprises at least one of a dedicated preamble, broadcast channel (BCH) information, and a security algorithm.

17. The method of claim 13, further comprising:
receiving, from a gateway, a message comprising context information for communicating with the base station and radio resource information to be used for establishing radio resource connection between the terminal and the other base station; and
transmitting a message comprising the radio resource information to the terminal,
wherein the radio resource information comprises at least one of a dedicated preamble, broadcast channel (BCH) information, and a security algorithm.

18. The method of claim 13, further comprising:
receiving, from the terminal, a message comprising information regarding the state of the first radio link and the state of the second radio link;
determining to exchange data paths of a service provided in the first radio link and a service provided in the second radio link based on the information regarding the state of the first radio link and the state of the second radio link; and
transmitting a message for requesting to exchange the data paths to the other base station.

19. The method of claim 13, further comprising:
receiving, from a gateway, a message for requesting to exchange data paths of a service provided in the first radio link and a service provided in the second radio link; and
transmitting a message for requesting to exchange the data path to the other base station.

20. The method of claim 13, further comprising:
receiving a message comprising information regarding the state of the second radio link from the terminal; and
transmitting the message comprising the information regarding the state of the second radio link to the other base station.

21. The method of claim 13, further comprising:
receiving a message for reporting the state of the second radio link by deputy via the other base station from the terminal;
determining to change a serving cell for the first antenna to the other base station;
transmitting a message for requesting to become the serving cell for the first antenna to the other base station;
receiving a message for accepting the serving cell for the first antenna from the other base station; and
transmitting a message for instructing cell re-access by deputy to the terminal via the other base station.

22. The method of claim 13, further comprising:
receiving, from the other base station, a message for requesting a data transfer due to a change of a serving cell for the first antenna;
buffering data to be transmitted to the first antenna; and
transmitting the buffered data to the other base station.

23. The method of claim 13, further comprising:
receiving a message for requesting to release an access with the terminal via the other base station from the terminal;
transmitting a message according to the message for requesting to release the access to the terminal via the other base station; and
transmitting a message for informing to release the access with the terminal to a gateway.

24. The method of claim 13, further comprising:
receiving a message for requesting to release accesses with both the base station and the other base station from the terminal;

transmitting a message for requesting to release the accesses to a gateway;
receiving a message for instructing to release a first resource and a second resource from the gateway;
releasing the first resource; and
transmitting a message for instructing to release the second resource to the other base station,
wherein the first resource is allocated, by the base station, for the terminal, and
wherein the second resource is allocated, by the other base station, for the terminal.

25. A non-transitory computer-readable storage medium storing instructions that, when executed, cause at least one processor to perform the method of claim 13.

26. A method for operating a gateway in a wireless communication system, the method comprising:
performing an access procedure with a terminal which accesses a base station of a wireless network using a first antenna, and accesses another base station of the wireless network using a second antenna; and
communicating with the terminal via the base station and the other base station,
wherein the terminal is configured to:
determine, based on information regarding a state of a first radio link between the base station and the first antenna and a state of a second radio link between the other base station and the second antenna, a representative base station for transmitting control information for the second antenna among the base station and the other base station; and
transmit, based on determining the representative base station as the base station, the control information for the second antenna to the base station using the first antenna.

27. The method of claim 26, wherein the performing of the access procedure comprises:
transmitting a message comprising first context information for communicating with the base station and second context information for communicating with the other base station to the base station.

28. The method of claim 27,
wherein the first context information comprises a security key common to the base station and the other base station, and bearer information for communication between the base station and the terminal, and
wherein the second context information comprises a security key common to the base station and the other base station, and bearer information for communication between the other base station and the terminal.

29. The method of claim 26, wherein the performing of the access procedure comprises:
transmitting a message comprising second context information for communicating with the other base station to the other base station;
receiving a message comprising radio resource information to be used for an access with the other base station from the other base station; and
transmitting a message comprising first context information for communicating with the base station, and the radio resource information to the base station, and
wherein the radio resource information comprises at least one of a dedicated preamble, broadcast channel (BCH) information, and a security algorithm.

30. The method of claim 26, wherein the communicating comprises:
in case of transmitting downlink data to the terminal, distributing the downlink data to the base station and the other base station based on at least one of radio link quality for each antenna of the terminal, and load levels of the base station and the other base station.

31. The method of claim 26, wherein the communicating comprises:
transmitting/receiving data of a delay-sensitive service via a cell accessed using an antenna whose link quality is better than another antenna.

32. The method of claim 26, wherein the communicating comprises:
transmitting/receiving data of a delay-sensitive service via a cell whose load level is lower than another cell.

33. The method of claim 26, further comprising:
storing serving cell management information of the terminal,
wherein the serving cell management information comprises at least one of a serving cell list for each antenna of the terminal, radio link quality information for each serving cell, load level information for each serving cell, service information for each serving cell, type information of a provided service, and quality of service (QoS) level information of a service.

34. The method of claim 33, further comprising:
receiving a message informing to release at least one access of the terminal; and
deleting information regarding at least one cell corresponding to the released at least one access from the serving cell management information.

35. The method of claim 33, further comprising:
receiving a message for requesting to exchange data paths of services provided in respective radio links of the terminal; and
updating the service information for each serving cell in the serving cell management information.

36. The method of claim 33, further comprising:
receiving a message for informing a load level of the base station from the base station;
receiving a message for informing a load level of the other base station from the other base station;
determining to exchange data paths of services provided in respective radio links of the terminal based on load levels of the base station and the other base station; and
updating service information for each serving cell in the serving cell management information.

37. The method of claim 26, further comprising:
receiving a message for informing to release all accesses of the terminal from the base station;
determining a serving cell list of the terminal; and
transmitting a message for instructing to release a resource of base stations included in the serving cell list to the base station.

38. A non-transitory computer-readable storage medium storing instructions that, when executed, cause at least one processor to perform the method of claim 26.

39. An apparatus for a terminal in a wireless communication system, the apparatus comprising:
at least one transceiver; and
at least one processor, coupled to the at least one transceiver, configured to:
perform at least one access procedure for accessing a base station of a wireless network using a first antenna and for accessing another base station of the wireless network using a second antenna;
control to communicate with the base station using the first antenna and to communicate with the other base station using the second antenna;

determine, based on information regarding a state of a first radio link between the base station and the first antenna and a state of a second radio link between the other base station and the second antenna, a representative base station for transmitting control information for the second antenna among the base station and the other base station; and control to transmit, based on determining the representative base station as the base station, the control information for the second antenna to the base station using the first antenna.

40. The apparatus of claim 39, wherein the at least one processor is configured to:
   perform a radio resource connection establish procedure with the base station using the first antenna;
   perform an authentication procedure with the base station using the first antenna;
   perform a wireless section security setting procedure and a radio resource connection resetting procedure with the base station using the first antenna; and
   perform the radio resource connection establish procedure, the wireless section security setting procedure, and the radio resource connection resetting procedure with the other base station using the second antenna.

41. The apparatus of claim 39, wherein the at least one processor is configured to:
   perform a radio resource connection establish procedure with the base station using the first antenna;
   perform a wireless section security setting procedure and a radio resource connection resetting procedure for both the base station and the other base station using the first antenna; and
   perform a radio resource connection establish procedure with the other base station using the second antenna.

42. The apparatus of claim 39, wherein the at least one processor is configured to:
   select a base station for transmitting uplink data among the base station and the other base station; and
   control to transmit the uplink data to the selected base station using an antenna corresponding to the selected base station.

43. The apparatus of claim 39, wherein the at least one processor is configured to:
   upon determining that the state of the first radio link is better than the state of the second radio link, control to communicate data of a delay-sensitive service with the base station using the first antenna.

44. The apparatus of claim 43, wherein the at least one processor is further configured to:
   upon determining that the state of the second radio link becomes better than the state of the first radio link, control to transmit a message comprising information regarding the state of the first radio link and the state of the second radio link to the other base station; and
   control to communicate the data of the delay-sensitive service with the other base station using the second antenna.

45. The apparatus of claim 39, wherein the at least one processor is further configured to:
   in response to determining that a transmission of control information for the second antenna is required, determine the representative base station among the base station and the other base station based on the information regarding the state of the first radio link and the state of the second radio link.

46. The apparatus of claim 39, wherein the transmitted control information for the second antenna is used for performing one of a handover, a position update, and a network access release.

47. The apparatus of claim 39, wherein the at least one processor is further configured to:
   determine that a value for indicating the state of the first radio link becomes less than or equal to a threshold;
   control to transmit a message reporting that the value becomes less than or equal to the threshold to the other base station using the second antenna;
   control to receive a message requesting a cell re-access for the first antenna;
   release a first antenna resource allocated for accessing the base station; and
   change a communication mode for the other base station from a single antenna mode to a multi-antenna mode.

48. The apparatus of claim 39, wherein the at least one processor is further configured to:
   determine that a value for indicating the state of the first radio link becomes less than or equal to a threshold;
   determine to change a serving cell for the first antenna to the other base station;
   control to transmit a message requesting a cell re-access for the first antenna to the other base station using the second antenna;
   control to receive a message informing that the cell re-access for the first antenna is accepted from the other base station using the second antenna;
   release a first antenna resource allocated for accessing the base station; and
   change a communication mode for the other base station from a single antenna mode to a multi-antenna mode.

49. The apparatus of claim 39, wherein the at least one processor is further configured to:
   upon determining to release accesses for both the base station and the other base station, determine a representative base station for releasing the accesses among the base station and the other base station; and
   perform signaling for releasing the accesses with the representative base station using an antenna corresponding to the representative base station.

50. An apparatus of a base station of a wireless network, the apparatus comprising:
   at least one transceiver; and
   at least one processor, coupled to the at least one transceiver, configured to:
      perform an access procedure with a terminal for operating as a serving cell for a first antenna of the terminal;
      control to communicate with the terminal via the first antenna of the terminal; and
      control to receive, from the terminal, control information for a second antenna of the terminal,
   wherein the control information for the second antenna is transmitted, based on determining that a representative base station for transmitting the control information for the second antenna as the base station, from the terminal using the first antenna,
   wherein the representative base station is determined, based on information regarding a state of a first radio link between the first antenna and the base station and a state of a second radio link between the second antenna and another base station of the wireless network, among the base station and the other base station, and wherein the other base station is configured to perform another access procedure with the terminal for operating as a serving cell for the second antenna of the terminal.

51. The apparatus of claim 50, wherein the at least one processor is further configured to:
control to receive, from a gateway, a message comprising first context information for communicating with the base station and second context information for communicating with the other base station; and
control to transmit a message comprising the second context information to the other base station.

52. The apparatus of claim 50, wherein the at least one processor is further configured to:
control to receive a message comprising radio resource information to be used for establishing radio resource connection between the terminal and the other base station from the other base station; and
control to transmit a message comprising the radio resource information to the terminal,
wherein the radio resource information comprises one or more of a dedicated preamble, broadcast channel (BCH) information, or a security algorithm.

53. The apparatus of claim 50, wherein the at least one processor is further configured to:
control to receive a message comprising first context information for communicating with the base station from the other base station; and
control to transmit a message comprising radio resource information to be used for establishing radio resource connection between the terminal and the base station to the other base station,
wherein the radio resource information comprises at least one of a dedicated preamble, broadcast channel (BCH) information, and a security algorithm.

54. The apparatus of claim 50, wherein the at least one processor is further configured to:
control to receive, from a gateway, a message comprising context information for communicating with the base station and radio resource information to be used for establishing radio resource connection between the terminal and the other base station; and
control to transmit a message comprising the radio resource information to the terminal,
wherein the radio resource information comprises at least one of a dedicated preamble, broadcast channel (BCH) information, and a security algorithm.

55. The apparatus of claim 50, wherein the at least one processor is further configured to:
control to receive, from the terminal, a message comprising information regarding the state of the first radio link and the state of the second radio link;
determine to exchange data paths of a service provided in the first radio link and a service provided in the second radio link based on the information regarding the state of the first radio link and the state of the second radio link; and
control to transmit a message for requesting to exchange the data paths to the other base station.

56. The apparatus of claim 50, wherein the at least one processor is further configured to:
control to receive, from a gateway, a message for requesting to exchange data paths of a service provided in the first radio link and a service provided in the second radio link; and
control to transmit a message for requesting to exchange the data path to the other base station.

57. The apparatus of claim 50, wherein the at least one processor is further configured to:
control to receive a message comprising information regarding the state of the second radio link from the terminal; and
control to transmit the message comprising the information regarding the state of the second radio link to the other base station.

58. The apparatus of claim 50, wherein the at least one processor is further configured to:
control to receive a message for reporting the state of the second radio link by deputy via the other base station from the terminal;
determine to change a serving cell for the first antenna to the other base station;
control to transmit a message for requesting to become the serving cell for the first antenna to the other base station;
control to receive a message for accepting the serving cell for the first antenna from the other base station; and
control to transmit a message for instructing cell re-access by deputy to the terminal via the other base station.

59. The apparatus of claim 50, wherein the at least one processor is further configured to:
control to receive, from the other base station, a message for requesting a data transfer due to a change of a serving cell for the first antenna;
buffer data to be transmitted to the first antenna; and
control to transmit the buffered data to the other base station.

60. The apparatus of claim 50, wherein the at least one processor is further configured to:
control to receive a message for requesting to release an access with the terminal via the other base station from the terminal;
control transmit a message according to the message for requesting to release the access to the terminal via the other base station; and
control to transmit a message for informing to release the access with the terminal to a gateway.

61. The apparatus of claim 50, wherein the at least one processor is further configured to:
control to receive a message for requesting to release accesses with both the base station and the other base station from the terminal;
control to transmit a message for requesting to release the accesses to a gateway;
control to receive a message for instructing to release a first resource and a second resource from the gateway;
release the first resource; and
control to transmit a message for instructing to release the second resource to the other base station,
wherein the first resource is allocated, by the base station, for the terminal, and
wherein the second resource is allocated, by the other base station, for the terminal.

62. An apparatus of a gateway in a wireless communication system, the apparatus comprising:
at least one transceiver; and
at least one processor, coupled to the at least one transceiver, configured to:
perform an access procedure with a terminal which accesses a base station of a wireless network using a first antenna, and accesses another base station of the wireless network using a second antenna; and
control to communicate with the terminal via the base station and the other base station, wherein the terminal is configured to:
  determine, based on information regarding a state of a first radio link between the base station and the first antenna and a state of a second radio link between the other base station and the second antenna, a representative base station for transmitting control information for the second antenna among the base station and the other base station; and
  transmit, based on determining the representative base station as the base station, the control information for the second antenna to the base station using the first antenna.

63. The apparatus of claim 62, wherein the at least one processor is further configured to:
  control to transmit a message comprising first context information for communicating with the base station and second context information for communicating with the other base station to the base station.

64. The apparatus of claim 63,
  wherein the first context information comprises a security key common to the base station and the other base station, and bearer information for communication between the base station and the terminal, and
  wherein the second context information comprises a security key common to the base station and the other base station, and bearer information for communication between the other base station and the terminal.

65. The apparatus of claim 62, wherein the at least one processor is further configured to:
  control to transmit a message comprising second context information for communicating with the other base station to the other base station;
  control to receive a message comprising radio resource information to be used for an access with the other base station from the other base station; and
  control to transmit a message comprising first context information for communicating with the base station, and the radio resource information to the base station,
  wherein the radio resource information comprises at least one of a dedicated preamble, broadcast channel (BCH) information, and a security algorithm.

66. The apparatus of claim 62, wherein the at least one processor is further configured to:
  in case of transmitting downlink data to the terminal, distribute the downlink data to the base station and the other base station based on at least one of radio link quality for each antenna of the terminal, and load levels of the base station and the other base station.

67. The apparatus of claim 62, wherein the at least one processor is further configured to:
  control to transmit/receive data of a delay-sensitive service via a cell accessed using an antenna whose link quality is better than another antenna.

68. The apparatus of claim 62, wherein the at least one processor is further configured to:
  control to transmit/receive data of a delay-sensitive service via a cell whose load level is lower than another cell.

69. The apparatus of claim 62, further comprises:
  a storage coupled to the at least one processor,
  wherein the at least one processor is further configured to control to store serving cell management information of the terminal, and
  wherein the serving cell management information comprises at least one of a serving cell list for each antenna of the terminal, radio link quality information for each serving cell, load level information for each serving cell, service information for each serving cell, type information of a provided service, and quality of service (QoS) level information of a service.

70. The apparatus of claim 69, wherein the at least one processor is further configured to:
  control to receive a message informing to release at least one access of the terminal; and
  delete information regarding at least one cell corresponding to the released at least one access from the serving cell management information.

71. The apparatus of claim 69, wherein the at least one processor is further configured to:
  control to receive a message for requesting to exchange data paths of services provided in respective radio links of the terminal; and
  update the service information for each serving cell in the serving cell management information.

72. The apparatus of claim 69, wherein the at least one processor is further configured to:
  control to receive a message for informing a load level of the base station from the base station;
  control to receive a message for informing a load level of the other base station from the other base station;
  determine to exchange data paths of services provided in respective radio links of the terminal based on load levels of the base station and the other base station; and
  update service information for each serving cell in the serving cell management information.

73. The apparatus of claim 62, wherein the at least one processor is further configured to:
  control to receive a message for informing to release all accesses of the terminal from the base station;
  determine a serving cell list of the terminal; and
  control to transmit a message for instructing to release a resource of base stations included in the serving cell list to the base station.

* * * * *